(12) United States Patent
Hosoda

(10) Patent No.: US 11,734,720 B2
(45) Date of Patent: Aug. 22, 2023

(54) INFORMATION PROCESSING SYSTEM, RECORDING MEDIUM, AND INFORMATION PROCESSING METHOD

(71) Applicant: SONY CORPORATION, Tokyo (JP)

(72) Inventor: Yasuhide Hosoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 570 days.

(21) Appl. No.: 16/312,912

(22) PCT Filed: Jun. 21, 2017

(86) PCT No.: PCT/JP2017/022772
§ 371 (c)(1),
(2) Date: Dec. 21, 2018

(87) PCT Pub. No.: WO2018/008394
PCT Pub. Date: Jan. 11, 2018

(65) Prior Publication Data
US 2019/0251596 A1    Aug. 15, 2019

(30) Foreign Application Priority Data

Jul. 5, 2016  (JP) ................................. 2016-133048

(51) Int. Cl.
*G06Q 30/00* (2023.01)
*G06Q 30/0251* (2023.01)
(Continued)

(52) U.S. Cl.
CPC ......... *G06Q 30/0259* (2013.01); *G06F 13/00* (2013.01); *G06F 16/5866* (2019.01);
(Continued)

(58) Field of Classification Search
None
See application file for complete search history.

(56) References Cited

U.S. PATENT DOCUMENTS 5,458,123 A * 10/1995 Unger .................. A61B 5/0006
600/509
5,552,772 A *  9/1996 Janky ................. G08B 21/0222
340/8.1
(Continued)

FOREIGN PATENT DOCUMENTS

CN        103514251 A       1/2014
DE    102015113924 A1 *   2/2016   .......... G06F 11/3006
(Continued)

OTHER PUBLICATIONS

• Headquarters Department of the Army. "Tactics in Counterinsurgency." (Mar. 2009). Retrieved online Mar. 5, 2022. https://irp.fas.org/doddir/army/fmi3-24-2.pdf (Year: 2009).*
(Continued)

*Primary Examiner* — James A Reagan
(74) *Attorney, Agent, or Firm* — Chip Law Group

(57) ABSTRACT

The present technology relates to an information processing system, a recording medium, and an information processing method which are capable of transmitting information to persons who are considered to be worthy of the transmission. An information processing system according to an aspect of the present technology stores position information indicating a position of a device of a user and date information at which position measurement is performed in correlation with each other, forms a community including users who leave a movement trajectory satisfying a predetermined condition at the periphery of a specific location on the basis of a user's movement history indicated by the stored information, and distributes a message input through a specific interface to users who pertain to the community. The present technology is applicable to a device such as an electronic signboard that is installed at a specific location.

21 Claims, 70 Drawing Sheets

(51) Int. Cl.
  *G06F 13/00* (2006.01)
  *G06F 16/58* (2019.01)
  *G06F 21/60* (2013.01)
  *G06Q 50/00* (2012.01)
  *H04N 5/232* (2006.01)
  *G06F 16/587* (2019.01)

(52) U.S. Cl.
  CPC ....... *G06F 21/602* (2013.01); *G06Q 30/0269* (2013.01); *G06Q 50/01* (2013.01); *H04N 5/23229* (2013.01); *G06F 16/587* (2019.01)

(56) References Cited

U.S. PATENT DOCUMENTS

| | | | | |
|---|---|---|---|---|
| 5,561,706 | A * | 10/1996 | Fenner | H04M 15/00 455/406 |
| 5,652,570 | A * | 7/1997 | Lepkofker | G08B 21/0211 340/8.1 |
| 5,712,899 | A * | 1/1998 | Pace, II | H04L 67/18 340/988 |
| 6,687,609 | B2 * | 2/2004 | Hsiao | G08G 1/20 340/993 |
| 6,731,238 | B2 * | 5/2004 | Johnson | G06Q 30/02 340/568.1 |
| 7,206,568 | B2 * | 4/2007 | Sudit | H04L 67/306 455/404.1 |
| 8,000,726 | B2 * | 8/2011 | Altman | G06Q 30/0251 455/457 |
| 8,073,461 | B2 * | 12/2011 | Altman | H04L 51/20 455/457 |
| 8,099,109 | B2 * | 1/2012 | Altman | H04W 4/021 455/457 |
| 8,548,734 | B2 * | 10/2013 | Barbeau | G01C 21/3484 701/410 |
| 8,682,350 | B2 * | 3/2014 | Altman | H04M 1/7243 455/457 |
| 9,562,783 | B2 * | 2/2017 | Bourne | H04W 4/023 |
| 9,654,917 | B2 * | 5/2017 | Shaprio | G08B 21/023 |
| 9,818,074 | B2 * | 11/2017 | Rivere | G06Q 10/06311 |
| 9,854,385 | B2 * | 12/2017 | Oliver | G08B 13/1427 |
| 10,163,113 | B2 * | 12/2018 | Mehta | G06Q 30/02 |
| 10,772,068 | B1 * | 9/2020 | Liu | G08G 1/0129 |
| 11,074,495 | B2 * | 7/2021 | Zadeh | G06N 3/0436 |
| 2001/0034232 | A1 * | 10/2001 | Kuwahara | H04W 60/04 455/435.1 |
| 2008/0133336 | A1 * | 6/2008 | Altman | G06T 11/206 705/14.1 |
| 2008/0171559 | A1 * | 7/2008 | Frank | H04W 4/02 455/456.5 |
| 2009/0288022 | A1 * | 11/2009 | Almstrand | G06F 9/451 715/762 |
| 2010/0004997 | A1 * | 1/2010 | Mehta | H04L 67/306 705/14.66 |
| 2011/0182238 | A1 * | 7/2011 | Marshall | H04W 64/00 370/328 |
| 2011/0224891 | A1 * | 9/2011 | Iwuchukwu | G08G 1/096716 701/117 |
| 2013/0090966 | A1 * | 4/2013 | Rivere | G06Q 10/06311 705/7.15 |
| 2013/0179260 | A1 * | 7/2013 | Keohane | G06Q 30/06 705/26.1 |
| 2013/0227017 | A1 * | 8/2013 | Gahlings | H04L 51/04 709/204 |
| 2014/0073362 | A1 | 3/2014 | Kawata et al. | |
| 2014/0136414 | A1 * | 5/2014 | Abhyanker | G05D 1/024 705/44 |
| 2014/0195470 | A1 * | 7/2014 | Xing | G06N 5/02 706/46 |
| 2014/0201126 | A1 * | 7/2014 | Zadeh | A61B 5/165 706/52 |
| 2014/0207962 | A1 * | 7/2014 | Makofsky | H04L 65/60 709/231 |
| 2014/0285521 | A1 * | 9/2014 | Kimura | G06F 3/147 345/633 |
| 2015/0154847 | A1 * | 6/2015 | Oliver | G08B 21/0247 340/686.6 |
| 2015/0156567 | A1 * | 6/2015 | Oliver | G08B 21/0227 340/870.07 |
| 2016/0150362 | A1 * | 5/2016 | Shaprio | G08B 21/0453 340/539.13 |
| 2016/0170998 | A1 * | 6/2016 | Frank | G06Q 30/0251 707/748 |
| 2016/0323236 | A1 * | 11/2016 | Renaud | H04W 4/021 |
| 2017/0352069 | A1 * | 12/2017 | DeLuca | H04L 67/306 |
| 2018/0204111 | A1 * | 7/2018 | Zadeh | G06N 3/0436 |
| 2019/0066126 | A1 * | 2/2019 | Mehta | H04W 4/02 |

FOREIGN PATENT DOCUMENTS

| | | |
|---|---|---|
| EP | 2740083 A1 | 6/2014 |
| JP | 2005-251170 A | 9/2005 |
| JP | 2009-295067 A | 12/2009 |
| JP | 2010-287059 A | 12/2010 |
| JP | 2013-222231 A | 10/2013 |
| JP | 2014-006842 A | 1/2014 |
| JP | 2014-102417 A | 6/2014 |
| JP | 2015-219607 A | 12/2015 |
| JP | 2016-057862 A | 4/2016 |
| WO | 2014/002358 A1 | 1/2014 |
| WO | WO-2015089659 A1 * | 6/2015 ............ H04L 51/20 |
| WO | 2016/002284 A1 | 1/2016 |

OTHER PUBLICATIONS

• The Exploratory Advanced Research Program. "Wearable Sensors in Transportation—Exploratory Advanced Research Program Initial Stage Investigation." (Mar. 2016). Retrieved online Mar. 5, 2022. https://www.fhwa.dot.gov/publications/research/ear/16034/16034.pdf (Year: 2016).*

"7notes mini (J) for iPhone", iPhone Magazine, vol. 16, 2011 MetaMoJi Corp., 05 pages.

International Search Report and Written Opinion of PCT Application No. PCT/JP2017/022772, dated Jul. 25, 2017, 10 pages of ISRWO.

"Introducing the application of interest in this Month", iPhone Magazine, San-ei Shobo Publishing, vol. 16, No. 1, Jul. 19, 2011, 05 pages.

Office Action for JP Patent Application No. 2018-526012, dated Mar. 23, 2021, 05 pages of English Translation and 04 pages of Office Action.

"It is an attention application of No. 1 this month Introduction", IPhone Magazine, San-ei Shobo, Inc., vol. 16, Jul. 19, 2011, 03 pages.

Office Action for JP Patent Application No. 2018-526012, dated Mar. 22, 2022, 02 pages of English Translation and 02 pages of Office Action.

* cited by examiner

| ID | Time | Latitude | Longitude |
|----|------|----------|-----------|
| 1 | 2016/4/11 18:20:42 | 35.664521 | 139.703005 |
| 2 | 2016/4/11 18:50:03 | 35.664620 | 139.703476 |
| 3 | 2016/4/11 19:20:31 | 35.664069 | 139.703358 |

| ID | Time | Latitude | Longitude |
|---|---|---|---|
| 1 | 2016/4/11 18:20:42 | 35.664521 | 139.703005 |
| 2 | 2016/4/11 18:30:42 | 35.664521 | 139.703005 |
| 3 | 2016/4/11 18:40:42 | 35.664521 | 139.703005 |
| 4 | 2016/4/11 18:50:42 | 35.664620 | 139.703476 |
| 5 | 2016/4/11 19:00:42 | 35.664620 | 139.703476 |
| 6 | 2016/4/11 19:10:42 | 35.664400 | 139.703602 |
| 7 | 2016/4/11 19:20:42 | 35.664069 | 139.703358 |

| Signboard ID | Installation location | Signboard image | Community member |
|---|---|---|---|
| 1 | 35.664521 139.703005 | 1234567.jpeg | ID123, ID234, ID345, ... |
| 2 | | | |
| 3 | | | |
| 4 | | | |
| 5 | | | |
| 6 | | | |
| 7 | | | |

FIG. 22

| User ID | Photographing time | Position (latitude, longitude) | Height | Photographing direction | Sticking position (Coordinates) | Photographed image |
|---|---|---|---|---|---|---|
| 1 2 3 4 | 2016/6/30 9:15:30 | 34.555555 119.000001 | 1777 | 50 | 111, 222, 333 | aa11.jpeg |
| 5 6 7 8 | 2016/6/30 9:15:45 | 35.888889 138.000002 | 1666 | 150 | 444, 555, 666 | bb22.jpeg |
| ... | ... | ... | ... | ... | ... | ... |

FIG. 63

| User ID | Sticking time | Position (latitude, longitude) | Height | Direction | Sticking position (Coordinates) | Content |
|---|---|---|---|---|---|---|
| 1 2 3 4 | 2016/6/30 9:15:30 | 34.555555 119.000001 | 1777 | 50 | 111, 222, 333 | cc33.text |
| 5 6 7 8 | 2016/6/30 9:15:45 | 35.888889 138.000002 | 1666 | 150 | 444, 555, 666 | dd44.mp3 |
| ... | ... | ... | ... | ... | ... | ... |

FIG. 64

INFORMATION PROCESSING SYSTEM, RECORDING MEDIUM, AND INFORMATION PROCESSING METHOD

CROSS REFERENCE TO RELATED APPLICATIONS

This application is a U.S. National Phase of International Patent Application No. PCT/JP2017/022772 filed on Jun. 21, 2017, which claims priority benefit of Japanese Patent Application No. JP 2016-133048 filed in the Japan Patent Office on Jul. 5, 2016. Each of the above-referenced applications is hereby incorporated herein by reference in its entirety.

TECHNICAL FIELD

The present technology relates to an information processing system, a recording medium, and an information processing method, and more particularly, to an information processing system, a recording medium, and an information processing method which are capable of transmitting information to persons who are considered to be worthy of the transmission.

BACKGROUND ART

In recent years, a social networking service (SNS) has been widely used as a communication tool. Not only individuals but also companies, shops, and the like can distribute information to non-specific persons and specific persons who are so-called followers by using the SNS.

Basically, the followers who become information distribution destinations are persons who are interested in companies or shops which are distribution sources. The companies or the shops can effectively transfer an advertisement and the like to persons who have interest by distributing information to the persons.

Patent Literature 1 discloses a system that specifies a correlation between a user who views an advertisement displayed on an electronic signboard and a user who purchases goods from an image photographed by a plurality of cameras which are arranged in a shop, and evaluates an advertisement effect. In the system, in correspondence with specific purchase environment (event days, summer days, rainy days), a route, along which shoppers are highly likely to move, is estimated, or age groups of shoppers who are in the shop in a predetermined day of the week or at a predetermined time are specified, and advertisements can be switched in correspondence with the age groups.

Patent Literature 2 discloses a technology in which a user of each client terminal confirms other nearby users on a map who are common in interest or taste, and performs communication with the users. In a server, matching of users is performed on the basis of position information of client terminals and attribute information of the users.

CITATION LIST

Patent Literature

Patent Literature 1: JP-A-2005-251170
Patent Literature 2: JP-A-2014-102417

DISCLOSURE OF INVENTION

Technical Problem

With regard to the information distribution using the SNS, it can be said that a range of information is likely to broaden, but a value of the information is likely to fade away in order for everyone to easily become followers. Fading away of the value of information occurs due to transformation of the information to persons who have little interest in distribution sources and are not worthy of the transmission.

The present technology has been made in consideration of such circumstances, and an object thereof is to transmit information to persons who are considered to be worthy of the transmission.

Solution to Problem

According to an aspect of the present technology, there is provided an information processing system including: a storage unit that stores position information indicating a position of a device of a user and date information at which position measurement is performed in correlation with each other; and a control unit that forms a community including users who leave a movement trajectory satisfying a predetermined condition at the periphery of a specific location on the basis of a user's movement history indicated by the stored information, and distributes a message input through a specific interface to users who pertain to the community.

In an aspect of the present technology, position information indicating a position of a device of a user and date information at which position measurement is performed are stored in the storage unit in correlation with each other, and a community including users who leave a movement trajectory satisfying a predetermined condition at the periphery of a specific location is formed on the basis of a user's movement history indicated by the stored information. In addition, a message input through a specific interface is distributed to users who pertain to the community.

Advantageous Effects of Invention

According to the present technology, it is possible to transmit information to persons who are considered to be worthy of the transmission.

Note that, the effect described herein is not limited, and may be any one effect described in this disclosure.

BRIEF DESCRIPTION OF DRAWINGS

FIG. 22 is a view illustrating an example of information that is managed by the management server.

FIG. 63 is a view illustrating an example of photographed image information that is registered in a content DB.

FIG. 64 is a view illustrating an example of information of AR content registered in the content DB.

MODE(S) FOR CARRYING OUT THE INVENTION

Hereinafter, modes for carrying out the present technology will be described. Description will be made in the following order.
- First Embodiment: Information Distribution to Community Formed by Marking
- Second Embodiment: Advertisement Providing Method
- Third Embodiment: Additive Function of Electronic Signboard
- Fourth Embodiment: Tunnel Map
- Modification Example

First Embodiment: Information Distribution to Community Formed by Marking

Figure 1:
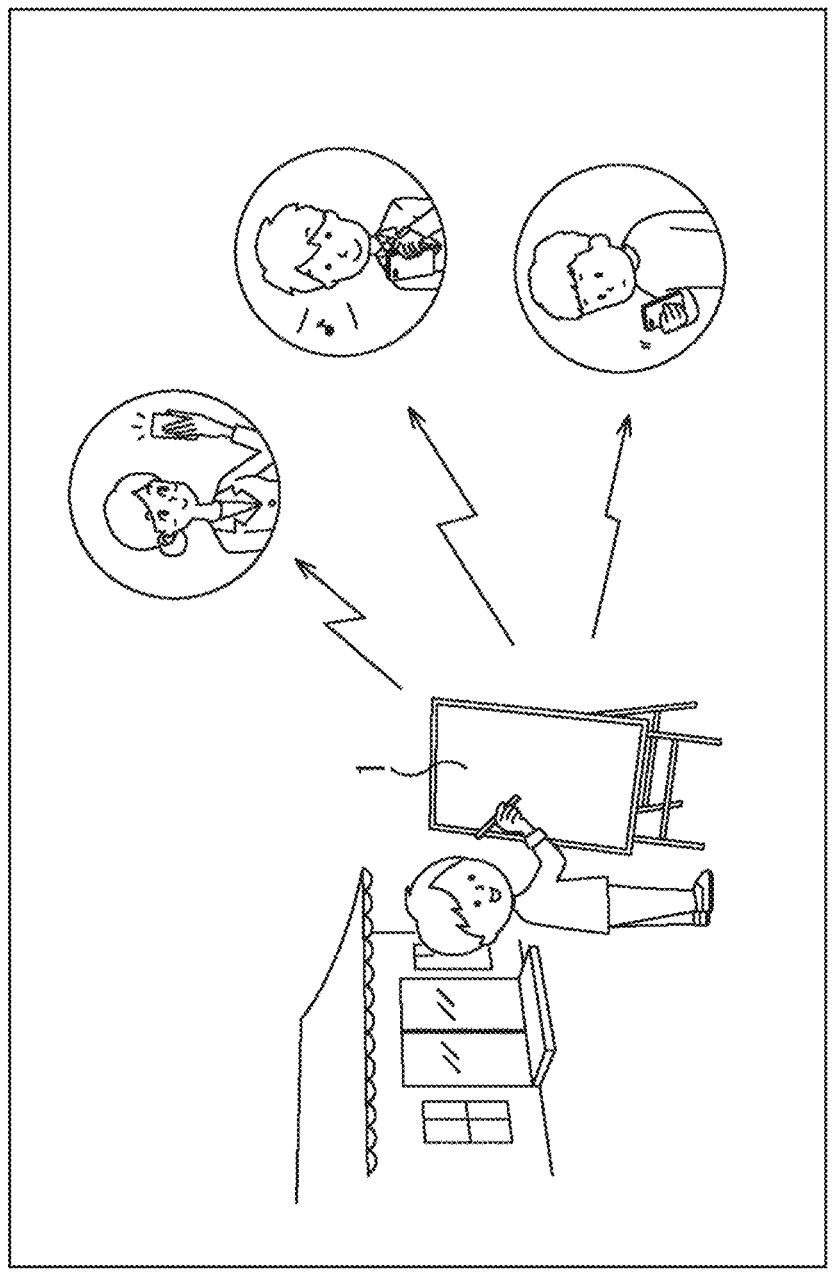
FIG. 1 is a view illustrating an example of information distribution using an electronic signboard according to an embodiment of the present technology.

FIG. 1 is a view illustrating an example of information distribution using an electronic signboard according to an embodiment of the present technology.

An electronic signboard 1 is a device including a large-sized display. The electronic signboard 1 is installed, for example, at a location, which faces a road, such as in front of a shop so that passengers can view display of the display.

It is assumed that an installation location of the electronic signboard 1 is an arbitrary outdoor location including not only the periphery of a building such as a shop, but also the end of a road, a park, and an inner wall. The electronic signboard 1 may be installed at arbitrary indoor location such as the inside of a shop, a passage of a shopping mall, and the inside of a station. In this manner, the electronic signboard 1 is installed at an arbitrary location by an owner.

A touch sensor is provided in the display of the electronic signboard 1. As illustrated in FIG. 1, a person close to the electronic signboard 1 can write characters, a figure, and the like on the electronic signboard 1 by using a touch pen.

In a case where writing with respect to the electronic signboard 1 is performed, the content of the writing is distributed to portable terminals such as a portable telephone and a tablet terminal which are carried by members of a community. A device that becomes a distribution destination of the content of the writing may be a head mounted display (HMD), a wrist timepiece type wearable device, and the like. The members of the community can confirm the content that is written on the electronic signboard 1 by an owner of the electronic signboard 1, other members, and the like by operating a portable terminal of each of the members.

Here, the community that becomes the distribution destination of the writing is formed by persons who performed marking in the vicinity of the electronic signboard 1. The marking is an action that is performed by operating a portable terminal when a user is at an interested specific location. The marking may be automatically performed by the portable terminal without depending on the operation by the user.

In a case where the electronic signboard 1 is installed in front of a shop, a community is formed by persons who frequently utilize the shop, persons who perform marking when utilizing the shop, persons who do not utilize the shop but are interested in the shop and perform marking when passing through the vicinity of the shop, and the like. The community is formed when persons who pay attention to an installation location of the electronic signboard 1 gather, and is associated with the installation location of the electronic signboard 1.

It is necessary to actually visit the shop so as to be members of the community. Accordingly, it can be said that the members of the community have strong interest or consideration on the shop in comparison to persons who are only aware of the shop over the Internet or persons who visit the shop a few times. When information are shared by only the members, a person who performs writing on the electronic signboard 1 can transmit a message to only persons who are worthy of the transmission.

That is, a person who performs writing can transmit a message only to persons who have common sense of value by using the electronic signboard 1. In the case of transmitting the information to a lot of non-specific persons, the information is also transmitted to persons who are not interested in the information, and the value of the information is lowered. However, it is possible to prevent this situation, and it is possible to raise the value of the information. In addition, in the case of transmitting a notification and the like, there is a concern that an opposition to the notification content may be raised from persons who do not accept the notification and the like. However, it is also possible to prevent this situation.

Similar to an area in which there are many coffeehouses, a road on which interior shops are in parallel to each other, shops of specific type fashion are in parallel to each other, and the like, there is a characteristic road or a characteristic location in which persons having a common taste gather. Since persons having a common taste gather, it can be said that the road or the location is valuable.

When information is allowed to be shared at the valuable road or location by using the electronic signboard 1, respective members can obtain valuable information. In addition, peoples who aim to come to the road or the location increase, and thus it is also possible to improve the value of the road or the location.

In addition, when companies and the like distribute advertisements to persons who have a common taste by using the electronic signboard 1, efficient advertisements are possible.

Operations of respective devices which include community formation and information distribution will be described later with reference to flowcharts.

Figure 2:
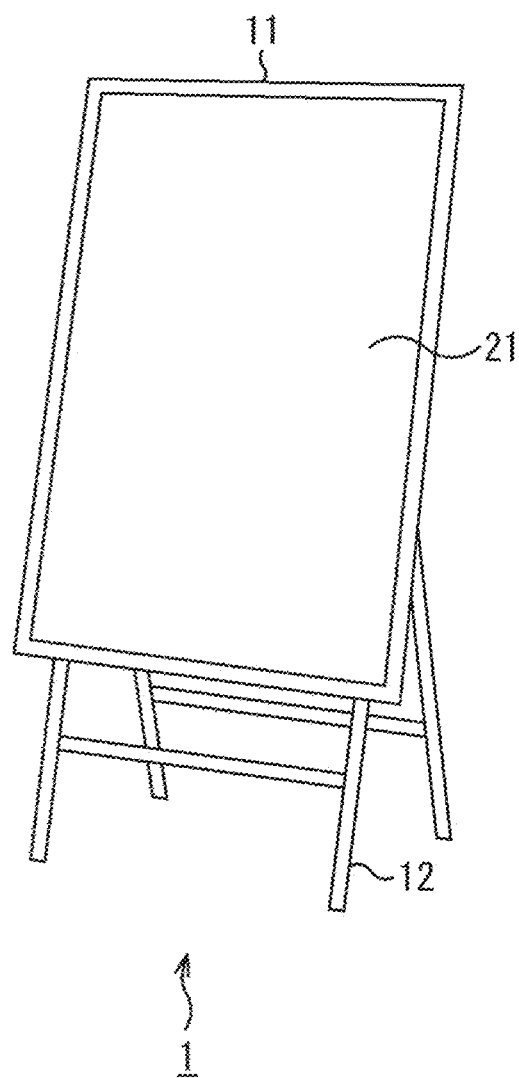
FIG. 2 is a view illustrating an example of an external appearance of the electronic signboard.

FIG. 2 is a view illustrating an example of an external appearance of the electronic signboard 1.

The electronic signboard 1 includes a display section 11 and an easel section 12. The display section 11 is fixed to the easel section 12 so that a front surface faces an upper side in a slightly inclined manner. A display 21 such as a liquid crystal display (LCD) is provided on the front surface of the display section 11. As described above, a touch sensor as an input unit is provided in the display 21 in a stacked manner.

A user can write characters, a figure, and the like on the display 21 by using a touch pen. Writing with respect to the display 21 may be performed by directly pressing a surface of the display 21 with a finger, or may be performed by using a portable terminal.

In the case of performing writing by using the portable terminal, for example, the electronic signboard 1 and the portable terminal of the user who performs writing are connected through radio communication. Information of characters or a figure which is input by the user through contacting with a display of the portable terminal is transmitted from the portable terminal to the electronic signboard 1, and the same content is displayed on the display 21 of the electronic signboard 1. In this manner, writing of information is performed.

In addition to a figure and characters, a file of image data, voice data, or text data may be written on the electronic signboard 1. The image includes a moving image and a still image. For example, in a case where the user selects an image file or a voice file on the portable terminal, the selected file is transmitted to the electronic signboard 1. In the electronic signboard 1, an image indicating the transmitted file is displayed at a predetermined position of the display 21. According to this, writing of the image file or the voice file is performed.

Figure 3:
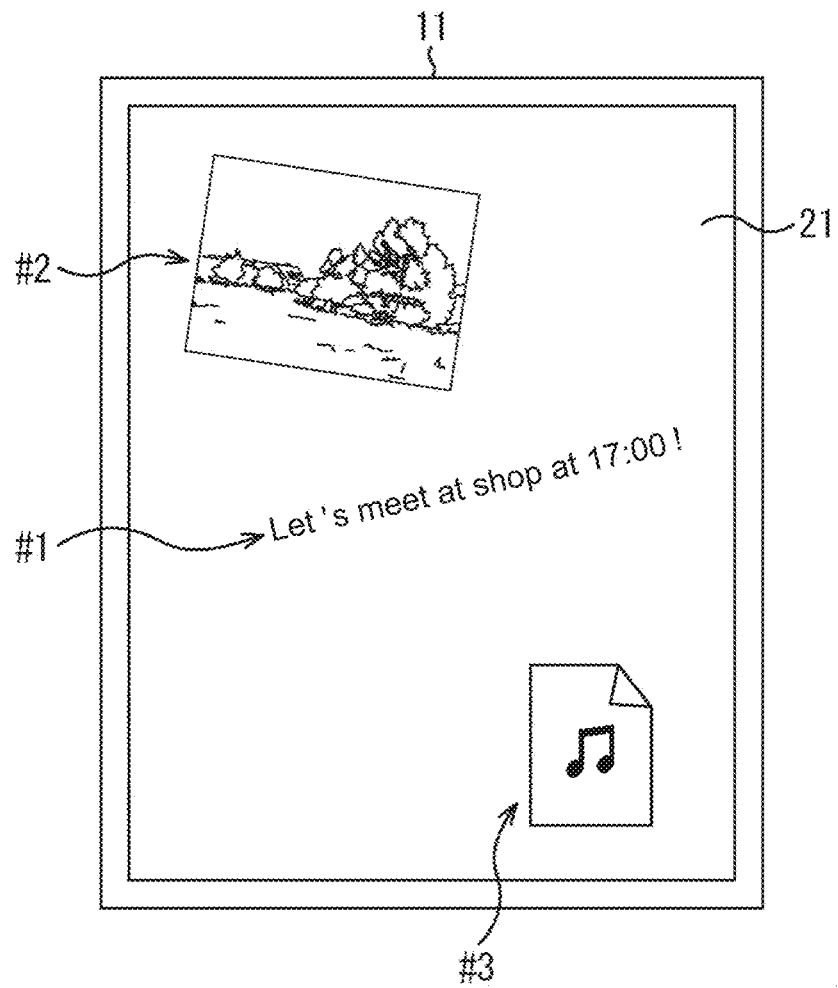
FIG. 3 is a view illustrating an example of writing with respect to the electronic signboard.

FIG. 3 is a view illustrating an example of writing with respect to the electronic signboard 1.

In the example illustrated in FIG. 3, writing #1 is input to approximately the center of the display 21. In addition, writing #2 is input on an upper side of the writing #1, and writing #3 is input on a lower side of the writing #1.

The writing #1 is writing of handwriting characters input by using the touch pen and the like. In the example of FIG. 3, characters of "let's meet at the shop at 17:00!" are input.

For example, the writing #2 is writing of a still image. In a case where an operation of pressing the image of the writing #2 is performed, the still image may be displayed on the display 21 in an enlarged manner.

The writing #3 is writing of voice. An image indicating a voice file of the writing #3 is displayed on the display 21. In a case where an operation of pressing the image indicating the voice file is performed, voice of the writing #3 is reproduced by the electronic signboard 1.

Distribution of writing with respect to community members is performed, for example, by transmitting all of the images on the display 21. The same screen as that is displayed on the electronic signboard 1 is displayed on a display of portable terminals of the members.

As described above, not only writing of the handwriting characters and the figure but also writing of the image and the voice is performed with respect to the electronic signboard 1. Note that, the handwriting characters or the figure includes various pieces of information such as digits and symbols which are capable of being drawn. Hereinafter, description will be mainly given of a case where writing of handwriting characters or a figure is distributed.

<1. Example of Performing Information Distribution with Individual Electronic Signboard>

Description will be given of a configuration and an operation in a case where an information processing system is realized by the above-described electronic signboard 1. As will be described later, the information processing system to which the present technology is applied can also be realized by using a server on a network.

<1-1: Configuration of Respective Devices>

Figure 4:
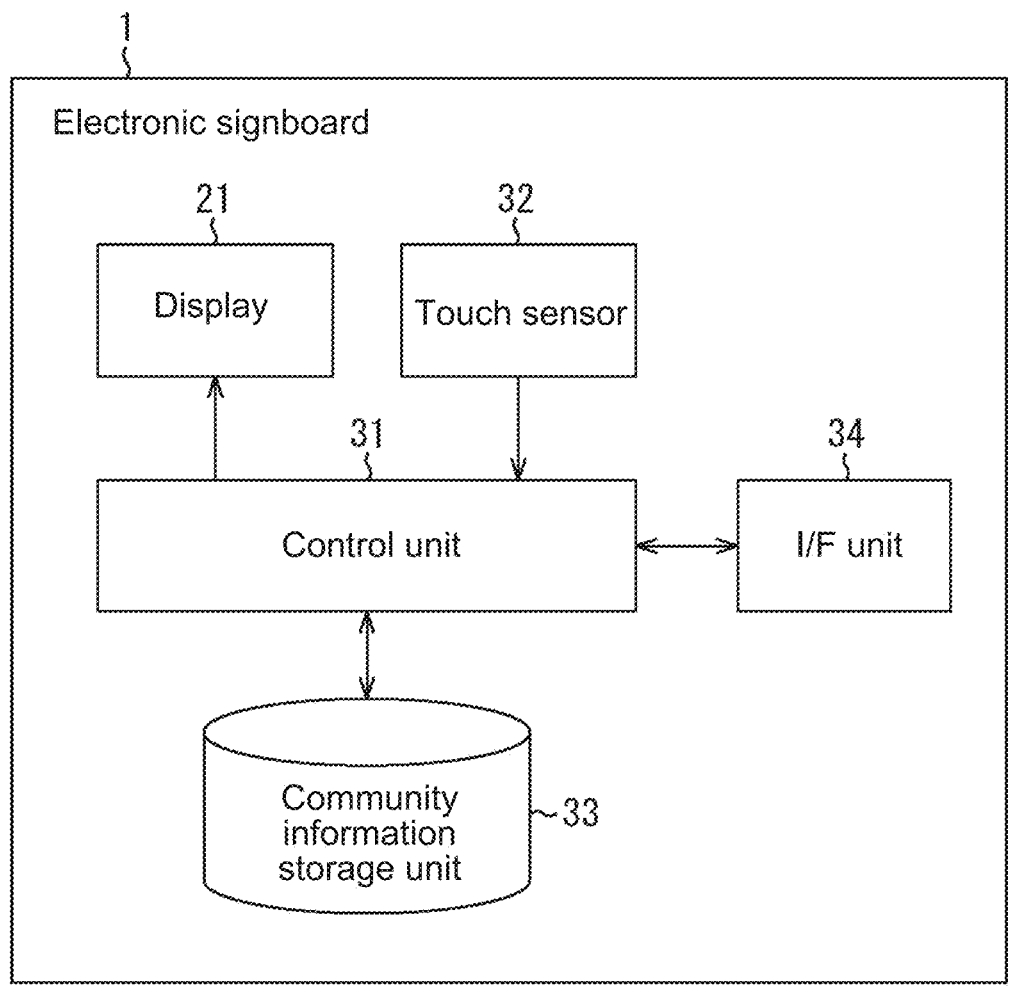
FIG. 4 is a block diagram illustrating a configuration example of the electronic signboard.

FIG. 4 is a block diagram illustrating a configuration example of the electronic signboard 1.

The electronic signboard 1 has a configuration in which the display 21, a touch sensor 32, a community information storage unit 33, and an I/F unit 34 are connected to a control unit 31.

The control unit 31 includes a central processing unit (CPU), a read only memory (ROM), a random access memory (RAM), and the like. The control unit 31 allows the CPU to execute a predetermined program and controls an entire operation of the electronic signboard 1.

The touch sensor 32 detects a user's operation with respect to the surface of the display 21, and outputs a signal indicating the user's operation to the control unit 31.

The community information storage unit 33 is constituted by a hard disk drive (HDD) or a solid state drive (SSD). The community information storage unit 33 stores community information that is information related to community members. For example, the community information includes a user ID that is identification information of each member, an existing account of a social networking service (SNS), and the like.

The I/F unit 34 is an interface of a short-range radio communication such as Bluetooth (registered trademark) and wireless local area network (LAN), and an interface of a radio communication through wide area network (WAN). The I/F unit 34 performs communication with external devices such as portable terminals of community members.

Figure 5:
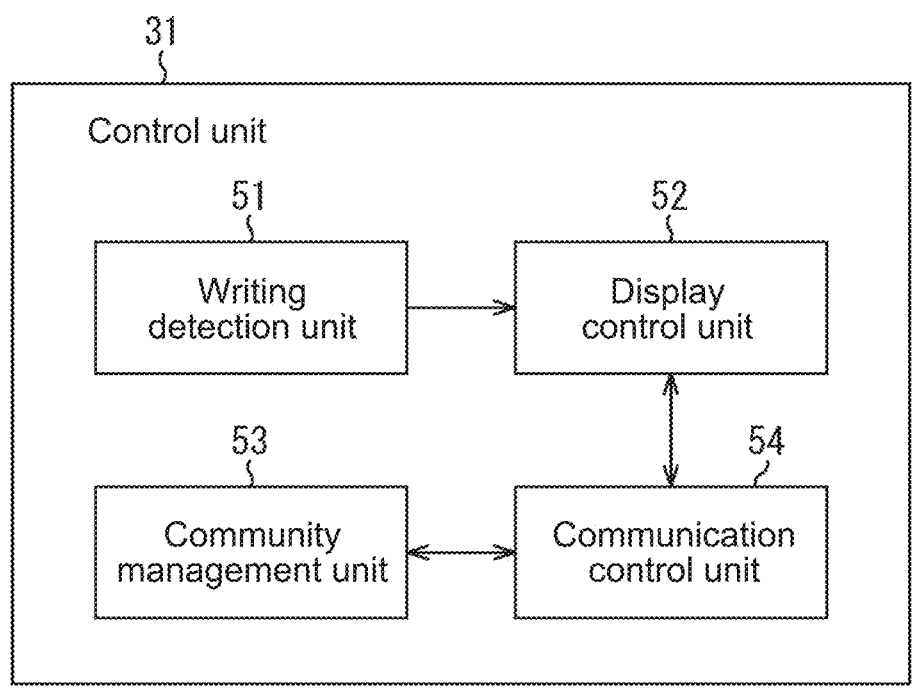
FIG. 5 is a block diagram illustrating a functional configuration example of a control unit in FIG. 4.

FIG. 5 is a block diagram illustrating a functional configuration example of the control unit 31. At least a part of functional units illustrated in FIG. 5 is realized when a predetermined program is executed by the CPU of the control unit 31.

The control unit 31 includes a writing detection unit 51, a display control unit 52, a community management unit 53, and a communication control unit 54.

The writing detection unit 51 detects writing of a user on the basis of an output of the touch sensor 32. The writing detection unit 51 outputs information indicating the content of the writing, which includes a writing position, to the display control unit 52.

The display control unit 52 controls display of the display 21. The display control unit 52 allows the display 21 to display handwriting characters or a figure on the basis of information that is supplied from the writing detection unit 51. In the case of distributing written information, the display control unit 52 outputs a signboard image, which is an image representing the entire display content of the display 21, to the communication control unit 54.

The community management unit 53 forms a community on the basis of a marking history that is supplied from portable terminals, and is received by the communication control unit 54. In addition, the community management unit 53 stores the community information in the community information storage unit 33, and manages community members. When distributing the signboard image, the community management unit 53 reads out information related to the community members from the community information storage unit 33, and outputs the information to the communication control unit 54.

The communication control unit 54 controls the I/F unit 34 to perform short-range radio communication with nearby portable terminals. For example, a marking history is acquired through the radio communication with the portable terminals. In addition, the communication control unit 54 controls the I/F unit 34 to perform communication with various devices including the portable terminals through the Internet. Information exchange between respective units of the control unit 31 and the external devices is performed through the communication control unit 54.

Figure 6:
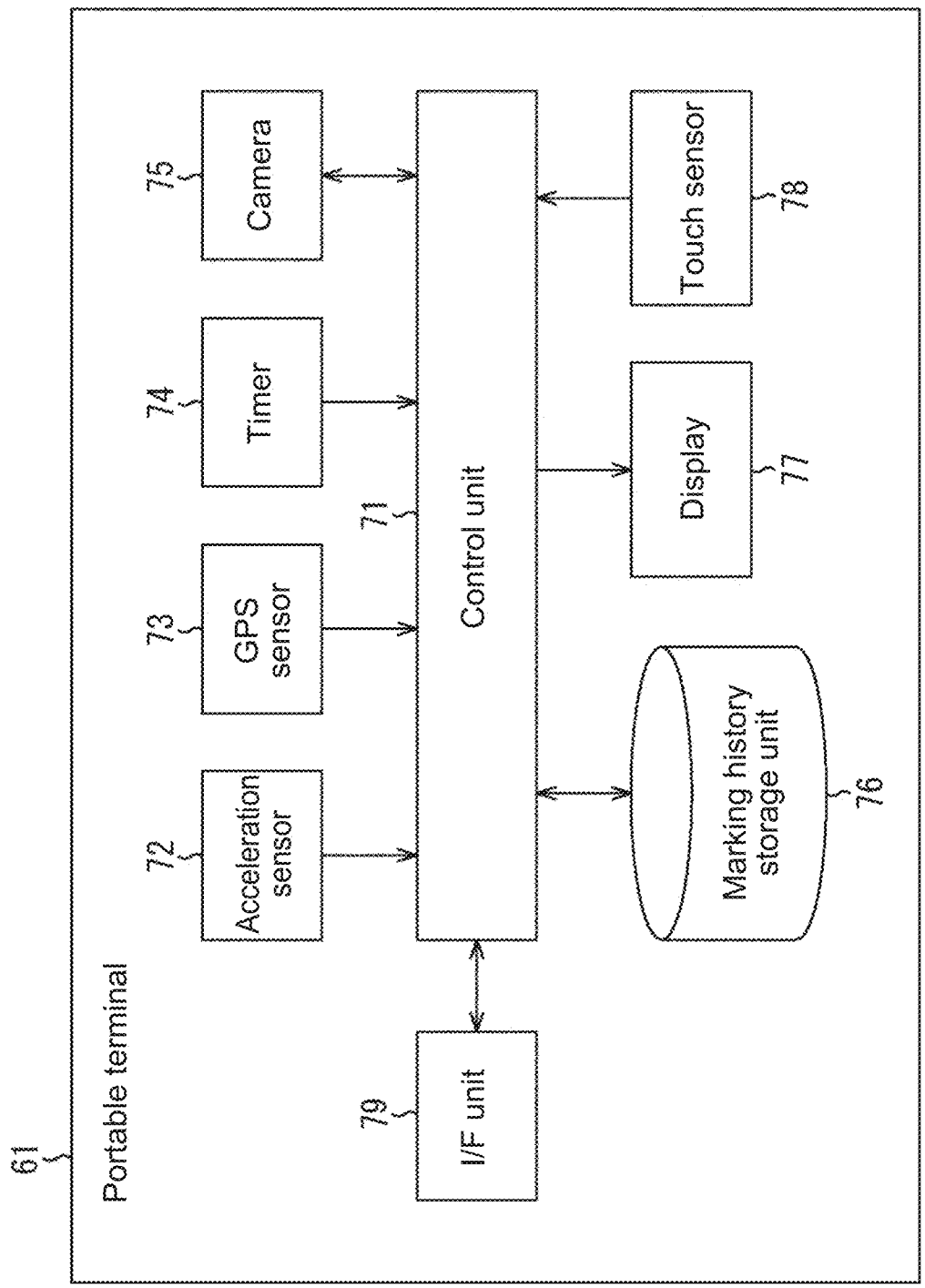
FIG. 6 is a block diagram illustrating a configuration example of a portable terminal.

FIG. 6 is a block diagram illustrating a configuration example of the portable terminals.

A portable terminal 61 has a configuration in which an acceleration sensor 72, a GPS sensor 73, a timer 74, a camera 75, a marking history storage unit 76, a display 77, a touch sensor 78, and an I/F unit 79 are connected to a control unit 71.

The control unit 71 includes a CPU, a ROM, a RAM, and the like. The control unit 71 allows the CPU to execute a predetermined program, and controls an entire operation of the portable terminal 61.

The acceleration sensor 72 repetitively detects acceleration and outputs information indicating the detected acceleration to the control unit 71.

The GPS sensor 73 repetitively performs measurement of a position, and outputs information of a current position to the control unit 71.

The timer 74 outputs information of a current time to the control unit 71.

For example, the camera 75 is provided on a rear surface of a casing of the portable terminal 61. The camera 75 outputs a photographed image to the control unit 71.

The marking history storage unit 76 is constituted by a flash memory or the like, and stores a marking history. A position and a time at which marking is performed are recorded in the marking history in correlation with each other. The marking history storage unit 76 functions as a storage unit that stores the position and the time at which marking is performed in correspondence with each other.

The display 77 is constituted by an LCD and the like. The display 77 displays various pieces of information such as a signboard image, and an image photographed by the camera 75.

The touch sensor 78 is provided in a state of being stacked on the display 77. The touch sensor 78 detects a user's operation with respect to a surface of the display 77, and outputs a signal indicating the user's operation to the control unit 71.

The I/F unit 79 is an interface of a short-range radio communication such as Bluetooth (registered trademark) and wireless LAN, and an interface of radio communication using mobile communication system (WAN) such as 3G and 4G. The I/F unit 79 performs communication with external devices such as the electronic signboard 1.

Figure 7:
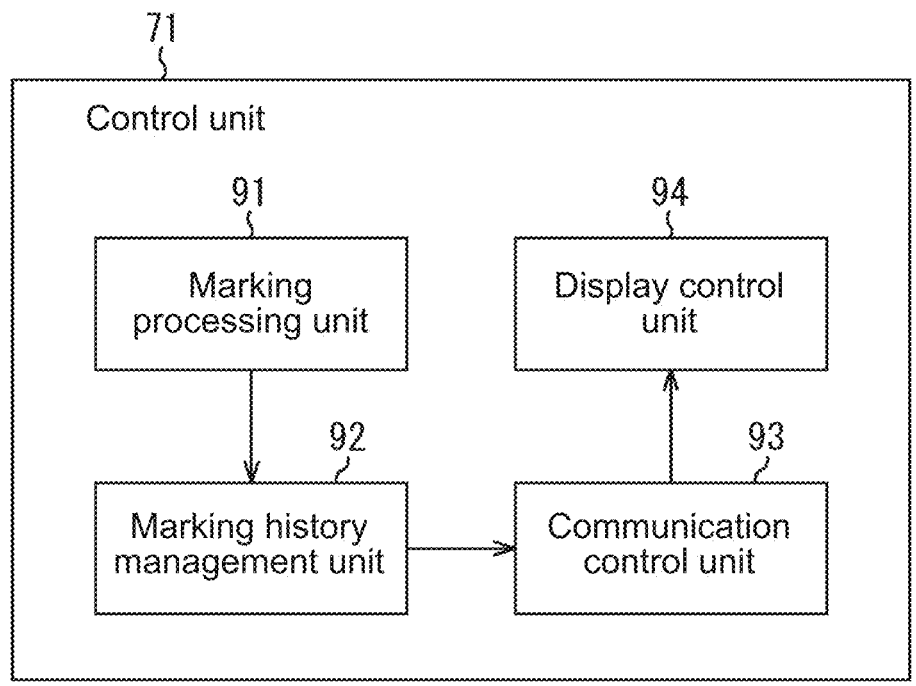
FIG. 7 is a block diagram illustrating a functional configuration example of a control unit in FIG. 6.

FIG. 7 is a block diagram illustrating a functional configuration example of the control unit 71. At least a part of functional units illustrated in FIG. 7 is realized when a predetermined program is executed by the CPU of the control unit 71.

The control unit 71 includes a marking processing unit 91, a marking history management unit 92, a communication control unit 93, and a display control unit 94.

The marking processing unit 91 acquires information of the current position measured by the GPS sensor 73 at a timing at which marking is performed, and the current time output from the timer 74. The marking processing unit 91 outputs the acquired information of the current position and the current time to the marking history management unit 92 in correlation with each other.

The marking history management unit 92 manages the marking history stored in the marking history storage unit 76. For example, the marking history management unit 92 records the current position and the current time, which are supplied from the marking processing unit 91, in correlation with each other to update the marking history. In addition, in a case where the electronic signboard 1 makes a request for the marking history, the marking history management unit 92 reads out the marking history from the marking history storage unit 76, and outputs the marking history to the communication control unit 93.

The communication control unit 93 controls the I/F unit 79 to perform short-range radio communication with the electronic signboard 1. In addition, the communication control unit 93 controls the I/F unit 79 to perform communication with various devices through the Internet. For example, the communication control unit 93 receives a signboard image transmitted from the electronic signboard 1, and outputs the signboard image to the display control unit 94. Information exchange between respective units of the control unit 71 and external devices is performed through the communication control unit 93.

The display control unit 94 controls display of the display 77. For example, the display control unit 94 allows the display 77 to display the signboard image supplied from the communication control unit 93.

<1-2: Marking Processing>

Here, description will be given of a flow of marking that becomes the cause for community formation. For example, the marking is performed manually in correspondence with a user's operation or automatically by the portable terminal 61 when a user of the portable terminal 61 moves along a street on foot or by a bicycle.

<1-2-1: Manual Marking>

Figure 8:
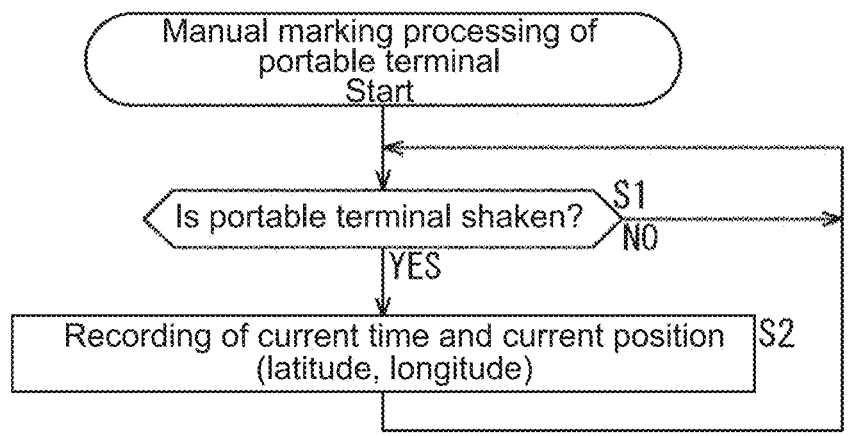
FIG. 8 is a flowchart illustrating manual marking processing of the portable terminal.

First, description will be given of manual marking processing of the portable terminal 61 with reference to a flowchart of FIG. 8.

The manual marking processing is processing that is performed in a case where a user explicitly performs an operation for marking in a state in which a marking application is activated. For example, an operation of shaking the casing of the portable terminal 61, an operation of tapping a predetermined position of the display 77, and the like are set in advance as an operation for marking.

In step S1, the marking processing unit 91 of the portable terminal 61 determines whether or not the terminal is shaken. For example, in a case where acceleration equal to or greater than a threshold value is detected by the acceleration sensor 72, it is determined that the terminal is shaken. Description is made on the assumption that marking is performed when shaking the portable terminal 61, but manual marking may be performed in correspondence with another operation.

In a case where it is determined in step S1 that the terminal is shaken, in step S2, the marking processing unit 91 outputs information of a current position and information of a current time to the marking history management unit 92 to be recorded in the marking history. The information of the current time and the information of the current position are recorded by the marking history management unit 92 in correlation with each other. Then, the processing subsequent to step S1 is repeated.

Figures 9, 10:
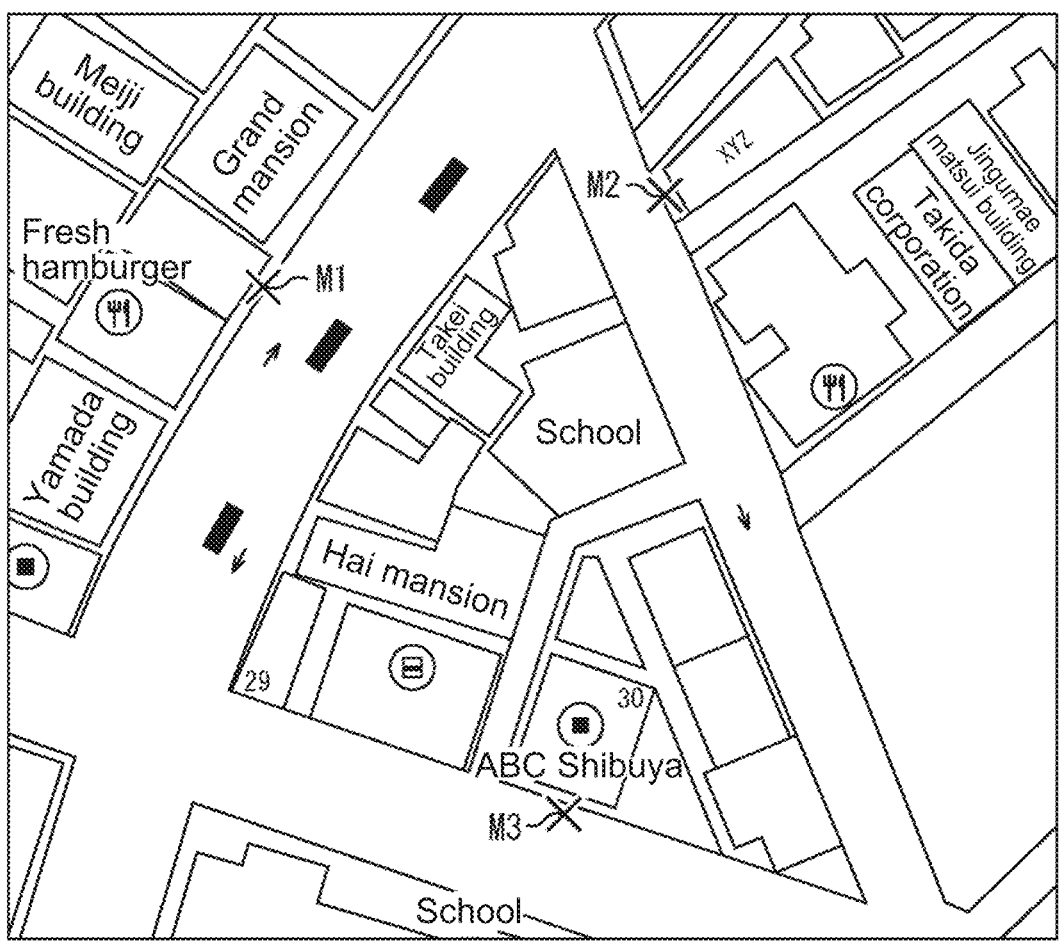
FIG. 9 is a view illustrating an example of a marking history.
FIG. 10 is a view illustrating a marking point on a map.

FIG. 9 is a view illustrating an example of the marking history.

In the example of FIG. 9, three pieces of marking information ID1, ID2, and ID3 are recorded. Each of the three pieces of marking information is information in which a time and a position expressed by a latitude and a longitude are correlated with each other.

For example, each of the three pieces of marking information in FIG. 9 is information that is recorded after performing marking at each position of marking points M1 to M3 on a map in FIG. 10. The positions of the marking points M1 to M3 are positions at which marking is performed when the user of the portable terminal 61 finds a favorite shop during moving, and the like.

The upper limit of the number of times of marking capable of being performed in a day may be set, or a time (marking interval) until next marking is performed may be set. According to this, marking can be performed only with respect to a location in which the user is highly interested.

<1-2-2: Automatic Marking>

Next, description will be given of automatic marking processing of the portable terminal 61 with reference to a flowchart of FIG. 11.

The automatic marking processing is processing that is automatically performed without depending on a user's operation in a state in which the marking application is activated.

In step S11, the marking processing unit 91 of the portable terminal 61 determines whether or not a certain time has elapsed after performing marking.

In a case where it is determined in step S11 that a certain time has elapsed, in step S12, the marking processing unit 91 outputs information of a current position and information of a current time to the marking history management unit 92 to be recorded in the marking history. Then, the processing subsequent to step S11 is repeated.

Figures 11, 12:
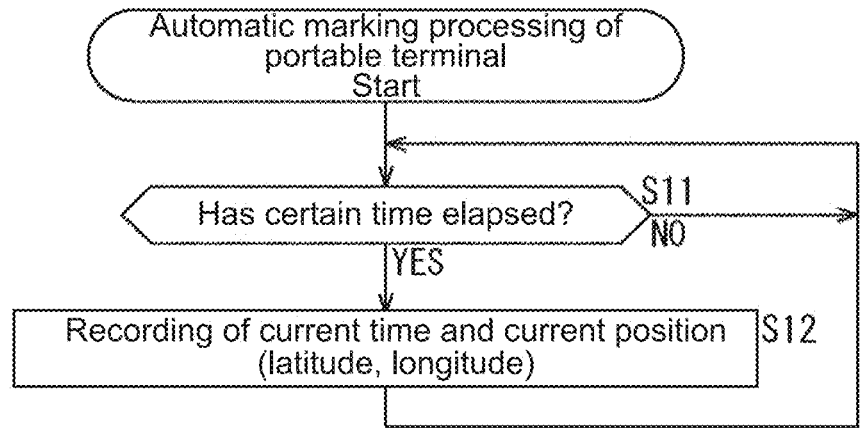
FIG. 11 is a flowchart illustrating automatic marking processing of the portable terminal.
FIG. 12 is a view illustrating another example of the marking history.

FIG. 12 is a view illustrating another example of the marking history.

In the example of FIG. 12, seven pieces of marking information ID1 to ID7 are recorded. The seven pieces of marking information in FIG. 12 are information that is recorded by periodically performing marking at an interval of 10 minutes. For example, each of the seven pieces of marking information ID1 to ID7 is information that is recorded after marking is performed at each position of marking points M11 to M17 on a map in FIG. 13.

Figure 13:
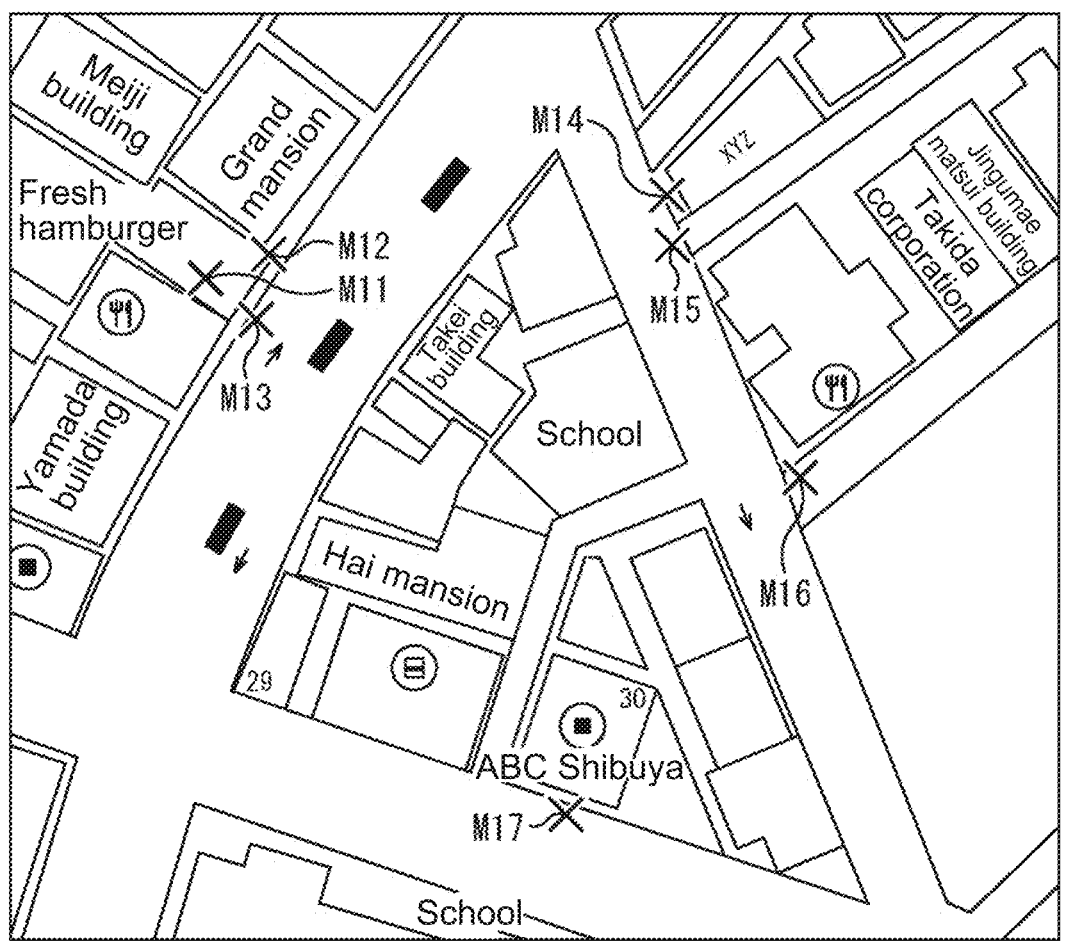
FIG. 13 is a view illustrating a marking point on a map.

In FIG. 13, the marking points M11, M12, and M13 relate to the same position, and the marking points M14 and M15 relate to the position. In the automatic marking processing, marking is performed for every certain time, and thus the position of the marking points M11, M12, and M13, and the position of the marking points M14 and M15 are regarded as positions at which a user stays for a long time in comparison to other positions, that is, positions in which a user is interested.

The above-described manual marking or the automatic marking is performed by each of the portable terminals 61 of a plurality of users, and marking histories of the respective users are stored. The marking is performed during movement of the users, and thus the marking histories are also movement histories of the users. A trajectory that connects respective marking points in a time-series order on a map represents a movement trajectory of each of the users.

<1-3: Formation of Community>

Description will be given of communication formation processing that is performed between the electronic signboard 1 and the portable terminal 61 with reference to a sequence of FIG. 14.

Figure 14:
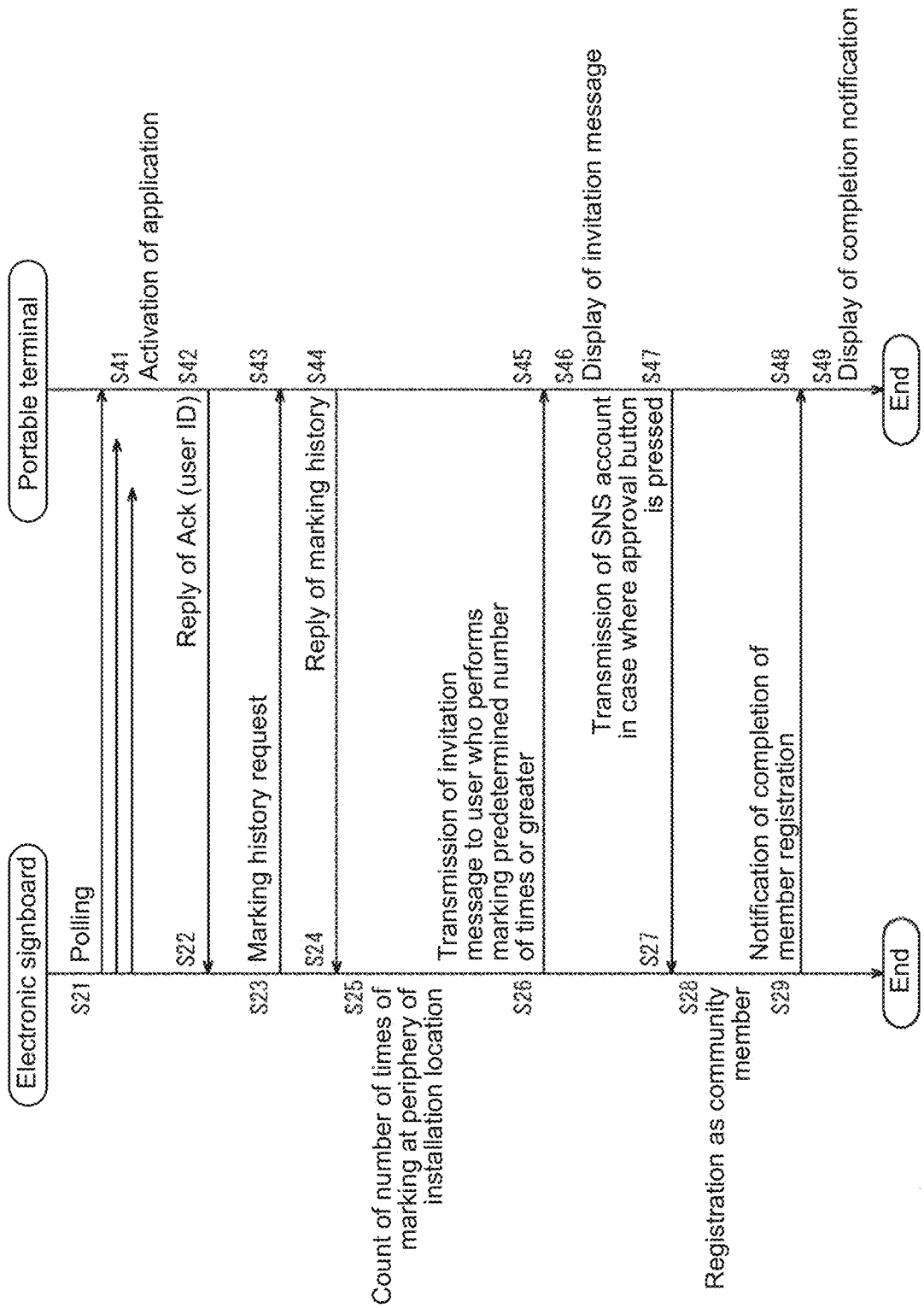
FIG. 14 is a sequence illustrating community forming processing.

The processing in FIG. 14 is initiated, for example, when the owner of the electronic signboard 1 puts the electronic signboard 1 at a specific location in front of the owner's shop. In an area including the location at which the electronic signboard 1 is installed, it is assumed that a user who performs marking at an arbitrary location exists.

In step S21, the community management unit 53 of the electronic signboard 1 performs polling, and performs retrieval of a nearby portable terminal 61. The polling is performed by using short-range radio communication such as Bluetooth (registered trademark) and a wireless LAN. Only a portable terminal 61 that exists in an arrival range of electric waves output from the I/F unit 34 receives the polling of the electronic signboard 1.

The polling may be performed through the Internet by using radio communication of WAN. Not only the polling but also at least a part of exchange illustrated in FIG. 14 may be performed through the Internet.

In step S41, the control unit 71 of the portable terminal 61 that receives the polling activates an application. Respective units of the control unit 71 in FIG. 7 are realized.

In step S42, the communication control unit 93 transmits information including a user ID that is set to the portable terminal 61 as Ack with respect to the polling.

In step S22, the communication control unit 54 of the electronic signboard 1 receives a response from the portable terminal 61.

In step S23, the communication control unit 54 makes a request for the portable terminal 61 that responds to the polling to transmit a marking history.

In step S43, the communication control unit 93 of the portable terminal 61 receives the request from the electronic signboard 1.

In step S44, the marking history management unit 92 reads out the marking history from the marking history storage unit 76, and transmits the marking history to the electronic signboard 1.

In step S24, the communication control unit 54 of the electronic signboard 1 receives the marking history transmitted from the portable terminal 61.

In step S25, the community management unit 53 counts the number of times of marking that is performed at the periphery of the installation location of the electronic signboard 1 with reference to the marking history that is transmitted from the portable terminal 61. Among the marking information included in the marking history, the number of pieces of marking information, which indicates that marking is performed in a predetermined range around the installation location of the electronic signboard 1, is counted. The installation location of the electronic signboard 1 may be detected by a GPS sensor (not illustrated) or may be set by the owner at the time of installation.

In step S26, in a case where a user of the portable terminal 61 that transmits the marking history performs marking a predetermined number of times or greater at the periphery of the installation location of the electronic signboard 1, the community management unit 53 transmits a community invitation message to the portable terminal 61. The number of times of marking, which becomes a selection reference of an invitation message transmission target, may be set in advance such as three or more times.

The number of times of marking, which becomes the selection reference of the invitation message transmission target, may be set by the owner of the electronic signboard 1. In this case, in the case of inviting community members widely, the owner of the electronic signboard 1 sets the number of times as the reference to be small, and in the case of inviting the community members narrowly, the owner set the number of times as the reference to be large.

In step S45, the communication control unit 93 of the portable terminal 61 receives the invitation message transmitted from the electronic signboard 1. The invitation message received by the communication control unit 93 is output to the display control unit 94.

In step S46, the display control unit 94 allows the display 77 to display the invitation message. An approval button that is operated when approving participation in a community, and the like are also displayed on the display 77 in combination with a message including a community name and the like. The user of the portable terminal 61 views the message displayed on the display 77, and operates the approval button when participating in the community.

In a case where the approval button is pressed, in step S47, the communication control unit 93 transmits an account of an SNS that is used by the user of the portable terminal 61 to the electronic signboard 1. In this case, information distribution from the electronic signboard 1 is performed by using a platform of an existing SNS such as Facebook (trademark) and Twitter (trademark). The information distribution may be performed by using another medium such as an electronic mail. In this case, information such as an address of the electronic mail and telephone numbers for specifying the portable terminal 61 is transmitted to the electronic signboard 1.

In step S27, the communication control unit 54 of the electronic signboard 1 receives information transmitted from the portable terminal 61.

In step S28, the community management unit 53 registers the user of the portable terminal 61 as a community member. Information such as a user ID, an account, and a marking history of the user who is newly added as the community member is recorded in the community information recorded in the community information storage unit 33.

In step S29, the community management unit 53 transmits a message for notification of completion of community member registration to the portable terminal 61.

In step S48, the communication control unit 93 of the portable terminal 61 receives the completion message transmitted from the electronic signboard 1. The completion message received by the communication control unit 93 is output to the display control unit 94.

In step S49, the display control unit 94 allows the display 77 to display the completion message transmitted from the electronic signboard 1, and terminates the processing.

Figure 15:
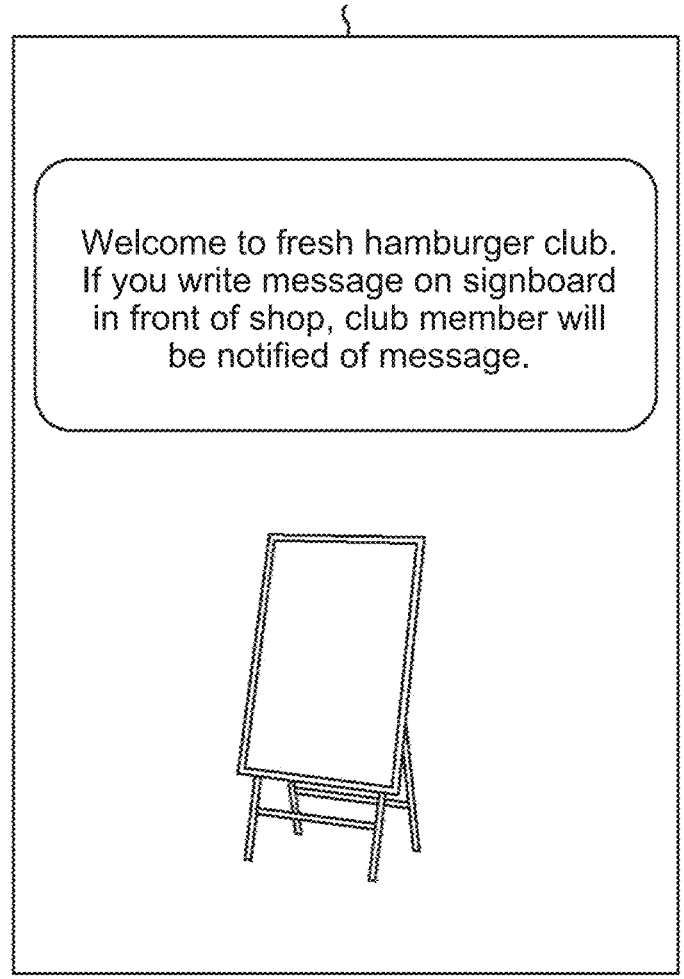
FIG. 15 is a view illustrating a display example of a completion message.

FIG. 15 is a view illustrating a display example of the completion message.

In the example in FIG. 15, a message, which guides that information can be distributed to other community members by performing writing on the electronic signboard 1, is displayed.

The above-described processing is performed between the electronic signboard 1 and a plurality of the portable terminals 61. According to this, a community, in which only a user who frequently visits the installation location of the electronic signboard 1 and performs marking is registered as a member, is formed.

<1-4: Information Distribution to Community Members>

Description will be given of distribution processing of the electronic signboard 1 with reference to a flowchart of FIG. 16.

Figure 16:
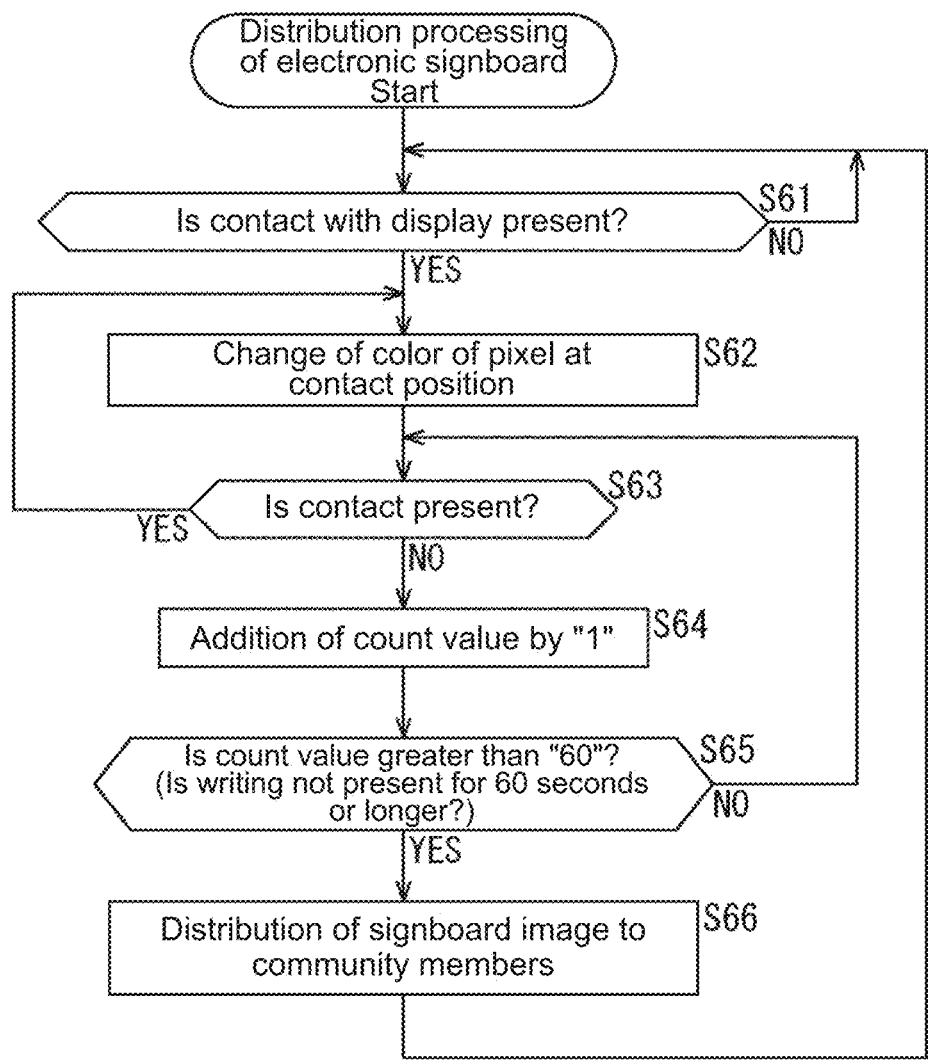
FIG. 16 is a flowchart illustrating distribution processing of the electronic signboard.

The processing in FIG. 16 is performed after the community is formed. In this example, in a case where writing is performed with respect to the electronic signboard 1, a signboard image representing the entire display content of the display 21 is distributed.

In step S61, the writing detection unit 51 determines whether or not contact with a surface of the display 21 is present on the basis of an output of the touch sensor 32, and waits until it is determined that contact is present.

In a case where it is determined in step S61 that contact with the display 21 is present, the processing proceeds to step S62. In a case where writing with respect to the display 21 is performed, information indicating a contact position is output from the writing detection unit 51 to the display control unit 52.

In step S62, the display control unit 52 changes a color of a pixel corresponding to a contact position among pixels of the display 21 to a predetermined color. Writing by hand input is displayed on the display 21.

In step S63, the writing detection unit 51 determines again whether or not contact with the surface of the display 21 is present. Determination in step S63 is performed, for example, for every second. In a case where it is determined in step S63 that contact is present, the processing returns to step S62, and display of writing is updated. On the other hand, in a case where it is determined in step S63 that contact is not present, the processing proceeds to step S64.

In step S64, the writing detection unit 51 adds a count value by "1". The count value managed by the writing detection unit 51 represents an elapse time after termination of writing.

In step S65, the writing detection unit 51 determines whether or not the count value is greater than a predetermined value such as "60". In a case where it is determined in step S65 that the count value is not greater than a threshold value, the processing returns to step S63, and the above-described processing is repeated. On the other hand, in a case where it is determined in step S65 that the count value is greater than the threshold value due to the elapse of a predetermined time such as 60 seconds after termination of writing, the processing proceeds to step S66.

In step S66, the communication control unit 54 distributes a signboard image representing the entire display content of the display 21 to portable terminals 61 of community members on the basis of the information supplied from the display control unit 52. The community members are specified on the basis of the community information that is managed by the community management unit 53.

After the distribution of the signboard image is performed, the processing returns to step S61, and the above-described processing is repetitively performed. The owner of the electronic signboard 1 may reset writing at any time.

Next, description will be given of reception processing of the portable terminal 61 with reference to a flowchart of FIG. 17.

Figure 17:
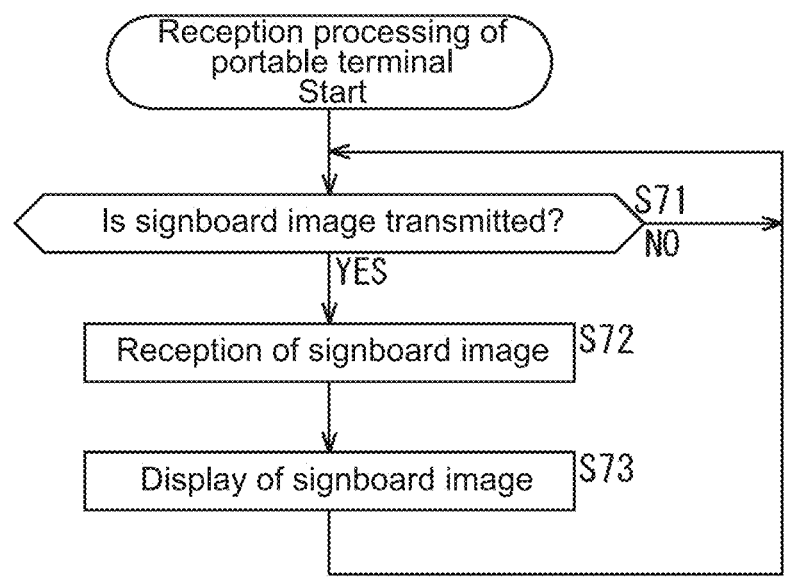
FIG. 17 is a flowchart illustrating reception processing of the portable terminal.

The processing in FIG. 17 is performed in correspondence with execution of the processing in FIG. 16 by the electronic signboard 1. The portable terminal 61 that performs the processing in FIG. 17 is a portable terminal possessed by a member of a community that is associated with the installation location of the electronic signboard 1.

In step S71, the communication control unit 93 determines whether or not the signboard image is transmitted from the electronic signboard 1, and waits until it is determined that the signboard image is transmitted. In a case where it is determined in step S71 that the signboard image is transmitted, the processing proceeds to step S72.

In step S72, the communication control unit 93 receives the signboard image transmitted from the electronic signboard 1. The signboard image received by the communication control unit 93 is output to the display control unit 94.

In step S73, the display control unit 94 displays the signboard image on the display 77. After the signboard image is displayed, the processing returns to step S71, and the above-described processing repetitively performed.

Figure 18:
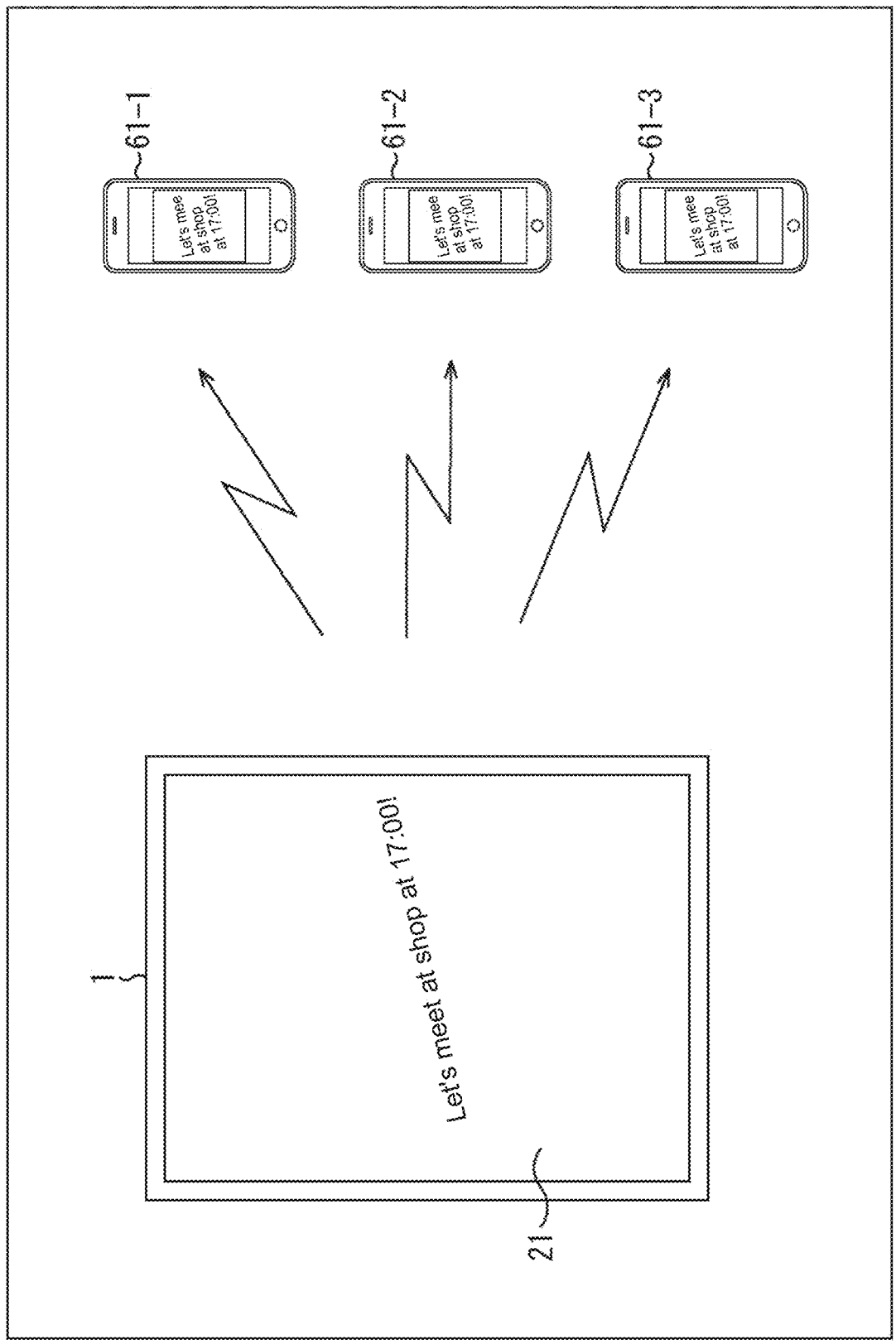
FIG. 18 is a view illustrating an example of distribution of a signboard image.

FIG. 18 is a view illustrating an example of distribution of the signboard image.

In the example in FIG. 18, a message of "let's meet at the shop at 17:00!" is displayed in the vicinity of the center of the display 21 of the electronic signboard 1. In a case where writing of the message is performed, a signboard image that includes the message and represents the entire display content of the display 21 is transmitted to portable terminals 61-1 to 61-3. The portable terminals 61-1 to 61-3 are portable terminals of community members who are associated with the installation location of the electronic signboard 1.

Users of the portable terminals 61-1 to 61-3 of the community members view display of the own terminals and confirm writing of the electronic signboard 1. In FIG. 18, three portable terminals 61 are illustrated. Actually, the signboard image is distributed to a number of portable terminals 61 of the community members.

Through the above-described series of processing, it is possible to realize an information processing system in which only a person who visits the installation location of the electronic signboard 1 can transmit a message only to persons who frequently visit the vicinity of the electronic signboard 1.

When considering that a community is formed by persons who have a similar field of activities, and information is transmitted only to the persons who have a similar field of activities, it can be said that the information processing system realized by the electronic signboard 1 is a similar system in marking of a dog. It is considered that the dog plans to perform information transmission such as transmission of passing of the dog with other dogs by marking. The same system is realized by the electronic signboard 1.

In addition, when using the electronic signboard 1, a person who performs writing can transmit a message only to persons who are considered to be worthy of the transmission.

For example, in a case where the electronic signboard 1 is installed in front of a shop, it can be said that a person who frequently visits the vicinity of the electronic signboard 1 is a person who is more worthy of transmission of information related to the shop in comparison to a person who does not pass through the vicinity of the shop or a person who simply knows the shop. When information is transmitted to the person, it is possible to raise the value of the information.

A user who can perform writing may be limited to members of a community associated with the installation location of the electronic signboard 1. In this case, whether or not a user who tries to perform writing is a community member is authenticated by the electronic signboard 1 before writing.

Authentication of the community member may be performed by using an ID or passwords, or may be performed by fingerprint authentication in a case where the electronic signboard 1 is provided with a fingerprint authentication function. In addition, in a case where a camera is mounted on the electronic signboard 1, authentication of community members may be performed by face recognition.

As described above, in a case where a user who performs writing is specified, information related to the user who performs writing may be given in notification to community members in combination with a signboard image. According to this, community members who receive a signboard image can know who performs writing.

<2: Example in which Information Distribution is Performed by Using Server>

Figure 19:
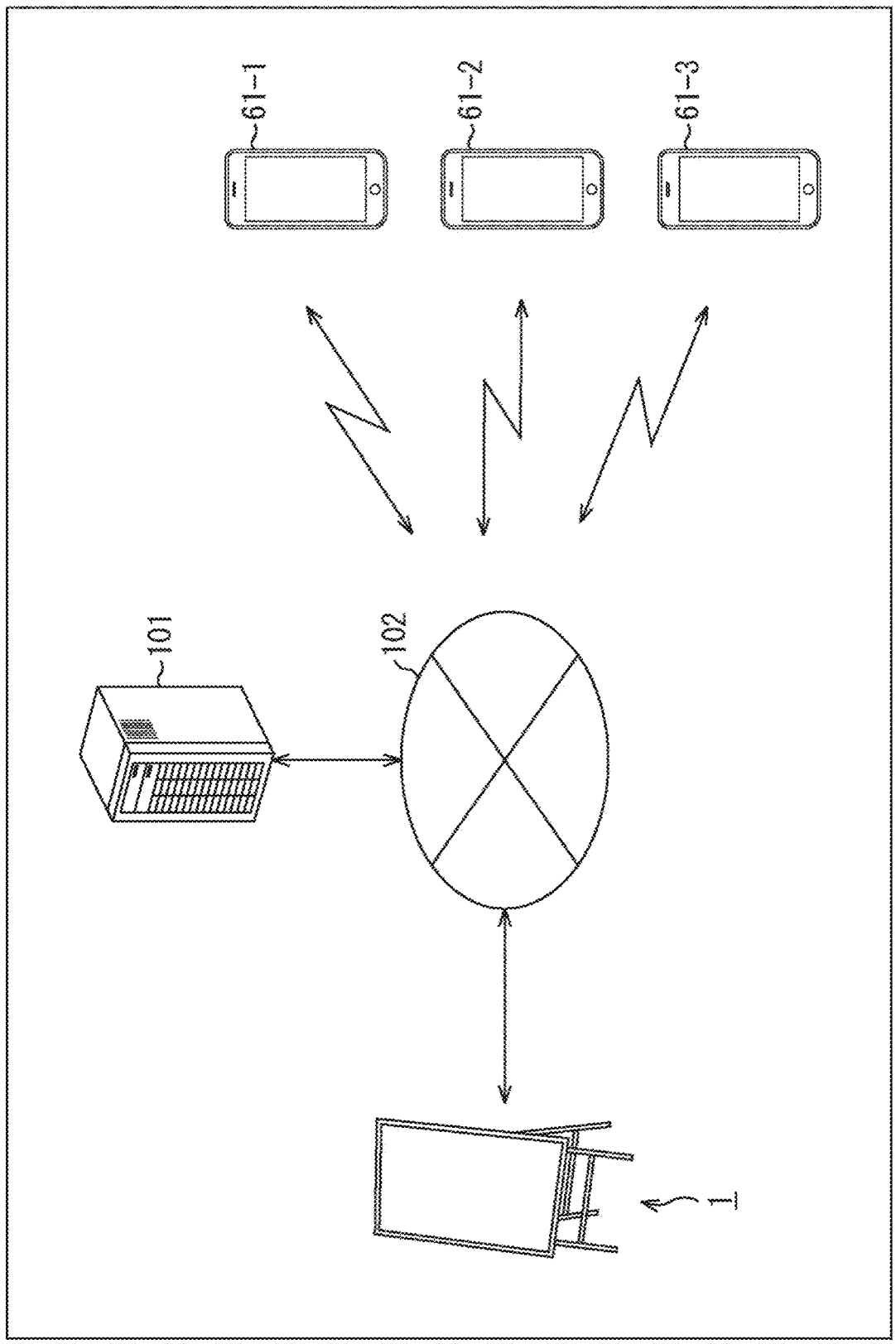
FIG. 19 is a view illustrating another configuration example of an information processing system.

FIG. 19 is a view illustrating another configuration example of the information processing system.

An information processing system illustrated in FIG. 19 has a configuration in which the electronic signboard 1 and a management server 101 are connected through a network 102 such as the Internet. Portable terminals 61-1 to 61-3 which are portable terminals 61 of members of a community associated with the installation location of the electronic signboard 1 are also connected to the network 102.

The management server 101 is a device that performs partial processing such as management of community members and distribution of a signboard image among respective kinds of the processing which are performed by the electronic signboard 1. Actually, in addition to the electronic signboard 1, a plurality of electronic signboards having the same function as that of the electronic signboard 1 are connected to the network 102. The management server 101 performs communication with each of the electronic signboards, and performs processing such as management of a community associated with an installation location of the electronic signboard, and distribution of a signboard image.

For example, in a case where writing is performed by a user, the electronic signboard 1 transmits a signboard image to the management server 101 in combination with a signboard ID that is identification information of the electronic signboard 1.

The management server 101 specifies a community associated with an installation location of the electronic signboard 1 that transmits the signboard image on the basis of the signboard ID, and specifies members of the community that is specified. The management server 101 manages information related to members of a community associated with the installation location of the electronic signboard 1 in correlation with the signboard ID. The management server 101 distributes a signboard image, which is transmitted from the electronic signboard 1, to portable terminals 61 of the community members who are specified.

As described above, a series of processing related to distribution of the signboard image can be dispersed and performed by a plurality of devices.

Figure 20:
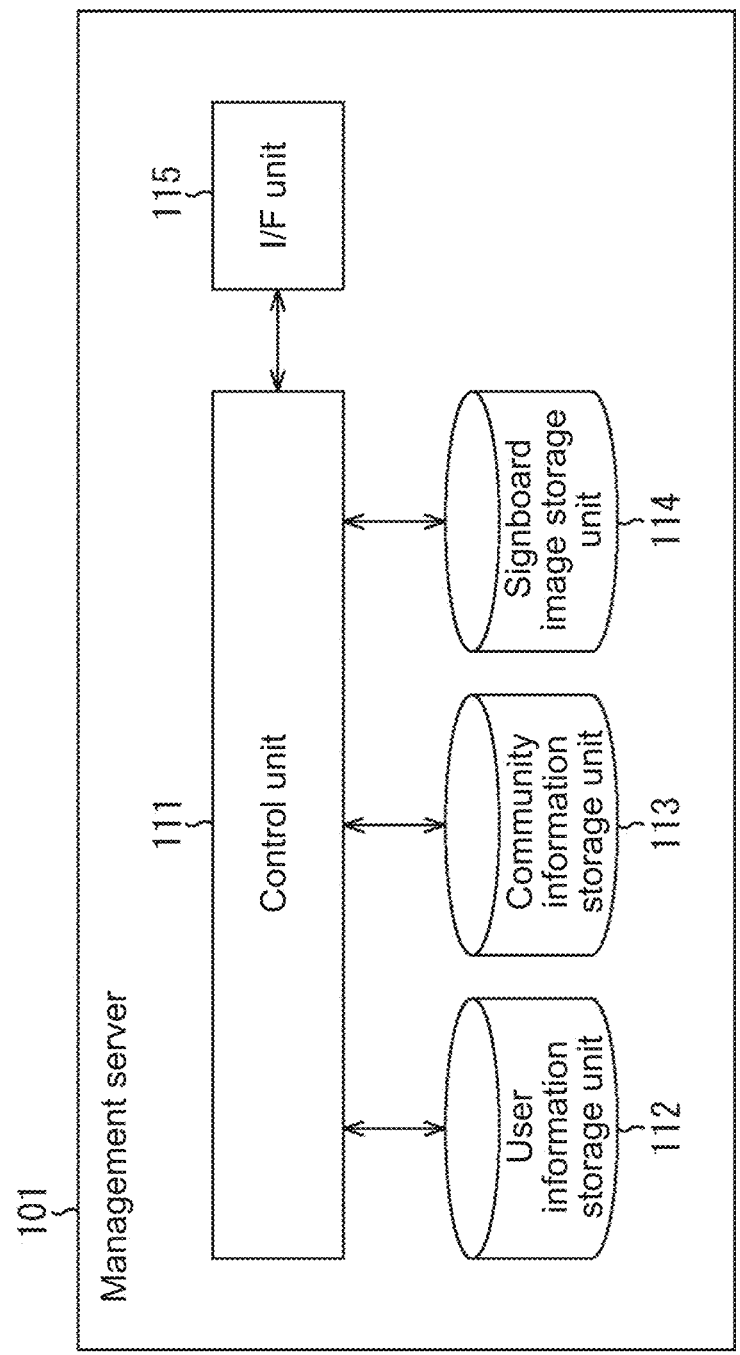
FIG. 20 is a block diagram illustrating a configuration example of a management server.

FIG. 20 is a block diagram illustrating a configuration example of the management server 101.

The management server 101 has a configuration in which a user information storage unit 112, a community information storage unit 113, a signboard image storage unit 114, and an I/F unit 115 are connected to a control unit 111.

The control unit 111 includes a CPU, a ROM, a RAM, and the like. The control unit 111 allows the CPU to execute a predetermined program, and controls an entire operation of the management server 101.

The user information storage unit 112, the community information storage unit 113, and the signboard image storage unit 114 are respectively constituted by an HDD or an SSD.

The user information storage unit 112 stores a user information including a marking history transmitted from the portable terminals 61.

The community information storage unit 113 stores community information related to a community associated with the installation location of the electronic signboard 1. As described above, the community information includes user IDs and accounts of SNS of respective members.

The signboard image storage unit 114 stores a signboard image transmitted from the electronic signboard 1.

The I/F unit 115 is an interface that performs wireless or wired communication. The I/F unit 115 performs communication between the electronic signboard 1 and respective devices including the portable terminals 61 through the network 102.

Figure 21:
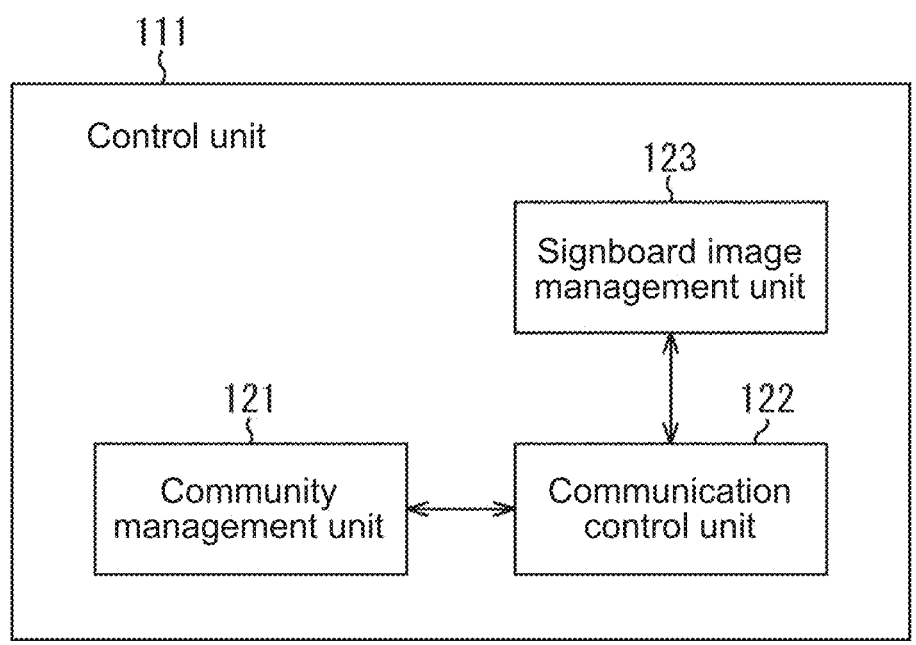
FIG. 21 is a block diagram illustrating a functional configuration example of a control unit in FIG. 20.

FIG. 21 is a block diagram illustrating a functional configuration example of the control unit 111. At least a part of functional units illustrated in FIG. 21 is realized when a predetermined program is executed by the CPU of the control unit 111.

The control unit 111 includes a community management unit 121, a communication control unit 122, and a signboard image management unit 123.

The community management unit 121 manages a marking history transmitted from each of the portable terminals 61 in a state of being stored in the user information storage unit 112.

In addition, the community management unit 121 also has the same function as that of the community management unit 53 (FIG. 5) of the electronic signboard 1. That is, the community management unit 121 forms a community on the basis of a marking history. The community management unit 121 stores community information in the community information storage unit 113, and manages community members.

As described above, community formation and member management are performed by the management server 101. In this case, configurations such as the community information storage unit 33 (FIG. 4) and the community management unit 53 (FIG. 5) are not provided in the electronic signboard 1.

The communication control unit 122 controls the I/F unit 115 to perform communication with respective devices connected to the network 102. Information exchange between respective units of the control unit 111 and external devices is performed through the communication control unit 122.

The signboard image management unit 123 manages a signboard image transmitted from the electronic signboard 1 in a state of being stored in the signboard image storage unit 114. For example, the latest one signboard image is stored in the signboard image storage unit 114 with respect to one electronic signboard 1. In a case where a signboard image is transmitted from the electronic signboard 1, the signboard image management unit 123 updates a signboard image managed in correlation with a signboard ID of the electronic signboard 1 to the latest signboard image.

FIG. 22 is a view illustrating an example of information that is managed by the management server 101.

As illustrated in FIG. 22, the signboard image management unit 123 manages a signboard image that is transmitted from the electronic signboard 1 that is identified by a signboard ID in correlation with the signboard ID. In community information that is managed by the community management unit 121, in correlation with the signboard ID, an installation location of the electronic signboard 1 which is expressed by a latitude and a longitude, and a user ID of a community member are correlated with each other.

In the management server 101, a plurality of pieces of the information are managed in association with each other. In a case where the signboard ID is transmitted from the electronic signboard 1, the control unit 111 can specify each of the installation location, the signboard image, and the community members on the basis of the signboard ID.

<2-1: With Regard to Marking>

Here, description will be given of a flow of marking in the information processing system in FIG. 19. Even in the information processing system in FIG. 19, marking by manual marking or automatic marking is performed in the portable terminal 61.

<2-1-1: Manual Marking>

Description will be given of manual marking processing of the portable terminal 61 with reference to a flowchart of FIG. 23.

In step S101, the marking processing unit 91 of the portable terminal 61 determines whether or not the terminal is shaken, and waits until it is determined that the terminal is shaken.

In a case where it is determined in step S101 that the terminal is shaken, in step S102, the marking processing unit 91 outputs information of a current position and information of a current time to the marking history management unit 92 to be recorded in the marking history.

In step S103, the communication control unit 93 transmits the marking history to the management server 101 in combination with the user ID. Then, the processing subsequent to step S101 is repeated.

<2-1-2: Automatic Marking>

Next, automatic marking processing of the portable terminal 61 will be described with reference to a flowchart of FIG. 24.

In step S111, the marking processing unit 91 of the portable terminal 61 determines whether or not a certain time has elapsed after performing marking, and waits until it is determined that the certain time has elapsed.

In a case where it is determined in step S111 that the certain time has elapsed, in step S112, the marking processing unit 91 outputs information of a current position and information of a current time to the marking history management unit 92 to be recorded in the marking history.

In step S113, the communication control unit 93 transmits the marking history to the management server 101 in combination with the user ID. Then, the processing subsequent to step S111 is repeated.

<2-2: Community Formation>

Next, description will be given of heat map generation processing of the management server 101 with reference to a flowchart of FIG. 25.

Figure 23:
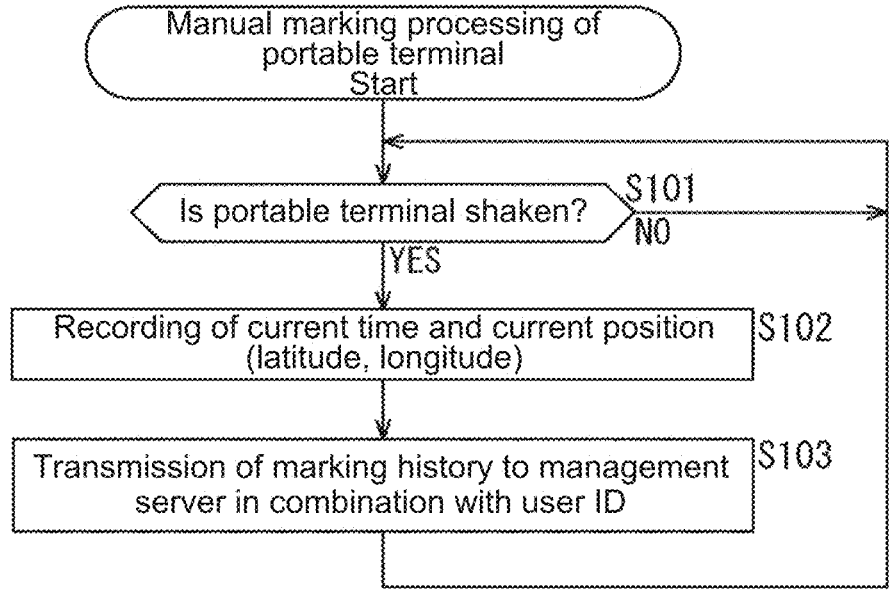
FIG. 23 is a flowchart illustrating manual marking processing of the portable terminal.
Figure 24:
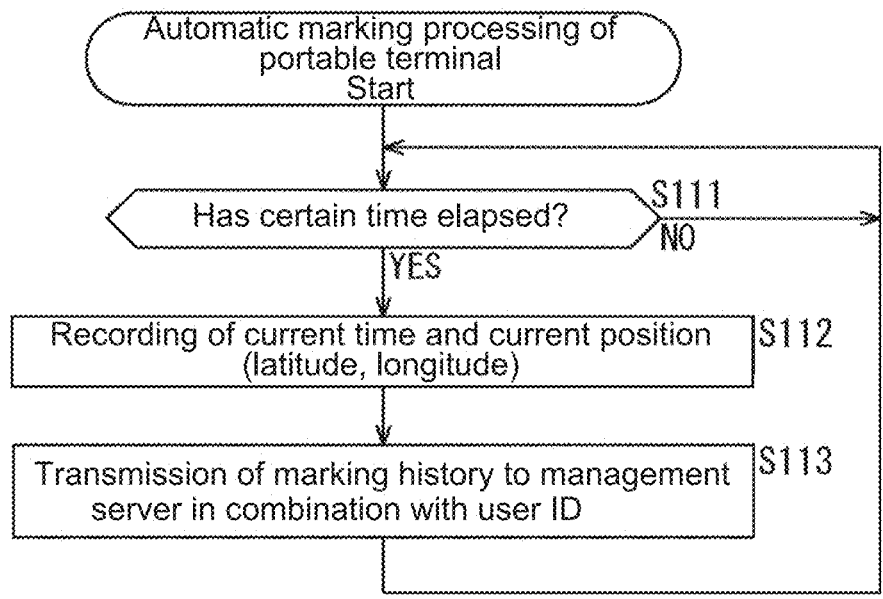
FIG. 24 is a flowchart illustrating automatic marking processing of the portable terminal.
Figure 25:
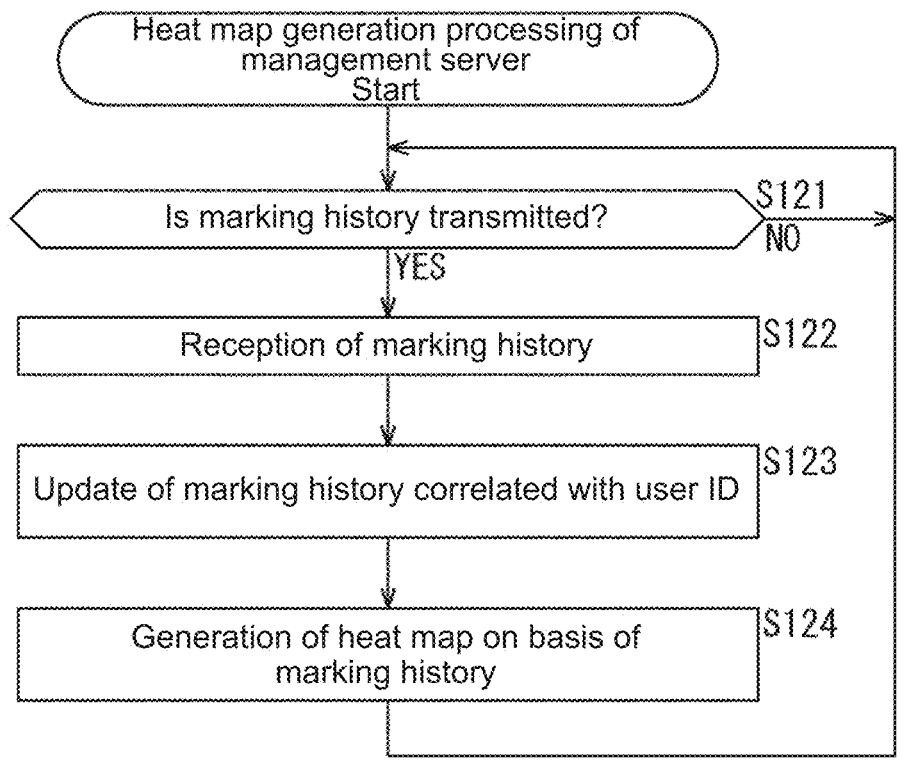
FIG. 25 is a flowchart illustrating heat map generation processing of the management server.

The heat map generation processing in FIG. 25 is performed in correspondence with transmission of the marking history from the portable terminal 61 after the processing in FIG. 23 or FIG. 24 is performed by the portable terminal 61. The heat map is map information indicating a distribution of the number of times of marking in a case where marking is performed at various positions.

For example, the heat map is generated by connecting positions, at which the number of times of marking is the same as each other, with a contour line, and by coloring an area including a position at which the number of times of marking is large with a dark color, and coloring an area including a position at which the number of times of marking is small with a light color. The heat map is information that is created for every user as frequency information indicating a movement frequency of respective positions, and can be used in community formation.

In step S121, the communication control unit 122 of the management server 101 determines whether or not the marking history is transmitted from the portable terminal 61, and waits until it is determined that the marking history is transmitted.

In a case where it is determined in step S121 that the marking history is transmitted, in step S122, the communication control unit 122 receives the marking history that is transmitted in combination with the user ID. The user ID and the marking history are supplied to the community management unit 121.

In step S123, the community management unit 121 updates the marking history, which is stored in the user information storage unit 112, of a user of the portable terminal 61. In the user information storage unit 112, the marking history is stored in correlation with the user ID.

In step S124, the community management unit 121 creates the heat map on the basis of the marking history after updating. That is, the community management unit 121 specifies the number of times of marking at each position on the basis of the marking history, and sets a color for every area on the map so that a distribution of the number of times of marking is illustrated. According to this, the heat map is generated. Then, the processing subsequent to step S121 is repeated.

Figure 26:
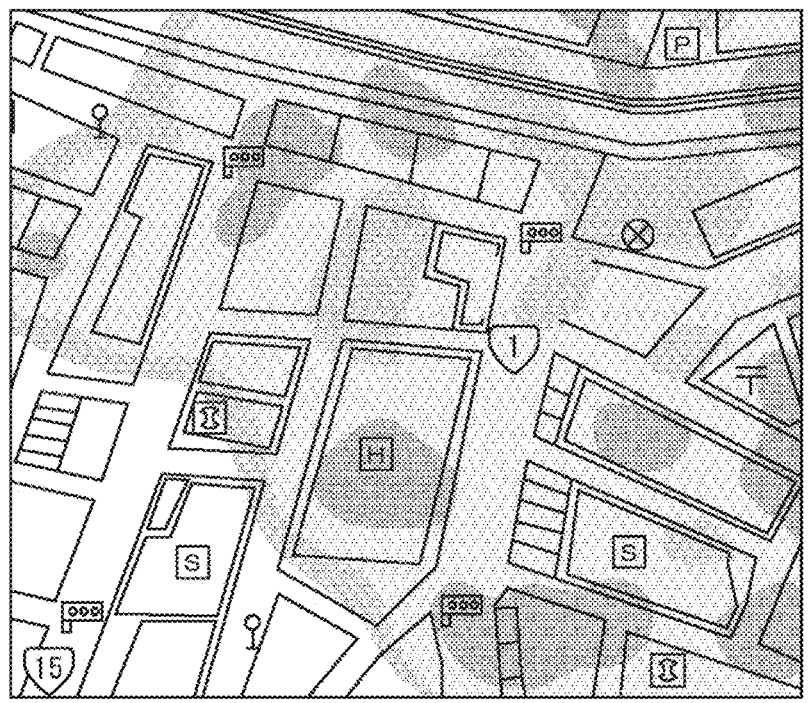
FIG. 26 is a view illustrating an example of the heat map.

FIG. 26 is a view illustrating an example of the heat map.

On the map of FIG. 26, an area to which a dark color is set is an area including a position at which the number of times of marking is large, and an area to which a light color is set is an area including a position at which the number of times of marking is small. For example, an area to which a color is not set is an area including a position at which marking is not performed.

The area to which a dark color is set represents an area that is frequently visited by a user who is interested in the area. In the management server 101, information indicating a distribution of the number of times of marking is generated for every user, and is managed, for example, in a state of being included in the user information.

Description will be given of community formation processing that is performed by the information processing system in FIG. 19 with reference to a sequence of FIG. 27.

Figure 27:
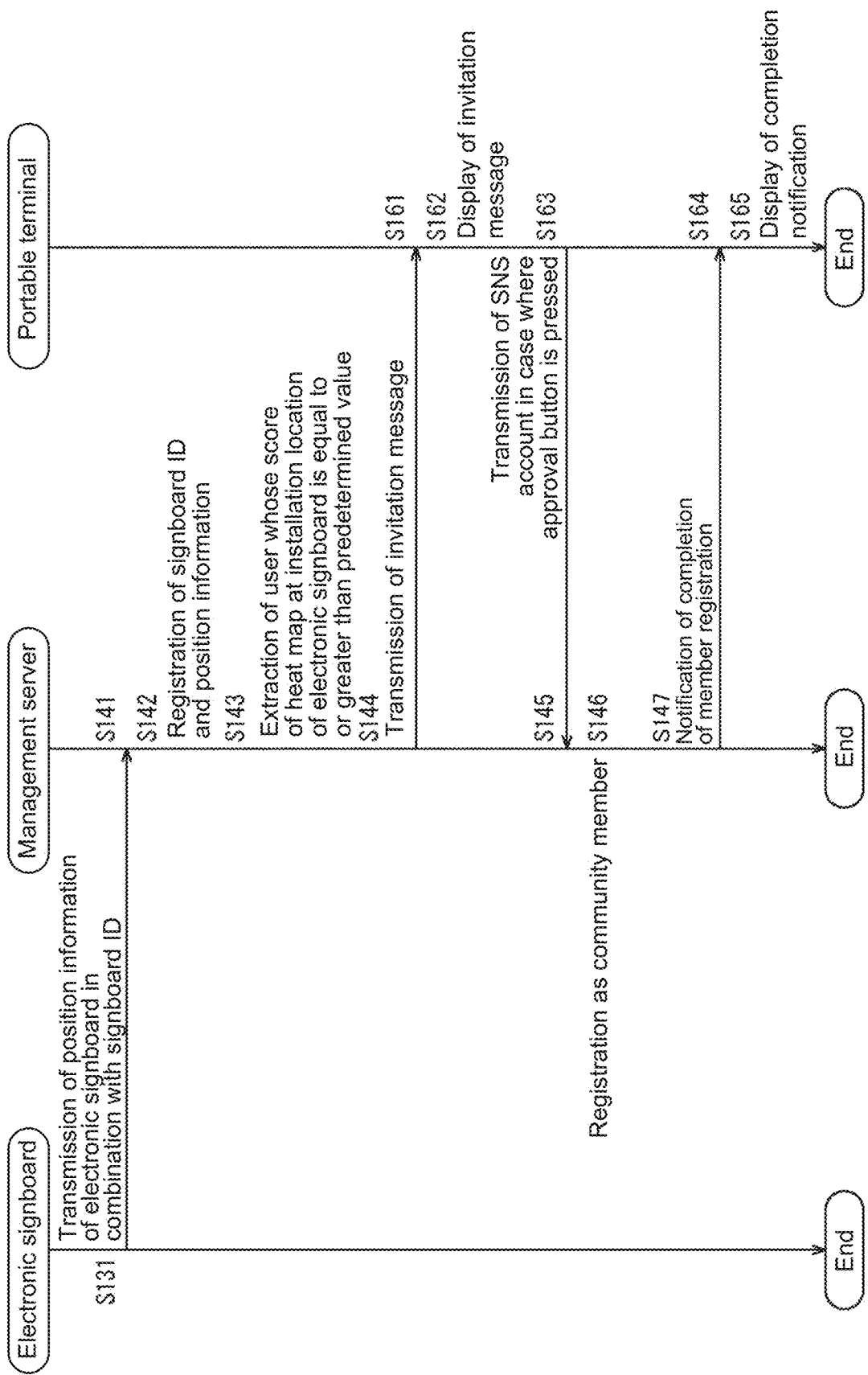
FIG. 27 is a sequence illustrating community forming processing.

The processing in FIG. 27 is performed after the processing described with reference to FIG. 25 is repetitively performed and the heat map of each user is generated.

In step S131, the communication control unit 54 of the electronic signboard 1 transmits position information of the electronic signboard 1 in combination with a signboard ID.

In step S141, the communication control unit 122 of the management server 101 receives the signboard ID and the position information which are transmitted from the electronic signboard 1. The signboard ID and the position information are supplied to the community management unit 121.

In step S142, the community management unit 121 correlates the signboard ID and the position information which are transmitted from the electronic signboard 1, and registers the signboard ID and the position information in the community information stored in the community information storage unit 113.

In step S143, the community management unit 121 extracts a user whose score (the number of times of marking) on the heat map at an installation location of the electronic signboard 1 is equal to or greater than a predetermined value with reference to the heat map of each user which is stored in the user information storage unit 112. Even in this example, a user whose the number of times of marking at the installation location of the electronic signboard 1 is large is extracted.

Processing subsequent to step S144 is basically the same as the processing subsequent to step S26 in FIG. 14. That is, in step S144, the community management unit 121 transmits a community invitation message to the portable terminal 61 of a user who is extracted in step S143.

In step S161, the communication control unit 93 of the portable terminal 61 receives the invitation message transmitted from the management server 101. The invitation message received by the communication control unit 93 is output to the display control unit 94.

In step S162, the display control unit 94 allows the display 77 to display the invitation message. The approval button that is operated when approving participation in a community, and the like are also displayed on the display 77.

When the approval button is pressed, in step S163, the communication control unit 93 transmits an account of an SNS that is used by the user of the portable terminal 61 to the management server 101.

In step S145, the communication control unit 122 of the management server 101 receives information transmitted from the portable terminal 61.

In step S146, the community management unit 121 registers the user of the portable terminal 61 as a community member. Information such as a user ID and an account of the user who is newly added as the community member is recorded in the community information recorded in the community information storage unit 113.

In step S147, the community management unit 121 transmits a message for notification of completion of community member registration to the portable terminal 61.

In step S164, the communication control unit 93 of the portable terminal 61 receives the completion message transmitted from the management server 101.

In step S165, the display control unit 94 allows the display 77 to display the completion message, and terminates the processing.

Through the above-described processing, a community, which includes a user who frequently visits the installation location of the electronic signboard 1 and performs marking as a member, is formed.

After performing heat map matching, users who are similar in the heat map, that is, users who are similar in the field of activities and who perform marking at the same position may be determined as new candidates of a community.

For example, with respect to a user whose heat map is similar to a heat map of a community member, an invitation message that encourages the user to participate in the community is transmitted from the management server 101. In a case where participation in the community is approved, a user who is determined as a candidate is added as a community member.

Note that, as described with reference to FIG. 14, a user whose the number of times of marking is equal to or greater than a threshold value may be specified, and the invitation message may be transmitted to perform communication formation without using the heat map.

In addition, the community formation may be performed in consideration of a stay time at a specific location such as the installation location of the electronic signboard 1 in addition to the number of times of marking or the score of the heat map. That is, the communication formation can be performed as follows. With regard to a movement trajectory of a user which is expressed by a marking history, a user who remains a trajectory of moving to a specific location by a predetermined number of times or greater, or a user who remains a trajectory of staying at a specific location for a predetermined time or longer is specified to perform the community formation. In this manner, with regard to conditions for being community members, various conditions can be used.

<2-3: Information Distribution to Community Members>

Description will be given of transmission processing of the electronic signboard 1 with reference to a flowchart of FIG. 28.

Figure 28:
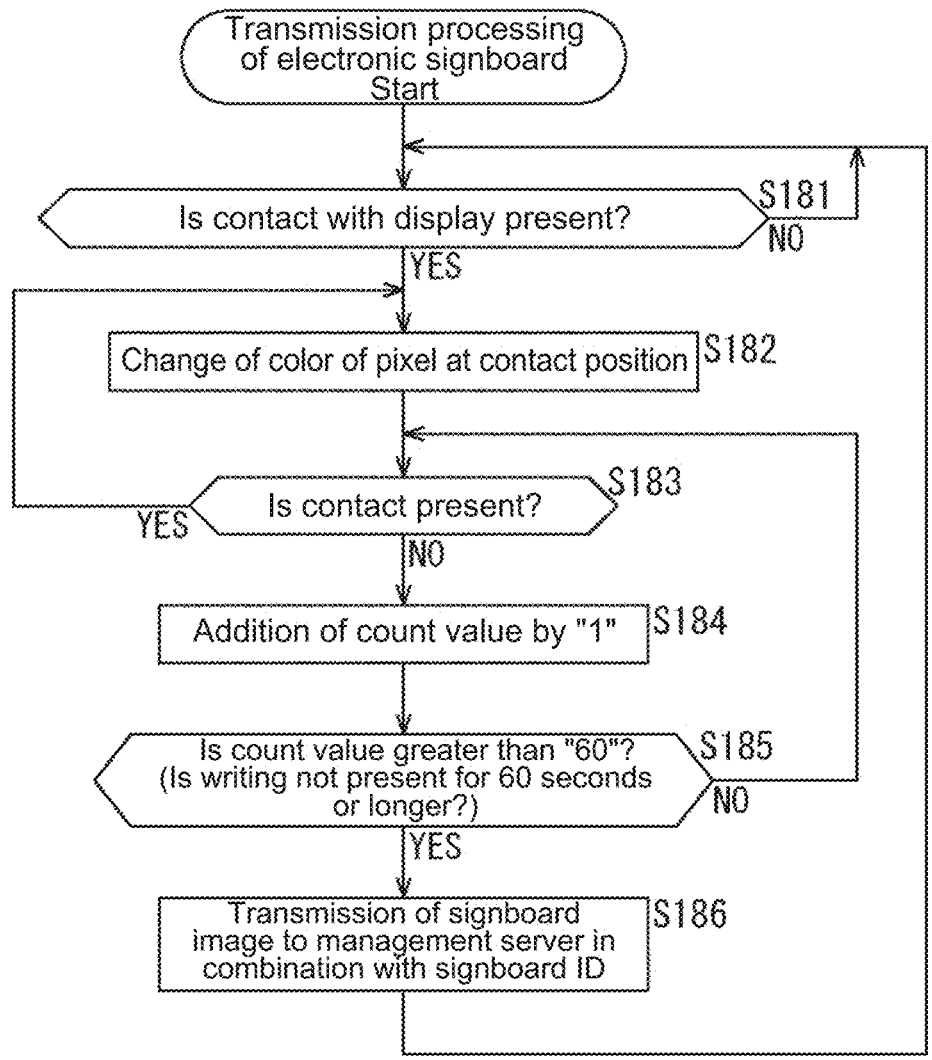
FIG. 28 is a flowchart illustrating transmission processing of the electronic signboard.

The processing in FIG. 28 is basically the same as the processing described with reference to FIG. 16 except that a transmission destination of the signboard image is the management server 101 instead of the portable terminal 61.

In step S181, the writing detection unit 51 determines whether or not contact with a surface of the display 21 is present on the basis of an output of the touch sensor 32, and waits until it is determined that contact is present.

In a case where it is determined in step S181 that contact with the display 21 is present, in step S182, the display control unit 52 changes a color of pixels corresponding to a contact position to a predetermined color.

In step S183, the writing detection unit 51 determines again whether or not contact with the surface of the display 21 is present. In a case where it is determined in step S183 that contact is present, the processing returns to step S182, and display of writing is updated.

On the other hand, in a case where it is determined in step S183 that contact is not present, in step S184, the writing detection unit 51 adds a count value by "1".

In step S185, the writing detection unit 51 determines whether or not the count value is greater than a predetermined value. In a case where it is determined in step S185 that the count value is not greater than a threshold value, the processing returns to step S183, and the above-described processing is repeated.

On the other hand, in a case where it is determined in step S185 that the count value is greater than the threshold value, in step S186, the communication control unit 54 transmits a signboard image to the management server 101 in combination with a signboard ID. Then, the processing returns to step S181, and the above-described processing is repetitively performed.

Figure 29:
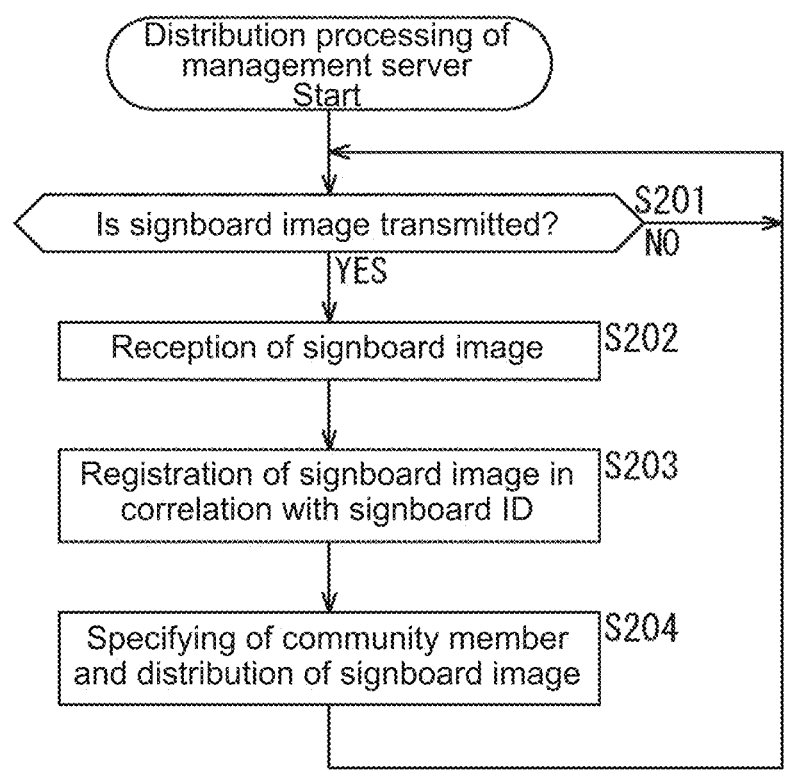
FIG. 29 is a flowchart illustrating distribution processing of the management server.

Next, Description will be given of distribution processing of the management server 101 with reference to a flowchart of FIG. 29.

In step S201, the communication control unit 122 determines whether or not a signboard image is transmitted from the electronic signboard 1, and waits until it is determined that the signboard image is transmitted. In a case where it is determined in step S201 that the signboard image is transmitted, the processing proceeds to step S202.

In step S202, the communication control unit 122 receives the signboard image transmitted from the electronic signboard 1. The signboard ID is applied to the signboard image. The signboard image received by the communication control unit 122 is output to the signboard image management unit 123.

In step S203, the signboard image management unit 123 outputs the signboard image to the signboard image storage unit 114 in correlation with the signboard ID, and registers the signboard image.

In step S204, the community management unit 121 specifies a community associated with the installation location of the electronic signboard 1 on the basis of the signboard ID, and specifies community members who are specified on the basis of the community information. The community management unit 121 outputs information of the community members who are specified to the communication control unit 122, and distributes the signboard image to the portable terminal 61 of each of the community members. After distribution of the signboard image is performed, the processing returns to step S201, and the above-described processing is respectively performed.

In the portable terminal 61 that receives the signboard image transmitted from the management server 101, the processing described with reference to FIG. 17 is performed, and the signboard image is displayed.

As described above, the processing including community management and distribution of the signboard image can be performed by the management server 101. According to this configuration, it is possible to realize an information processing system in which only a person who visits the installation location of the electronic signboard 1 can transmit information only to persons who frequently visit the vicinity of the electronic signboard 1.

Second Embodiment: Advertisement Distribution

Not only the signboard image but also an advertisement can be distributed to members of the community that is formed on the basis of marking.

For example, the advertisement distribution is performed when a person different from the owner of the electronic signboard 1 makes a request for the owner of the electronic signboard 1 to distribute an advertisement. Hereinafter, a device that is used by the owner of the electronic signboard 1 is appropriately referred to as "signboard owner device", and a device that is used by an advertiser who makes a request for advertisement distribution is appropriately referred to as "advertiser device".

Figure 30:
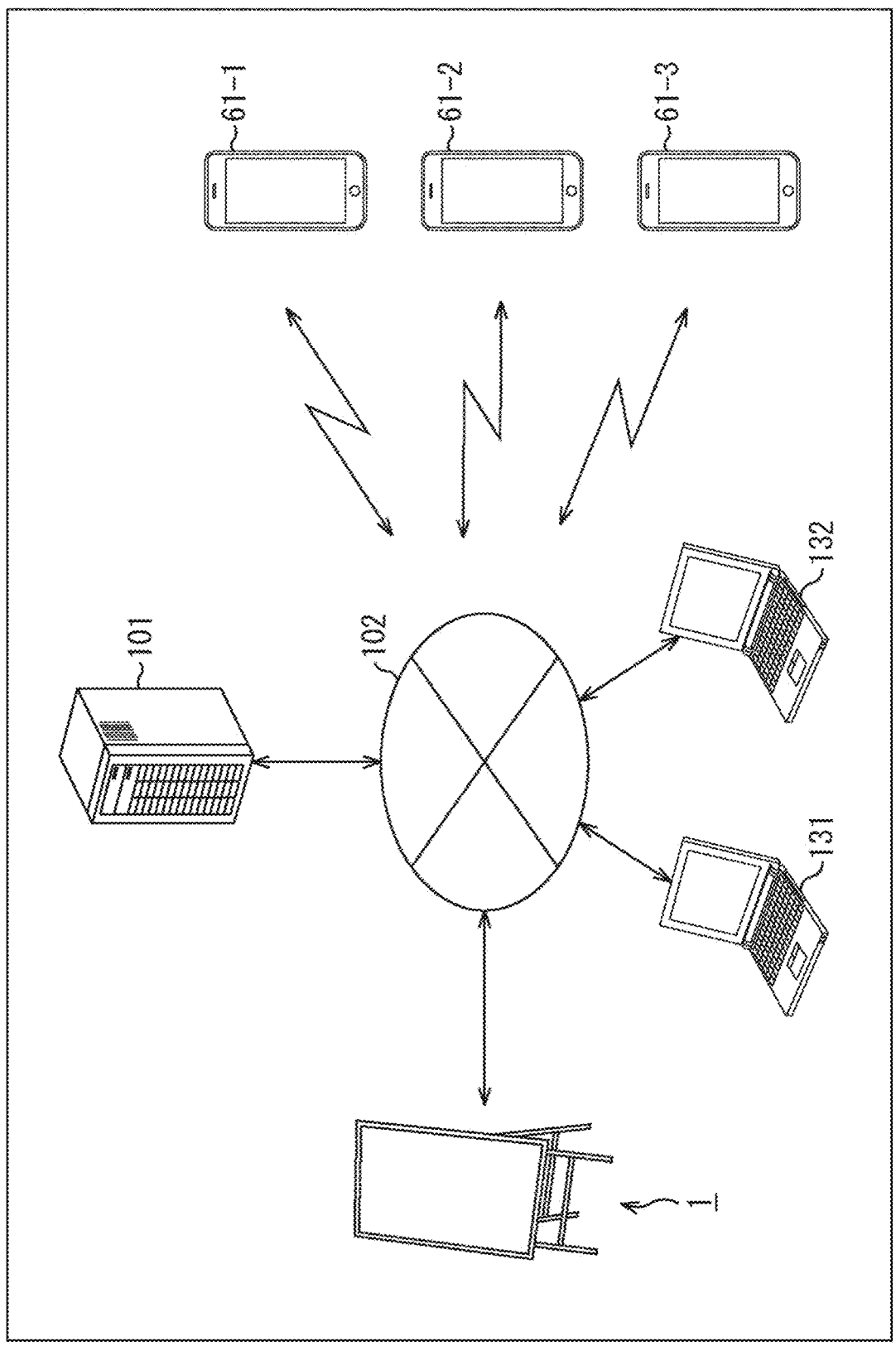
FIG. 30 is a view illustrating still another configuration example of the information processing system.

FIG. 30 is a view illustrating still another configuration example of the information processing system.

The same reference is given to the same configuration as described above among configurations illustrated in FIG. 30. Redundant description will be appropriately omitted. The information processing system in FIG. 30 is different from the configuration in FIG. 19 in that an advertiser device 131 and a signboard owner device 132 are connected to the network 102.

The advertiser device 131 is a device that is operated by a requester (client) who make a request for advertisement distribution.

The signboard owner device 132 is a device that is operated by the owner of the electronic signboard 1. The owner of the electronic signboard 1 is also a manager of a community that is associated with the installation location of the electronic signboard 1.

The advertiser device 131 and the signboard owner device 132 are information processing devices such as a PC, a smartphone, and a tablet terminal.

A portable terminals 61-1 to 61-3 are terminals of members of the community that is associated with the installation location of the electronic signboard 1 that is managed by the signboard owner.

Figure 31:
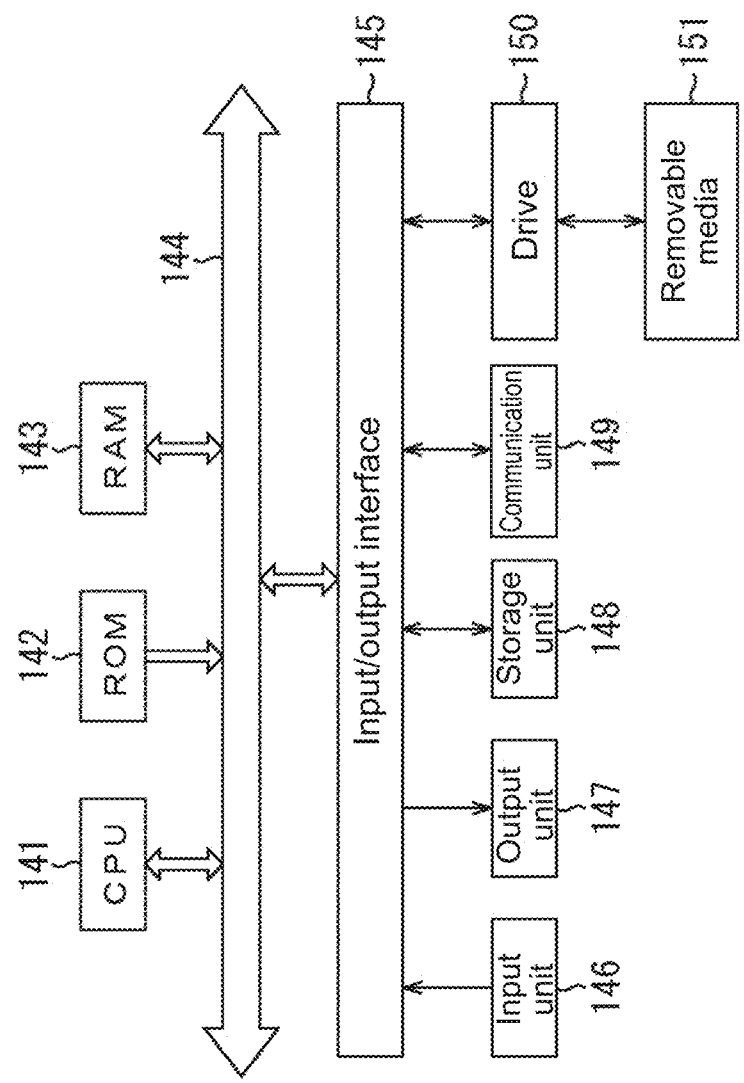
FIG. 31 is a block diagram illustrating a configuration example of an advertiser device.

FIG. 31 is a block diagram illustrating a configuration example of the advertiser device 131.

A CPU 141, a ROM 142, and a RAM 143 are connected to each other by a bus 144. The CPU 141 executes a predetermined program, and performs various kinds of processing related to distribution of an advertisement in correspondence with an operation of an advertiser.

An input/output interface 145 is connected to the bus 144. An input unit 146 including a keyboard, a mouse, and the like, and an output unit 147 including a display, a speaker, and the like are connected to the input/output interface 145. In addition, a storage unit 148 including a hard disk, a non-volatile memory, and the like, a communication unit 149 including a network interface and the like, and a drive 150 that drives removable media 151 are connected to the input/output interface 145. For example, the communication unit 149 performs communication with an external device through the network 102.

The signboard owner device 132 also has the same configuration as the configuration in FIG. 31. In the following description, the configuration in FIG. 31 is appropriately cited as a configuration of the signboard owner device 132.

<1: Example in which Advertisement Distribution Condition is Only Payment of Advertisement Rate>

Description will be given of advertisement distribution processing that is performed by the management server 101, the advertiser device 131, and the signboard owner device 132 with reference to a sequence of FIG. 32.

In step S211, the advertiser device 131 transmits an advertisement request that is information indicating an advertisement distribution request to the management server 101 in combination with an advertiser ID that is identification information of the advertiser, and advertisement data. The advertisement data may be any type of data among a moving image, a still image, voice, and a text. The advertisement request is performed by designating a signboard ID of the electronic signboard 1 that is associated with a community that is set as an advertisement distribution target.

In step S221, the control unit 111 of the management server 101 controls the I/F unit 115 to receive the advertisement request transmitted from the advertiser device 131.

In step S222, the control unit 111 specifies the owner of the electronic signboard 1 that is identified by the signboard ID transmitted from the advertiser device 131, and transmits the advertisement request to the signboard owner device 132 that is handled by the specified owner. For example, information related to the signboard owner device 132 is included in the community information stored in the community information storage unit 113 in association with the signboard ID.

In step S231, the signboard owner device 132 receives the advertisement request transmitted from the management server 101. The owner of the electronic signboard 1 examines whether or not to approve advertisement distribution.

In the case of approving the advertisement distribution, the owner of the electronic signboard 1 operates the input unit 146 of the signboard owner device 132, and performs an operation of pressing the approval button displayed on the display, and the like. In step S232, the signboard owner device 132 transmits an approval message that is information indicating approval of advertisement distribution to the management server 101.

In step S223, the control unit 111 of the management server 101 receives the approval message that is transmitted from the signboard owner device 132.

In step S224, the control unit 111 transmits advertisement rate information to the advertiser device 131. The control unit 111 manages information of a rate related to the advertisement distribution. Information related to a rate necessary for advertisement distribution, and information related to payment of the rate are included in the advertisement rate information transmitted to the advertiser device 131. The advertisement rate may be determined in correspondence with the number of members of the community that is set as the advertisement distribution target, the number of times of marking at the installation location of the electronic signboard 1, and the like.

In step S212, the advertiser device 131 receives the advertisement rate information transmitted from the management server 101. The advertiser performs payment of the advertisement rate by inputting credit information and the like.

In step S213, the advertiser device 131 transmits payment information including information indicating that payment is completed to the management server 101.

In step S225, the control unit 111 of the management server 101 receives the payment information transmitted from the advertiser device 131.

In step S226, the control unit 111 specifies community members who become an advertisement distribution target on the basis of the community information, and distributes advertisement data to the portable terminals 61 of the community members who are specified. Community members who are correlated with the signboard ID designated by the advertiser become the advertisement distribution target.

In the portable terminals 61 of the community members, the advertisement data is received and is output. The community members view the advertisement that is prepared by the advertiser.

In step S227, the control unit 111 transmits a completion message indicating completion of advertisement distribution to the advertiser device 131.

In step S214, the advertiser device 131 receives the completion message transmitted from the management server 101, and terminates the processing.

Through the above-described series of processing, the advertisement can be distributed to persons who are worthy of transmission, and thus effective advertisement distribution becomes possible.

For example, a person who manages a shop can effectively performs an advertisement of the own shop by searching the electronic signboard 1 in a location at which persons who are interested in the own shop gather, and by making a request for advertisement distribution to a community that is associated with the installation location of the electronic signboard 1.

The advertisement may be distributed to members whose the number of times of marking is particularly great, that is, members who are further interested in the installation location of the electronic signboard 1 among community members instead of distributing the advertisement to all of the community members.

<2: Example in which Participation in Community is Required as Advertisement Distribution Condition>

Description will be given of another advertisement distribution processing that is performed by the management server 101, the advertiser device 131, and the signboard owner device 132 with reference to a sequence of FIG. 33.

Figure 32:
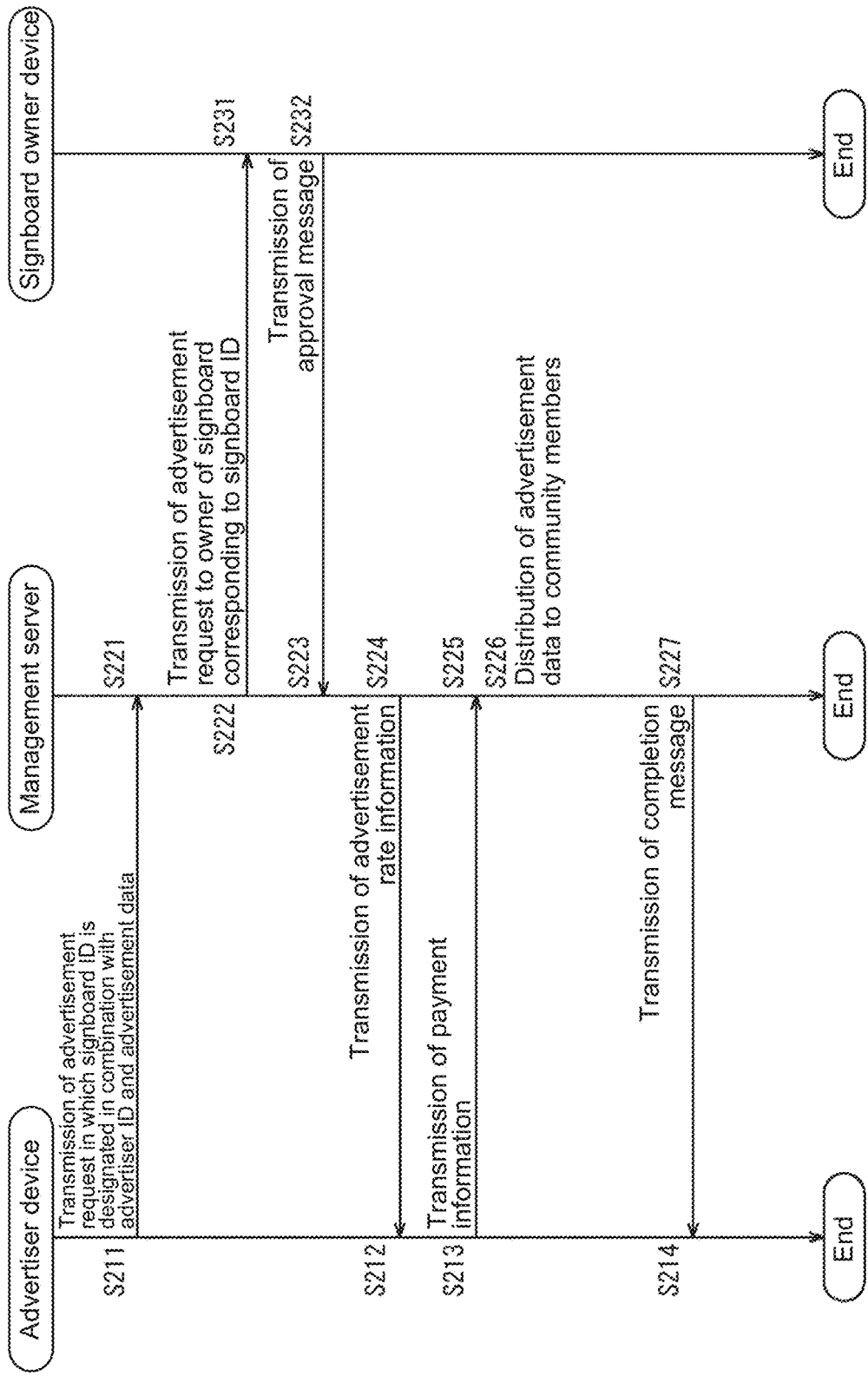
FIG. 32 is a sequence illustrating advertisement distribution processing.
Figure 33:
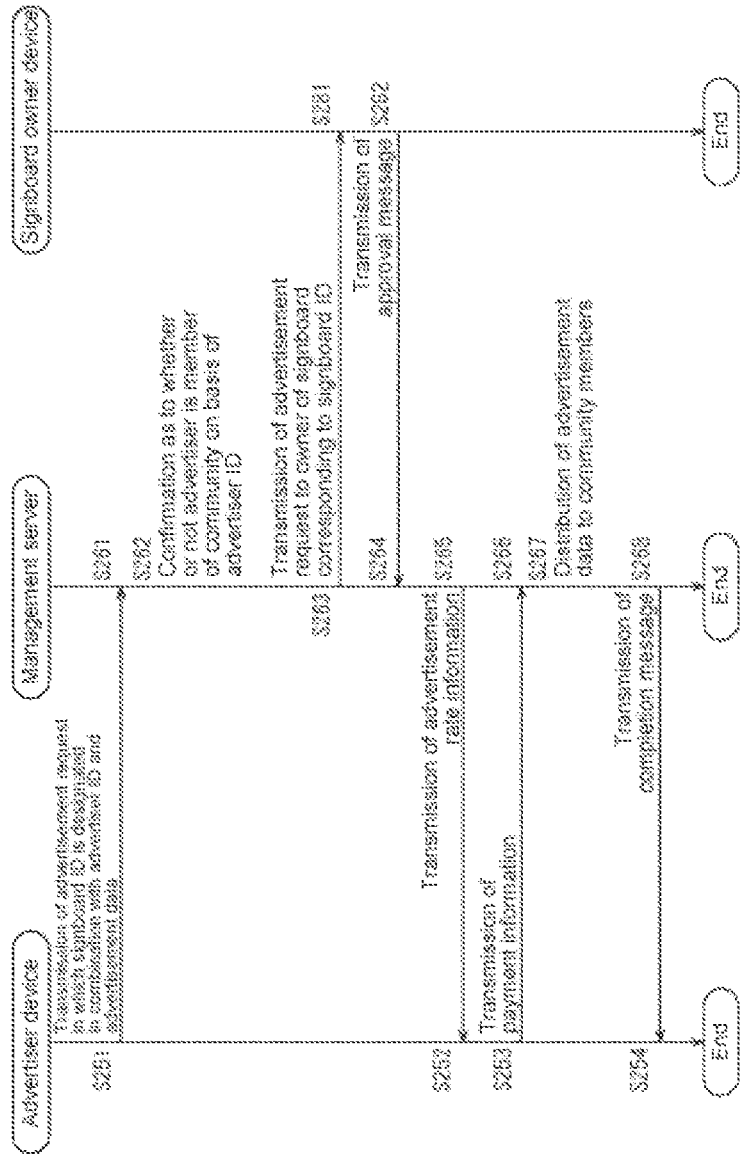
FIG. 33 is a sequence illustrating another advertisement distribution processing.

In the processing in FIG. 33, to distribute an advertisement to an arbitrary community, the advertiser is required to be a member of the community. The processing in FIG. 33 is the same processing as the processing in FIG. 32 except that confirmation as to whether or not the advertiser is a community member is performed in the management server 101. Redundant description will be appropriately omitted.

In step S251, the advertiser device 131 transmits an advertisement request to the management server 101 in combination with an advertiser ID and advertisement data.

In step S261, the control unit 111 of the management server 101 receives the advertisement request transmitted from the advertiser device 131.

In step S262, the control unit 111 specifies a community that is associated with the electronic signboard 1 that is identified by the signboard ID transmitted in combination with the advertisement request. In addition, the control unit 111 confirms whether or not the advertiser is a member of the community that is specified on the basis of the advertiser ID.

For example, as the advertiser ID, identification information such as a user ID can be used. The control unit 111 confirms whether or not the same user ID as a user ID that is transmitted as the advertiser ID is included in user IDs of community members with reference to the community information correlated with the signboard ID. In a case where the advertiser is not a member of the community, the subsequent processing is terminated, and advertisement distribution is not performed.

Processing in a case where the advertiser is confirmed as a member of the community is the same as the processing subsequent to step S222 in FIG. 32. That is, in step S263, the control unit 111 transmits the advertisement request to the signboard owner device 132 that is handled by the owner of the electronic signboard 1 that is identified by the signboard ID.

In step S281, the signboard owner device 132 receives the advertisement request transmitted from the management server 101. The owner of the electronic signboard 1 examines whether or not to approve advertisement distribution.

In step S282, the signboard owner device 132 transmits an approval message that is information indicating approval of advertisement distribution to the management server 101.

In step S264, the control unit 111 of the management server 101 receives the approval message that is transmitted from the signboard owner device 132.

In step S265, the control unit 111 transmits advertisement rate information to the advertiser device 131.

In step S252, the advertiser device 131 receives the advertisement rate information transmitted from the management server 101.

In a case where payment of the advertisement rate is completed, in step S253, the advertiser device 131 transmits payment information to the management server 101

In step S266, the control unit 111 of the management server 101 receives the payment information transmitted from the advertiser device 131.

In step S267, the control unit 111 specifies community members who become an advertisement distribution target on the basis of the community information, and distributes advertisement data to the portable terminals 61 of the community members who are specified.

In step S268, the control unit 111 transmits a completion message indicating completion of advertisement distribution to the advertiser device 131.

In step S254, the advertiser device 131 receives the completion message transmitted from the management server 101, and terminates the processing.

Through the above-described series of processing, only a member of the community can distribute an advertisement to members of the same community.

As described above, conditions on an advertisement distribution request side can be set in various manners. A condition in which the number of times of marking at the installation location of the electronic signboard 1 is equal to or greater than a predetermined threshold value may be set in addition to the community members.

As described above, the management server 101 manages information of the marking history or the heat map of each user. For example, an area at which an advertisement effect with respect to goods or services is high may be specified on the basis of the information that is managed by the management server 101, and information related to the area may be provided to an advertiser.

In this case, for example, the management server 101 specifies an area in which the number of times of marking by persons who have the same attribute as a person who becomes an advertisement target is large on the basis of the heat map. The management server 101 provides information related to the specified area to an advertiser as information of an area suitable for the installation location of the electronic signboard 1

According to this, an advertiser who plans to make a request for advertisement distribution can make a request for the advertisement distribution to the owner of the electronic signboard 1 which can attain greater advertisement effect.

Third Embodiment: Additive Function of Electronic Signboard

<1: Distribution of Image of Only Writing Portion>

Description has been given of an example in which a signboard image representing the entire display content of the electronic signboard 1 is distributed, but only an image of a newly written portion may be distributed.

Figure 34:
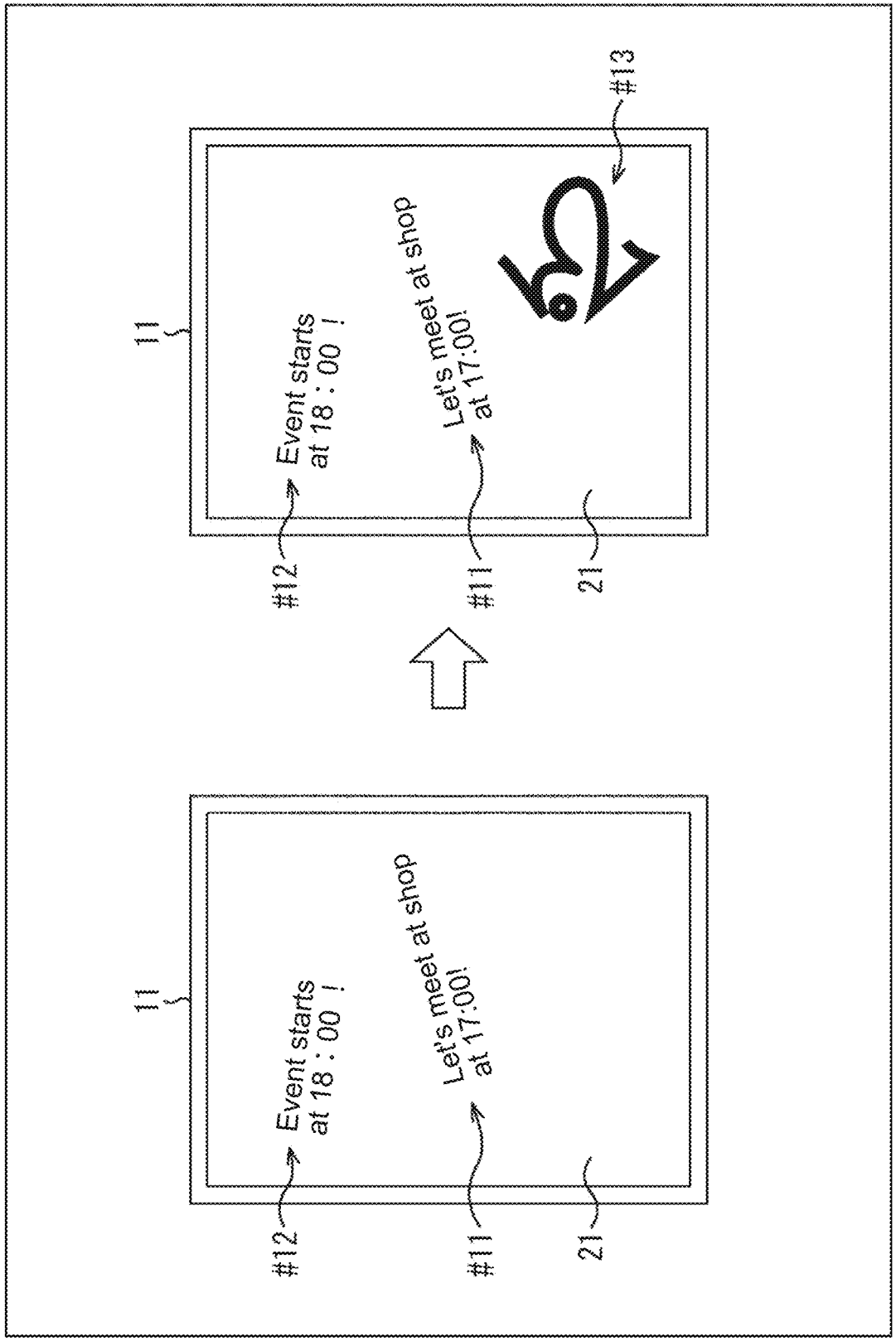
FIG. 34 is a view illustrating an example of writing on the electronic signboard.

FIG. 34 is a view illustrating a writing example of the electronic signboard 1.

In the example on the left of FIG. 34, writing #11 is written in the vicinity of the center of the display 21, and writing #12 is written on a upper-left side. Members of a community associated with the installation location of the electronic signboard 1 are notified of the content of the writing #11 and the content of the writing #12 in advance.

Figure 35:
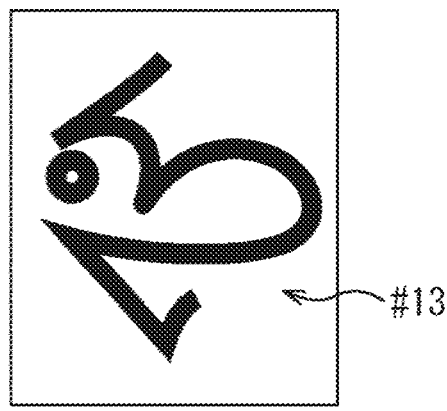
FIG. 35 is a view illustrating an example of writing.

In this state, for example, as illustrated in front of a white empty arrow, in a case where writing #13 is written in the vicinity of a lower-right side of the display 21, an image that includes the writing #13 as illustrated in FIG. 35 is generated. The image illustrated in FIG. 35 is an image that represents the writing #13 that is newly written.

The image that represents the content of the new writing is generated by detecting a difference between an image of the entire display content before writing and an image of the entire display content after writing.

Hereinafter, the image that represents only the content of the new writing is appropriately referred to as "differential image". The differential image generated in this manner is distributed to members of a community that is associated with the installation location of the electronic signboard 1.

Generation of the differential image may be performed by the electronic signboard 1 or may be performed by the management server 101 on the basis of an image that represents the entire display content.

Description will be given of distribution processing of the management server 101 with reference to a flowchart of FIG. 36.

Figure 36:
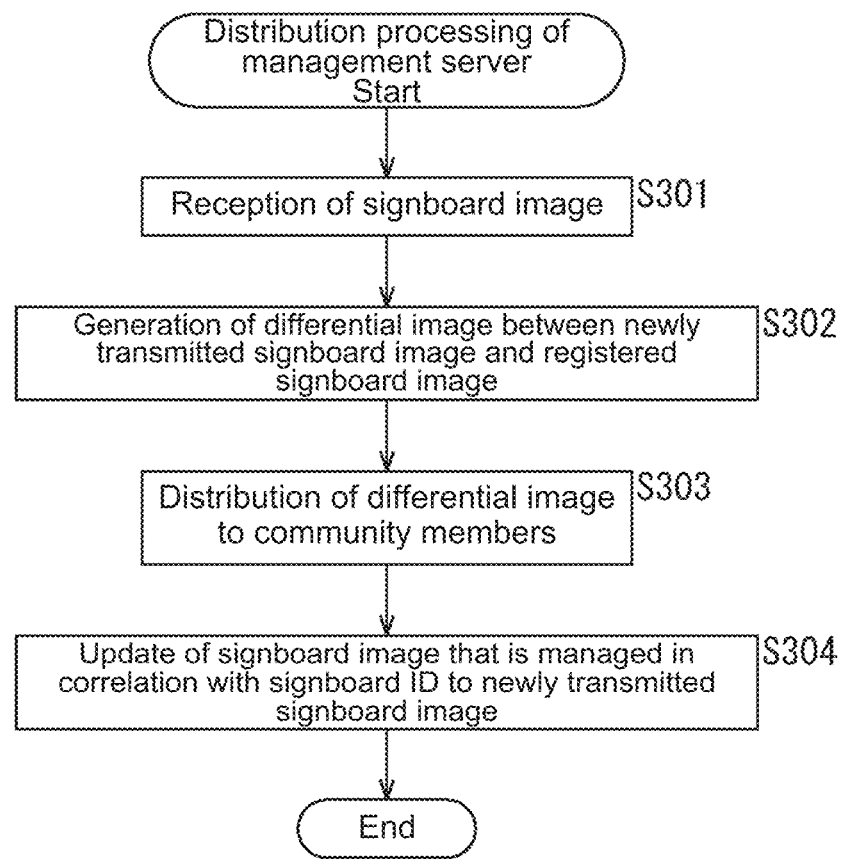
FIG. 36 is a flowchart illustrating distribution processing of the management server.

The processing in FIG. 36 is processing in a case where generation of the differential image is performed by the management server 101. The processing in FIG. 36 is performed when the processing described with reference to FIG. 28 is performed in the electronic signboard 1 and a signboard image is transmitted from the electronic signboard 1.

In step S301, the communication control unit 122 receives the signboard image transmitted from the electronic signboard 1. The signboard image transmitted from the electronic signboard 1 is an image that represents the entire display content of the electronic signboard 1. A signboard ID is applied to the signboard image. The signboard image received by the communication control unit 122 is output to the signboard image management unit 123.

In step S302, the signboard image management unit 123 acquires a signboard image, which is managed in correlation with the signboard ID, from the signboard image storage unit 114, and generates the differential image between the signboard image that is newly transmitted, and the registered signboard image that is acquired from the signboard image storage unit 114. The differential image is generated as follows. A difference between both the images is detected, and a region in which a difference exists is included in the differential image.

In step S303, the communication control unit 122 distributes the differential image generated by the signboard image management unit 123 to portable terminals 61 of members of the community that is associated with the installation location of the electronic signboard 1 that transmits the signboard image. In the portable terminals 61 which receive the differential image, display of the differential image is performed.

In step S304, the signboard image management unit 123 updates the signboard image managed in correlation with the signboard ID to the new signboard image that is received in step S301, and terminates the processing.

Through the above-described processing, the community members can easily confirm new writing.

A person who performs writing may select whether to distribute an image of only the newly written portion or whether to distribute an image of the entire display content.

<2: Conversion of Handwriting Characters into Text>

In a case where handwriting characters are written, the handwriting characters may be recognized by optical character recognition (OCR), and may be distributed after being converted into a text.

Figure 37:
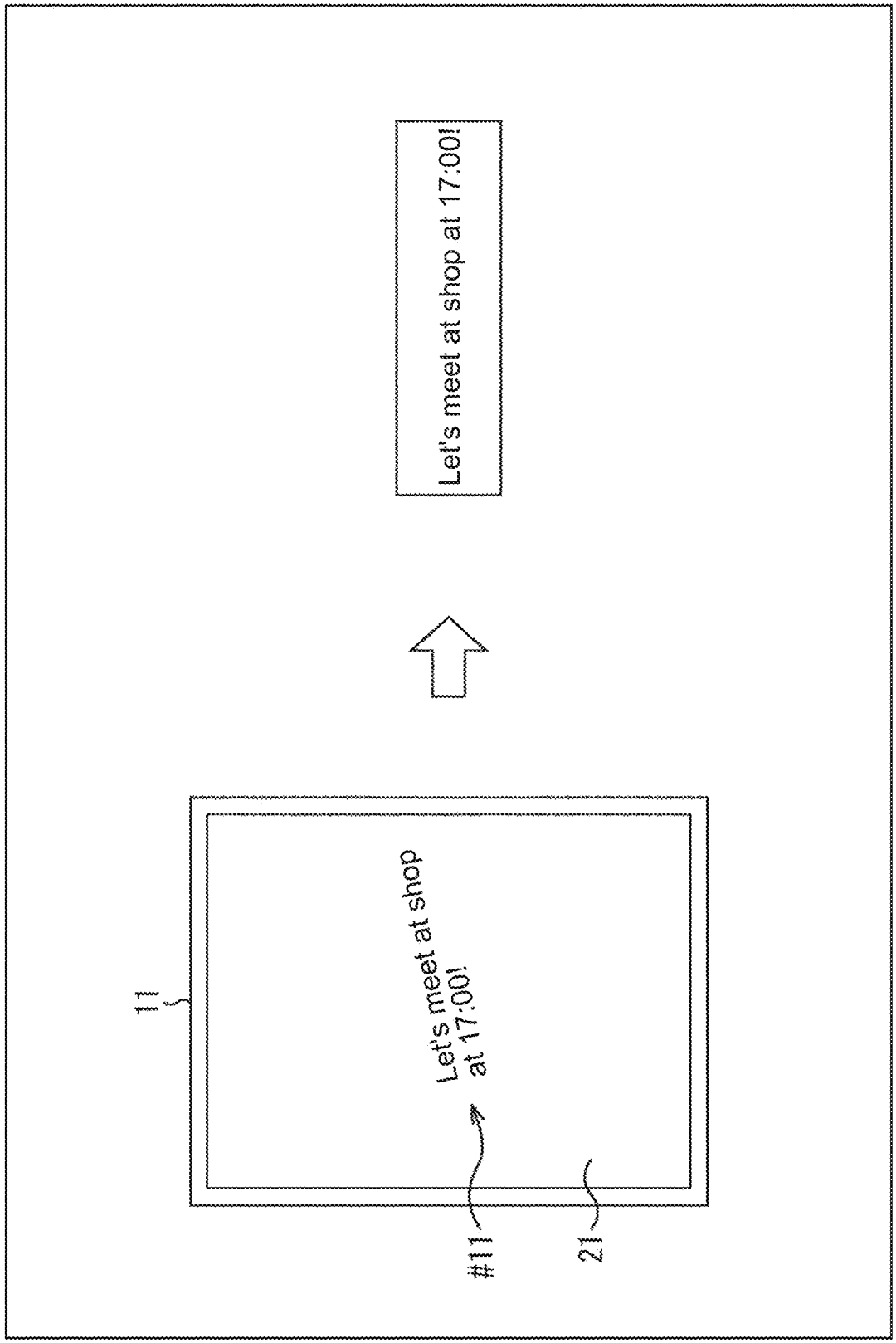
FIG. 37 is a view illustrating an example of conversion of handwriting characters into a text.

FIG. 37 is a view illustrating an example of conversion of the handwriting characters into a text.

In an example on the left of FIG. 37, "let's meet at the shop at 17:00!", which are handwriting characters, is written in the vicinity of the center of the display 21 as writing #11. In this case, as illustrated in front of a white empty arrow, the content of the writing #11 is recognized and text data is generated. The text data generated as described above is distributed to members of a community that is associated with the installation location of the electronic signboard 1.

Generation of the text data may be performed by the electronic signboard 1, or may be performed by the management server 101 on the basis of an image that represents the display content of the electronic signboard 1.

Description will be given of distribution processing of the management server 101 with reference to a flowchart of FIG. 38.

Figure 38:
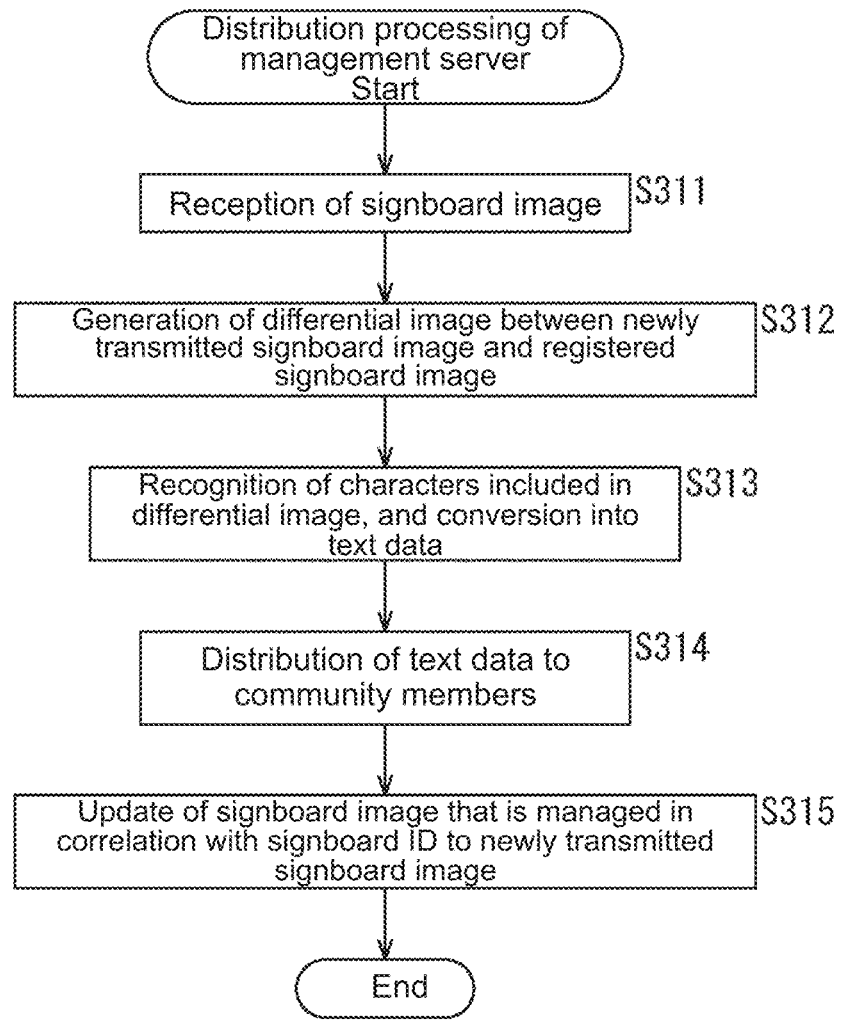
FIG. 38 is a flowchart illustrating distribution processing of the management server.

The processing in FIG. 38 is processing that is performed in a case where generation of the text data is performed by the management server 101. The processing in FIG. 38 is performed when the processing described with reference to FIG. 28 is performed in the electronic signboard 1, and the signboard image is transmitted from the electronic signboard 1.

In step S311, the communication control unit 122 receives the signboard image transmitted from the electronic signboard 1. The signboard image transmitted from the electronic signboard 1 is an image that represents the entire display content of the electronic signboard 1. A signboard ID is applied to the signboard image. The signboard image received by the communication control unit 122 is output to the signboard image management unit 123.

In step S312, the signboard image management unit 123 acquires a signboard image, which is managed in correlation with the signboard ID, from the signboard image storage unit 114, and generates the differential image between the signboard image that is newly transmitted, and the registered signboard image that is acquired from the signboard image storage unit 114. In a case where writing of handwriting characters is performed, a differential image including a region of the handwriting characters is generated.

In step S313, the signboard image management unit 123 recognizes characters included in the differential image, and converts the handwriting characters into text data.

In step S314, the communication control unit 122 distributes the text data obtained by performing conversion to portable terminals 61 of members of a community that is associated with the installation location of the electronic signboard 1 that transmits the signboard image. In the portable terminals 61, display of the text data is performed.

In step S315, the signboard image management unit 123 updates the signboard image managed in correlation with the signboard ID to the new signboard image that is received in step S311, and terminates the processing.

Through the above-described processing, the community members can easily confirm handwriting characters written on the electronic signboard 1.

<3: Enlargement Display of Writing Portion>

In a case where the writing portion is small, when a user photographs display of the electronic signboard 1 with the camera 75 of the portable terminal 61, a through-image obtained by enlarging a writing portion may be displayed on the display 77 of the portable terminal 61. This example corresponds to an example in a case where writing of the electronic signboard 1 is confirmed by photographing an image of the writing with the camera 75 of the portable terminal 61 instead of confirming the content of the writing by the signboard image distributed from the management server 101 and the like.

Figure 39:
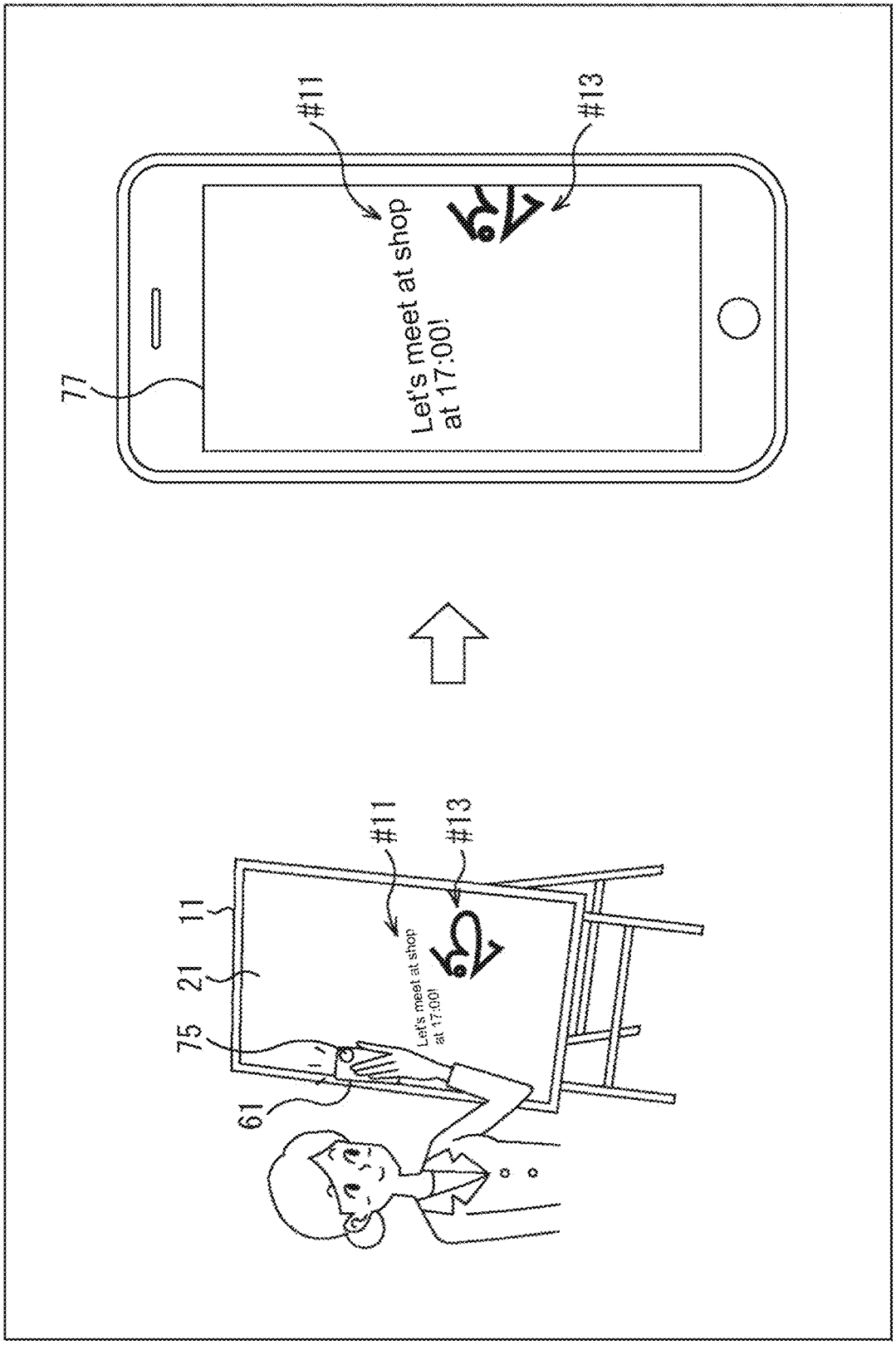
FIG. 39 is a view illustrating a writing confirmation aspect.

FIG. 39 is a view illustrating a writing confirmation aspect.

In an example on the left of FIG. 39, "let's meet at the shop at 17:00!", which are handwriting characters, is written in the vicinity of the center of the display 21 as writing #11. In addition, the same writing #13 as described with reference to FIG. 34 is written on a lower-right side of the display 21. The size of the writing #11 in FIG. 39 is smaller in comparison to the size of the writing #11 in FIG. 34.

In a case where a community member photographs display of the electronic signboard 1 with the camera 75 of the portable terminal 61 at the installation location of the electronic signboard 1, as illustrated in front of a white empty arrow, the writing #11 is displayed on the display 77 of the portable terminal 61 in an enlarged manner.

According to this, community members can easily confirm the small writing. Hereinafter, description will be given of a series of processing of realizing the enlargement display.

Description will be given of distribution processing of the management server 101 with reference to a flowchart of FIG. 40.

Figure 40:
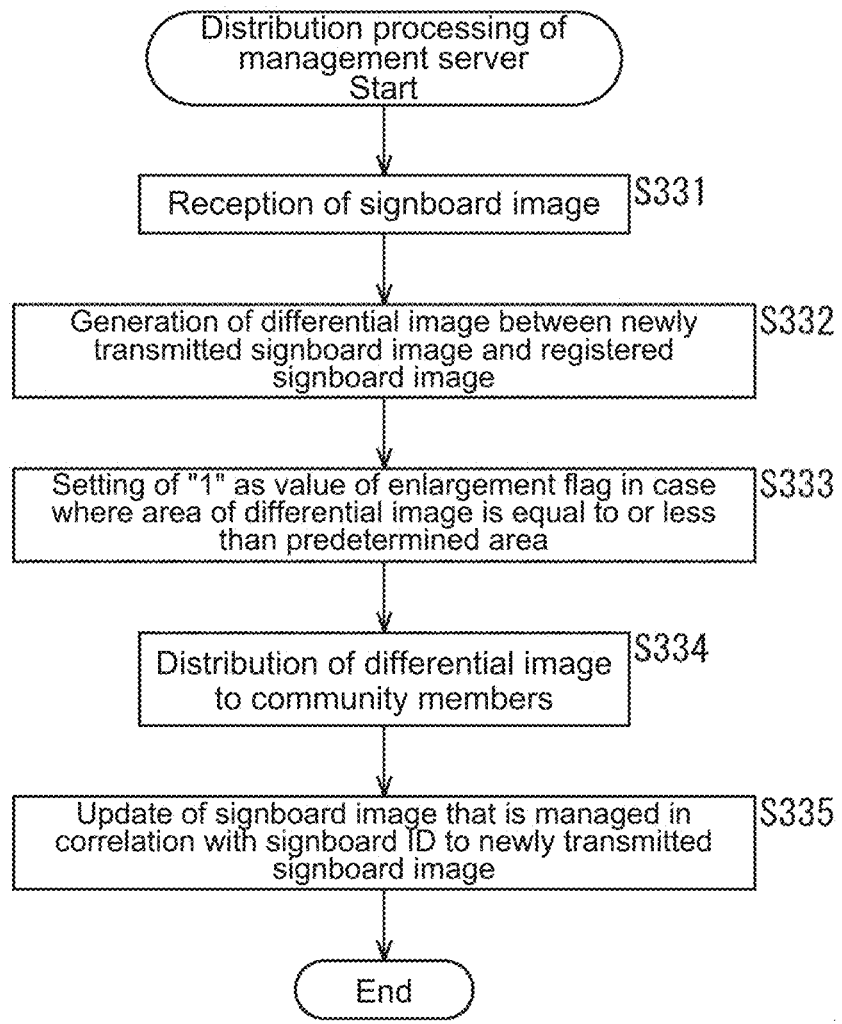
FIG. 40 is a flowchart illustrating distribution processing of the management server.

The processing in FIG. 40 is performed when the processing described with reference to FIG. 28 is performed in the electronic signboard 1, and the signboard image is transmitted from the electronic signboard 1. In a case where small writing is performed, a signboard image including the small writing is transmitted from the electronic signboard 1.

In step S331, the communication control unit 122 receives the signboard image transmitted from the electronic signboard 1. The signboard image transmitted from the electronic signboard 1 is an image representing the entire display content of the electronic signboard 1. A signboard ID is applied to the signboard image. The signboard image received by the communication control unit 122 is output to the signboard image management unit 123.

In step S332, the signboard image management unit 123 acquires a signboard image, which is registered in correlation with the signboard ID, from the signboard image storage unit 114, and generates a differential image between the signboard image that is newly transmitted, and the registered signboard image that is acquired from the signboard image storage unit 114.

In step S333, in a case where an area of the differential image is equal to or less than a predetermined area that is a threshold value, the signboard image management unit 123 sets "1" as a value of an enlargement flag. The enlargement flag is a flag that is set for every electronic signboard. A situation in which the value of the enlargement flag is "1" represents that the small writing is performed.

In step S334, the communication control unit 122 distributes the differential image, which is generated by the signboard image management unit 123, to portable terminals 61 of members of the community that is associated with the installation location of the electronic signboard 1 that transmits the signboard image. In the portable terminals 61, display of the differential image including small characters is performed.

According to this, the members of the community can understand that the small writing is performed in the electronic signboard 1. A user who desires to confirm the content of the writing goes to the installation location of the electronic signboard 1.

In step S335, the signboard image management unit 123 updates the signboard image managed in correlation with the signboard ID to the new signboard image that is received in step S331, and terminates the processing.

Figure 41:
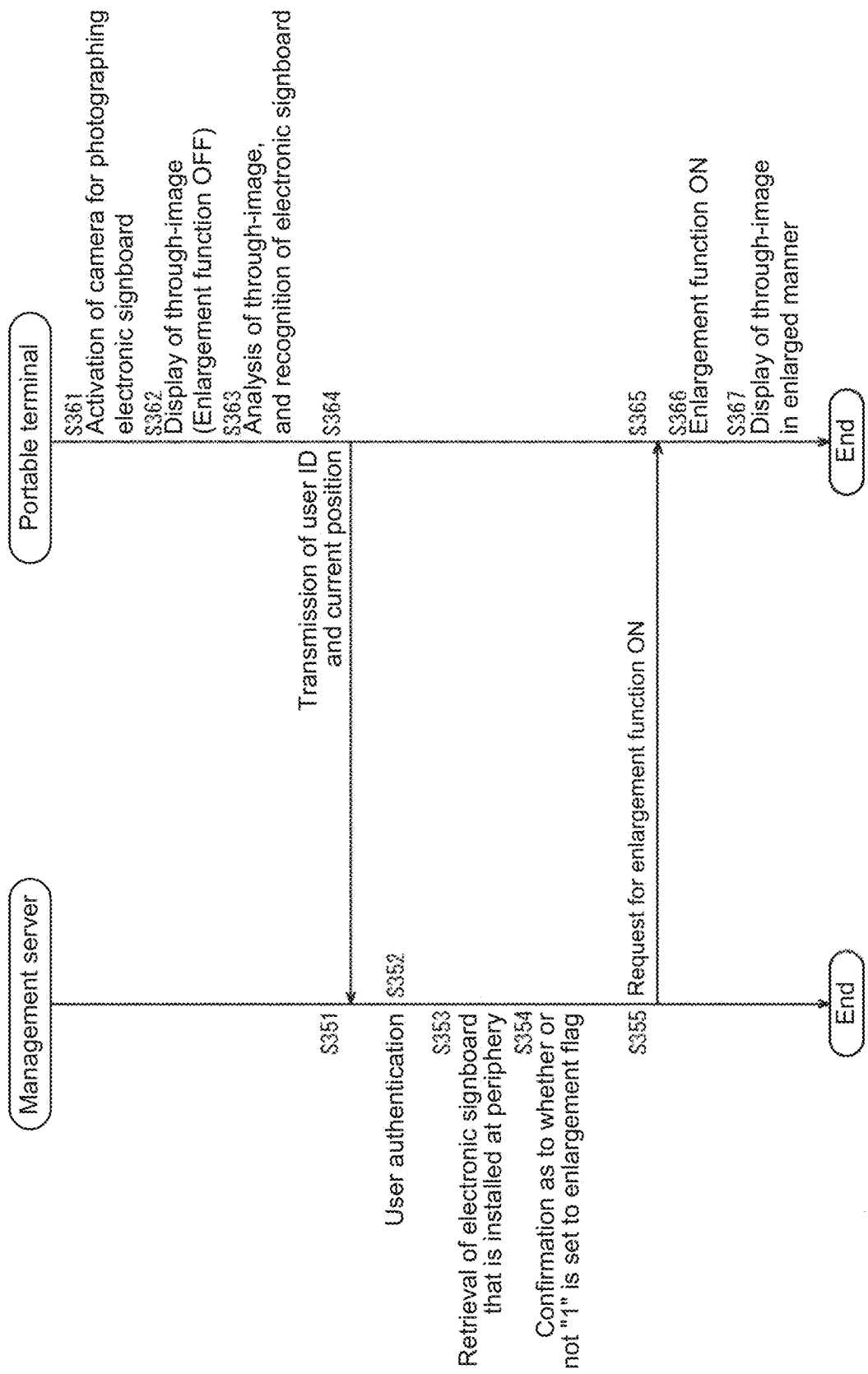
FIG. 41 is a sequence illustrating writing browsing processing.

Next, description will be given of writing browsing processing that is performed between the portable terminal 61 and the management server 101 with reference to a sequence of FIG. 41.

The user of the portable terminal 61 is a community member who confirms that writing is performed on the electronic signboard 1 with the differential image distributed from the management server 101 through the processing in FIG. 40. It is assumed that the user of the portable terminal 61 is going to the installation location of the electronic signboard 1.

In step S361, the control unit 71 of the portable terminal 61 executes a predetermined application, for example, in correspondence with a user's operation, and activates the camera 75 to photograph display of the electronic signboard 1. After the camera 75 is activated, taking-in of a moving image is initiated.

In step S362, the display control unit 94 allows the display 77 to display the through-image on the basis of an output of the camera 75. At this time, the display control unit 94 sets a through-image enlargement function to "OFF". A user of the portable terminal 61 adjusts a display range on the display 77 by changing a direction of the portable terminal 61 and the like while confirming the through-image.

In step S363, the control unit 71 analyzes the through-image and recognizes a target that is reflected on the through-image. When the user makes the camera 75 face the electronic signboard 1, the electronic signboard 1 is recognized by the control unit 71. The control unit 71 is provided with recognition information that represents characteristics of the external appearance of the electronic signboard 1 and is used to recognize the electronic signboard 1.

The electronic signboard 1 may be recognized when a QR code (registered trademark) is photographed. The QR code (registered trademark) may be displayed on the display 21, or may be attached to a predetermined position of the electronic signboard 1 with a seal and the like.

In a case where the electronic signboard 1 is recognized, in step S364, the communication control unit 93 transmits a user ID and information of a current position to the management server 101.

In step S351, the communication control unit 122 of the management server 101 receives the user ID and the position information which are transmitted from the portable terminal 61.

In step S352, the community management unit 121 performs authentication as to whether or not the user of the portable terminal 61 is a member of a community that is associated with the installation location of the electronic signboard 1 with reference to the community information. The authentication as to whether or not the user is the community member is performed on the basis of the user ID.

In a case where the user of the portable terminal 61 is authenticated as the community member, in step S353, the community management unit 121 retrieves an electronic signboard that is installed at the periphery of the current position of the portable terminal 61. As described above, information of the installation location of the electronic signboard, which is associated with each community, is included in the community information that is stored in the community information storage unit 113. Through the retrieval, the electronic signboard 1 that the camera 75 of the user of the portable terminal 61 faces is found.

In step S354, the signboard image management unit 123 confirms that the electronic signboard 1 found through the retrieval is an electronic signboard in which "1" is set to the value of the enlargement flag.

In step S355, the communication control unit 122 transmits control information, which gives an instruction for turning-ON of the through-image enlargement function, to the portable terminal 61.

In step S365, the communication control unit 93 of the portable terminal 61 receives the control information transmitted from the management server 101.

In step S366, the control unit 71 sets the through-image enlargement function to "ON".

In step S367, the display control unit 94 allows the display 77 to display the through-image in an enlarged manner. Writing of the electronic signboard 1 is automatically displayed on the display 77 in an enlarged manner without depending on a user's operation.

In a case where writing #11 by small handwriting characters is included in a photographing range of the camera 75, the writing #11 is displayed on the through-image in an enlarged manner. The user of the portable terminal 61 can easily confirm the writing without performing an operation for enlargement display.

<4: Display of Encrypted Characters>

In a case where characters written on the electronic signboard 1 are encrypted characters, when photographing display of the electronic signboard 1 with the camera 75 of the portable terminal 61 of the user, an image of decoded characters as a decoding result of the encrypted characters may be displayed on the display 77 of the portable terminal 61. This example also corresponds to an example in a case where writing of the electronic signboard 1 is photographed with the camera 75 of the portable terminal 61, and is confirmed on a through-image.

Figure 42:
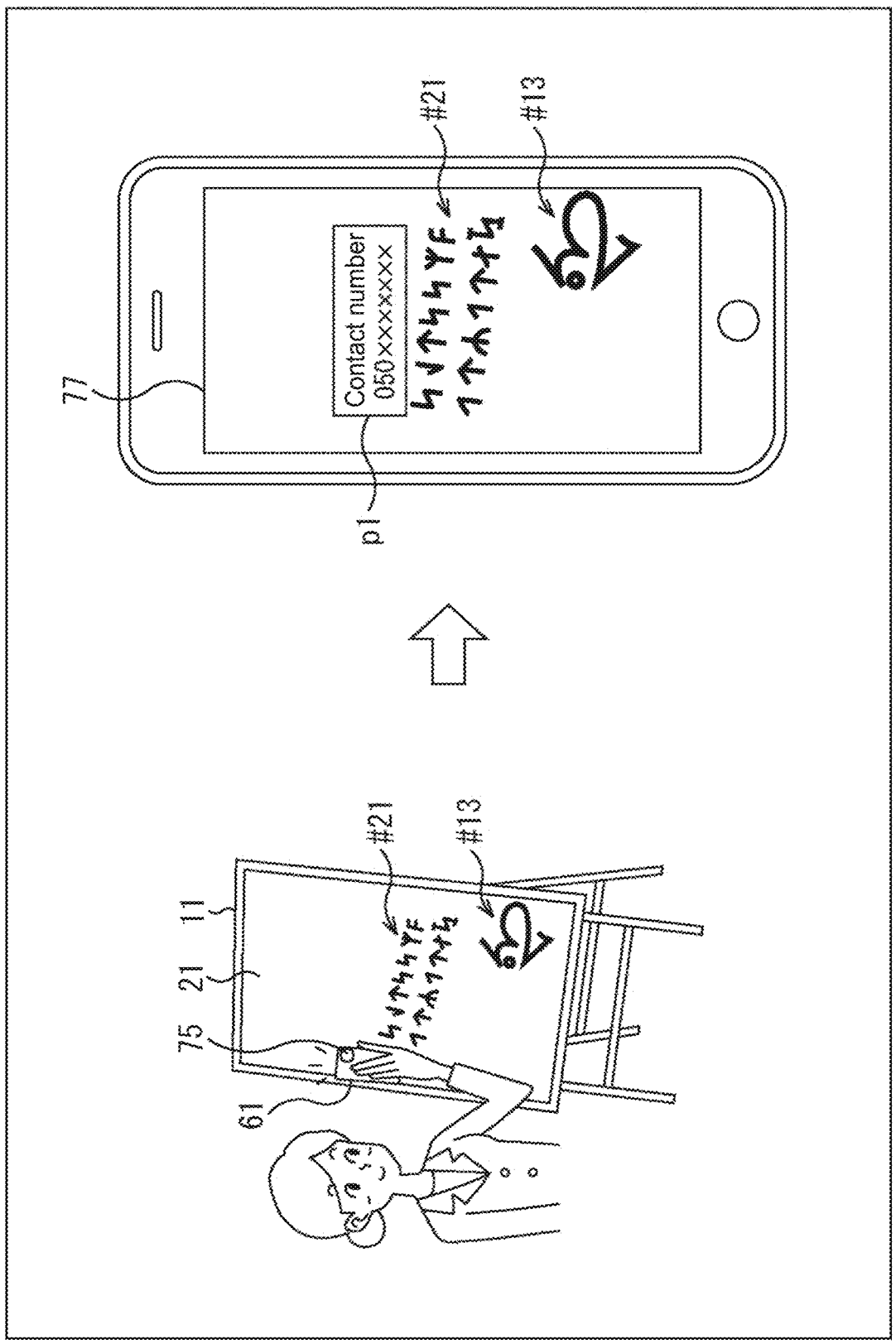
FIG. 42 is a view illustrating a writing confirmation aspect.

FIG. 42 is a view illustrating a writing confirmation aspect.

In an example on the left of FIG. 42, encrypted characters are written as writing #21 across two rows in the vicinity of the center of the display 21. In addition, writing #13 is written on a lower-right side of the display 21.

In a case where a community member goes to the installation location of the electronic signboard 1, and photographs display of the electronic signboard 1 with the camera 75 of the portable terminal 61, as illustrated in front of a white empty arrow, a decoded image p1 that is an image of decoded characters is displayed on the display 77 of the portable terminal 61 in a state of being superimposed on a through-image.

In the example in FIG. 42, it is assumed that the decoded image p1 is, for example, an image of a contact number of a user who writes the encrypted characters. The decoded image p1 is continuously displayed when the writing #21 is included in a photographing range of the camera 75.

According to this, community members can confirm the content of the encrypted characters from the decoded image that is displayed as augmented reality (AR) information.

The image of the decoded characters is displayed only in a case where a user who photographs writing of the electronic signboard 1 is a member of the community. Even though a person who is not the member of the community photographs the writing of the electronic signboard 1, the image of the decoded characters is not displayed. Accordingly, when encrypted characters are determined in advance within the community, members of the community can encourage communication by using the encrypted characters.

Encouragement of communication is performed by leaving a symbol such as so-called tugging that can be understood only in the same group. The same communication is realized by using the electronic signboard 1. Hereinafter, description will be given of a series of processing for realizing display of the image of the decoded characters.

Description will be given of distribution processing of the management server 101 with reference to a flowchart of FIG. 43.

Figure 43:
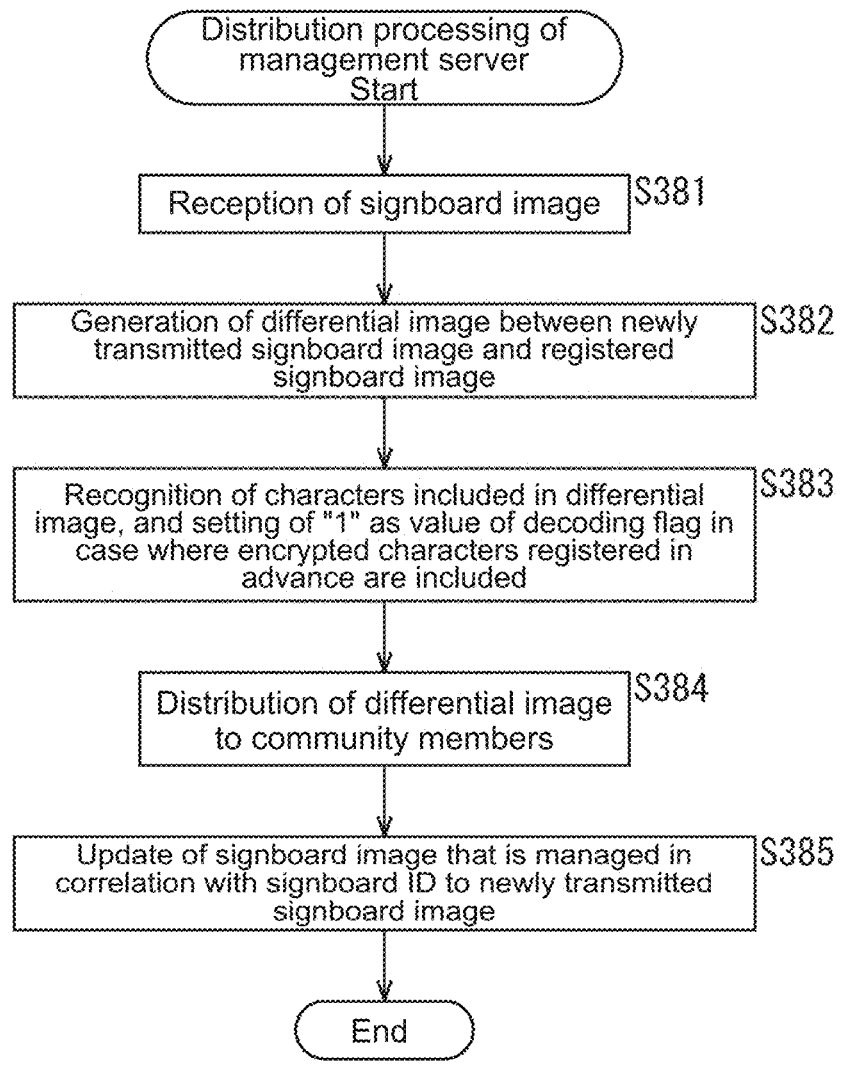
FIG. 43 is a flowchart illustrating distribution processing of the management server.

The processing in FIG. 43 is performed when the processing described with reference to FIG. 28 is performed in the electronic signboard 1 and a signboard image is transmitted from the electronic signboard 1. In a case where writing by encrypted characters is performed, a signboard image including the writing is transmitted from the electronic signboard 1.

In step S381, the communication control unit 122 receives the signboard image transmitted from the electronic signboard 1. The signboard image transmitted from the electronic signboard 1 is an image that represents the entire display content of the electronic signboard 1. A signboard ID is applied to the signboard image. The signboard image received by the communication control unit 122 is output to the signboard image management unit 123.

In step S382, the signboard image management unit 123 acquires a signboard image, which is registered in correlation with the signboard ID, from the signboard image storage unit 114, and generates a differential image between the signboard image that is newly transmitted, and the registered signboard image that is acquired from the signboard image storage unit 114.

In step S383, the signboard image management unit 123 recognizes characters included in the differential image, and sets "1" as a value of a decoding flag in a case where encrypted characters registered in advance are included in the differential image. The decoding flag is a flag that is set for every electronic signboard. A situation in which the value of the decoding flag is "1" represents that writing by encrypted characters is performed.

In step S384, the communication control unit 122 distributes the differential image, which is generated by the signboard image management unit 123, to portable terminals 61 of members of the community that is associated with the installation location of the electronic signboard 1 that transmits the signboard image. In the portable terminals 61, display of the differential image including encrypted characters is performed.

According to this, the members of the community can understand that the writing by encrypted characters is performed in the electronic signboard 1. A user who desires to confirm the content of the writing goes to the installation location of the electronic signboard 1.

In step S385, the signboard image management unit 123 updates the signboard image managed in correlation with the signboard ID to the new signboard image that is received in step S381, and terminates the processing.

Next, description will be given of writing browsing processing that is performed between the portable terminal 61 and the management server 101 with reference to a sequence of FIG. 44.

A user of the portable terminal 61 is a community member who confirms that writing by encrypted characters is performed in the electronic signboard 1 with the differential image that is distributed from the management server 101 in the processing in FIG. 43. It is assumed that the user of the portable terminal 61 is going to the installation location of the electronic signboard 1.

In step S421, the control unit 71 of the portable terminal 61 activates the camera 75 to photograph display of the electronic signboard 1. After the camera 75 is activated, taking-in of a moving image is initiated.

In step S422, the display control unit 94 allows the display 77 to display the through-image on the basis of an output of the camera 75. At this time, the display control unit 94 sets a through-image decoding function to "OFF". A user of the portable terminal 61 adjusts a display range on the display 77 by changing a direction of the portable terminal 61 and the like while confirming the through-image.

In step S423, the control unit 71 analyzes the through-image and recognizes a target that is reflected on the through-image. When the user makes the camera 75 face the electronic signboard 1, the electronic signboard 1 is recognized by the control unit 71.

In a case where the electronic signboard 1 is recognized, in step S424, the communication control unit 93 transmits a user ID and information of a current position to the management server 101.

In step S401, the communication control unit 122 of the management server 101 receives the user ID and the position information which are transmitted from the portable terminal 61.

In step S402, the community management unit 121 performs authentication as to whether or not the user of the portable terminal 61 is a member of a community that is associated with the installation location of the electronic signboard 1 with reference to the community information.

In a case where the user of the portable terminal 61 is authenticated as the community member, in step S403, the community management unit 121 retrieves an electronic signboard that is installed at the periphery of the current position of the portable terminal 61.

In step S404, the signboard image management unit 123 confirms that the electronic signboard 1 found through the retrieval is an electronic signboard in which "1" is set to the value of the decoding flag.

In step S405, the communication control unit 122 transmits control information, which gives an instruction for turning-ON of the through-image decoding function, to the portable terminal 61.

In step S425, the communication control unit 93 of the portable terminal 61 receives the control information transmitted from the management server 101.

In step S426, the control unit 71 sets the through-image decoding function to "ON".

In step S427, the display control unit 94 extracts and decodes the encrypted characters reflected on the through-image. In decoding of the encrypted characters, decoding information that is prepared in advance can be used. For example, information in which encrypted characters and decoded characters are correlated with each other is set with respect to the control unit 71. The display control unit 94 displays an image of decoded characters obtained through decoding in a state of being superimposed on the through-image.

Through the above-described processing, the user of the portable terminal 61 can confirm the content of the writing by encrypted characters.

Instead of displaying the decoded characters in a case where the writing by encrypted characters is performed, in a case where writing by characters of a predetermined language is performed, translated characters translated into another language may be displayed.

<5: Encryption of Writing Characters>

When writing by typical characters which are not encrypted characters is performed, the typical characters may be automatically converted into encrypted characters and may be displayed as the encrypted characters on the electronic signboard 1. Writing by the typical characters before conversion is distributed to community members.

In a case where each of the community members photographs the encrypted characters of the electronic signboard 1 with the camera 75 of the portable terminal 61, as described with reference to FIG. 42 and the like, an image of decoded characters is displayed on the display 77 of the portable terminal 61.

Figure 45:
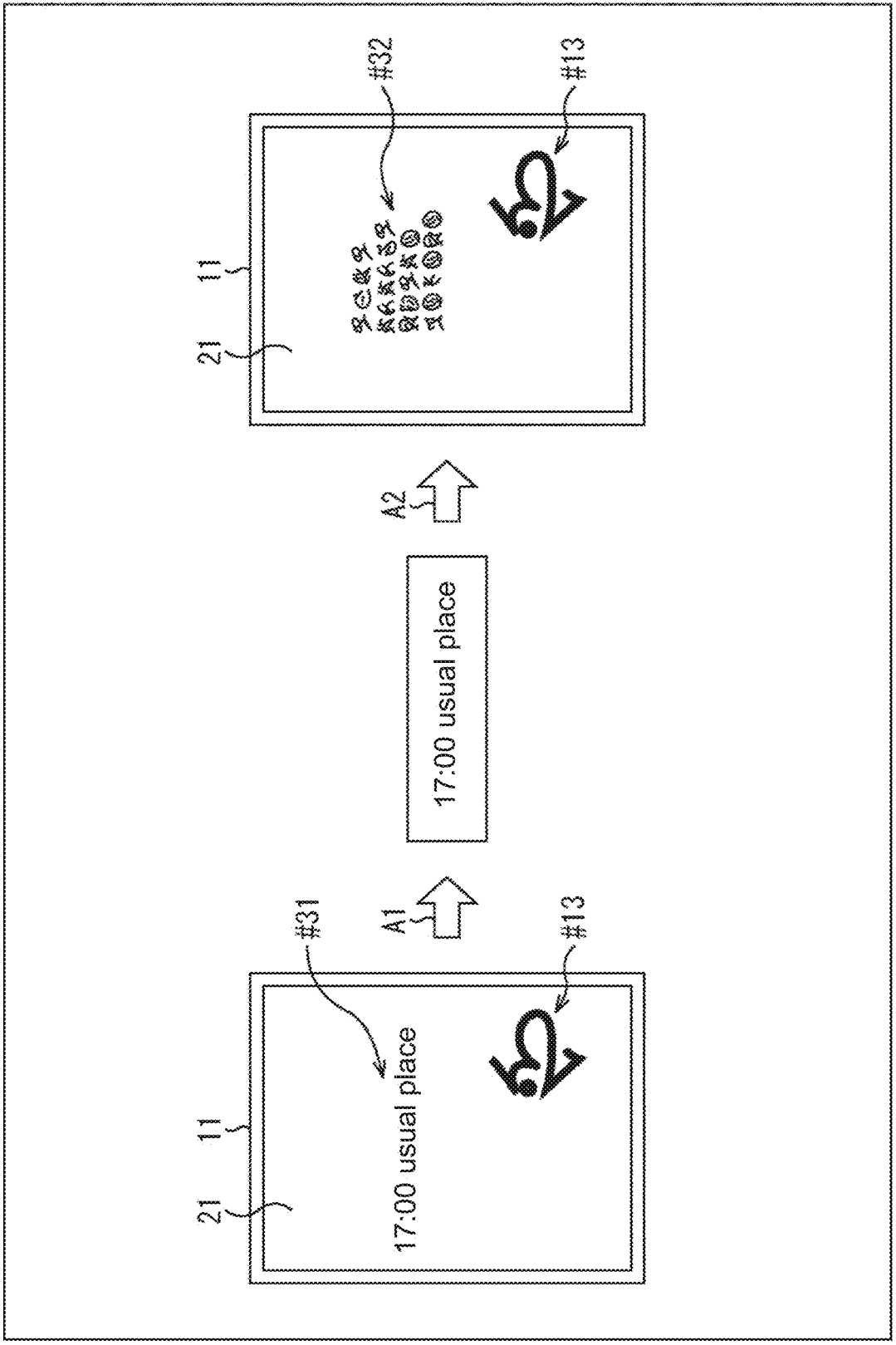
FIG. 45 is a view illustrating an example of encryption of handwriting characters.

FIG. 45 is a view illustrating an example of encryption of handwriting characters.

As illustrated on the left of FIG. 45, in a case where writing #31 is written by handwriting characters, as illustrated in front of a white empty arrow A1, the content of the writing #31 is recognized, and text data of "17:00 usual place" is generated. The text data of "17:00 usual place" is distributed to community members.

In addition, the generated text data is encrypted, and writing #32 that indicates "17:00 usual place" with encrypted characters as illustrated in front of the white empty arrow A2 is displayed on the display 21 of the electronic signboard 1.

Generation of the encrypted characters may be performed by the electronic signboard 1, or may be performed by the management server 101 on the basis of an image that represents the entire display content.

Figure 46:
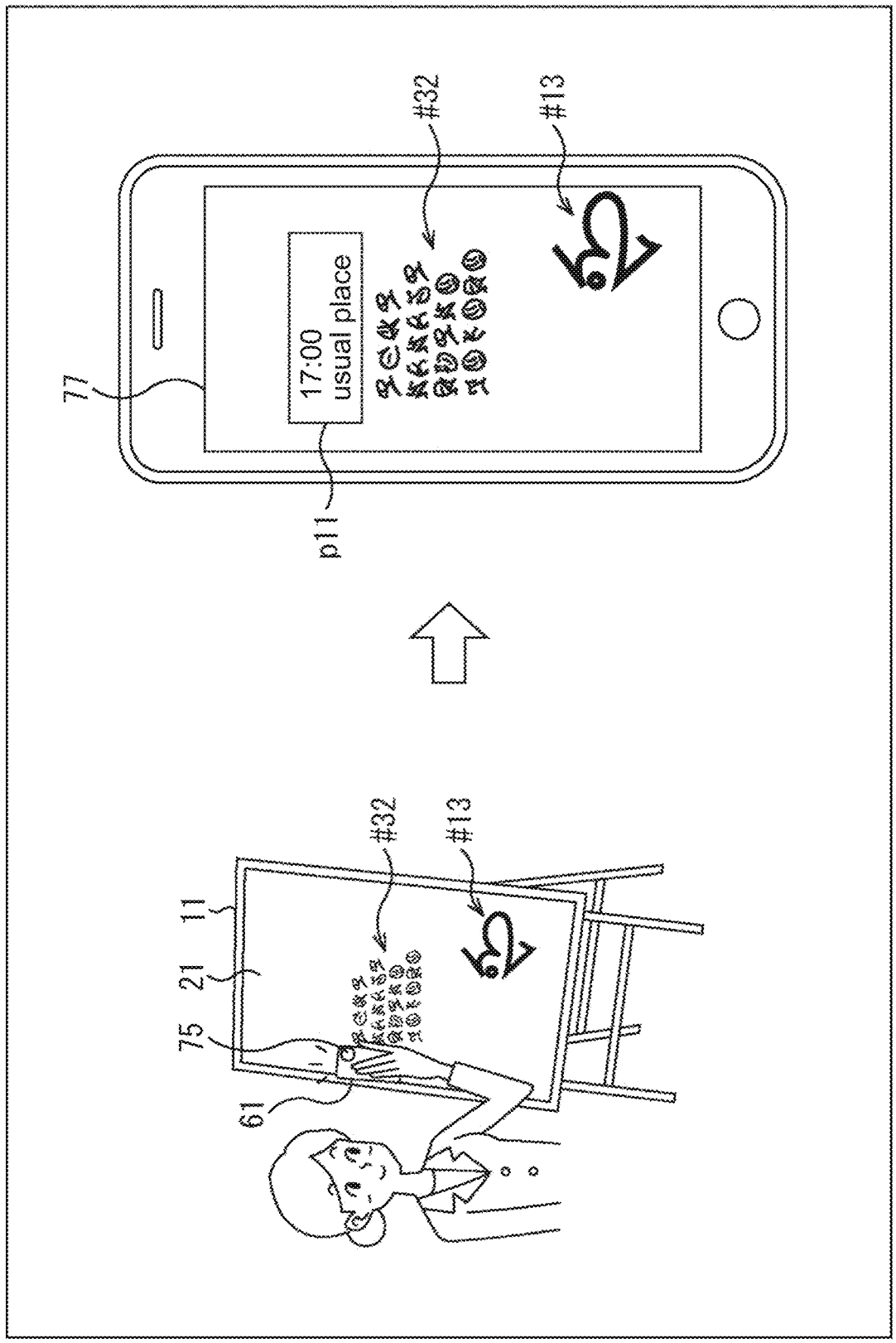
FIG. 46 is a view illustrating a writing confirmation aspect.

FIG. 46 is a view illustrating a writing confirmation aspect.

In an example on the left of FIG. 46, the same writing #32 by encrypted characters as illustrated in FIG. 45 is written in the vicinity of the center of the display 21. In addition, writing #13 is written on a lower-right side of the display 21.

In a case where a community member goes to the installation location of the electronic signboard 1 and photographs display of the electronic signboard 1 with the camera 75 of the portable terminal 61, as illustrated in front of a white empty arrow, a decoded image p11 that is an image of decoded characters is displayed on the display 77 of the portable terminal 61 in a state of being superimposed on a through-image. In the example of FIG. 46, the decoded image p11 is an image of decoded characters of "17:00 usual place" obtained through conversion into a text.

According to this, even when a community member who performs writing does not know encrypted characters, the community member can leave the writing by encrypted characters on the electronic signboard 1. In addition, the community member can encourage communication by using the encrypted characters. Hereinafter, a series of processing for realizing display of the encrypted characters will be described.

Description will be given of distribution processing of the management server 101 with reference to a flowchart of FIG. 47.

Figure 47:
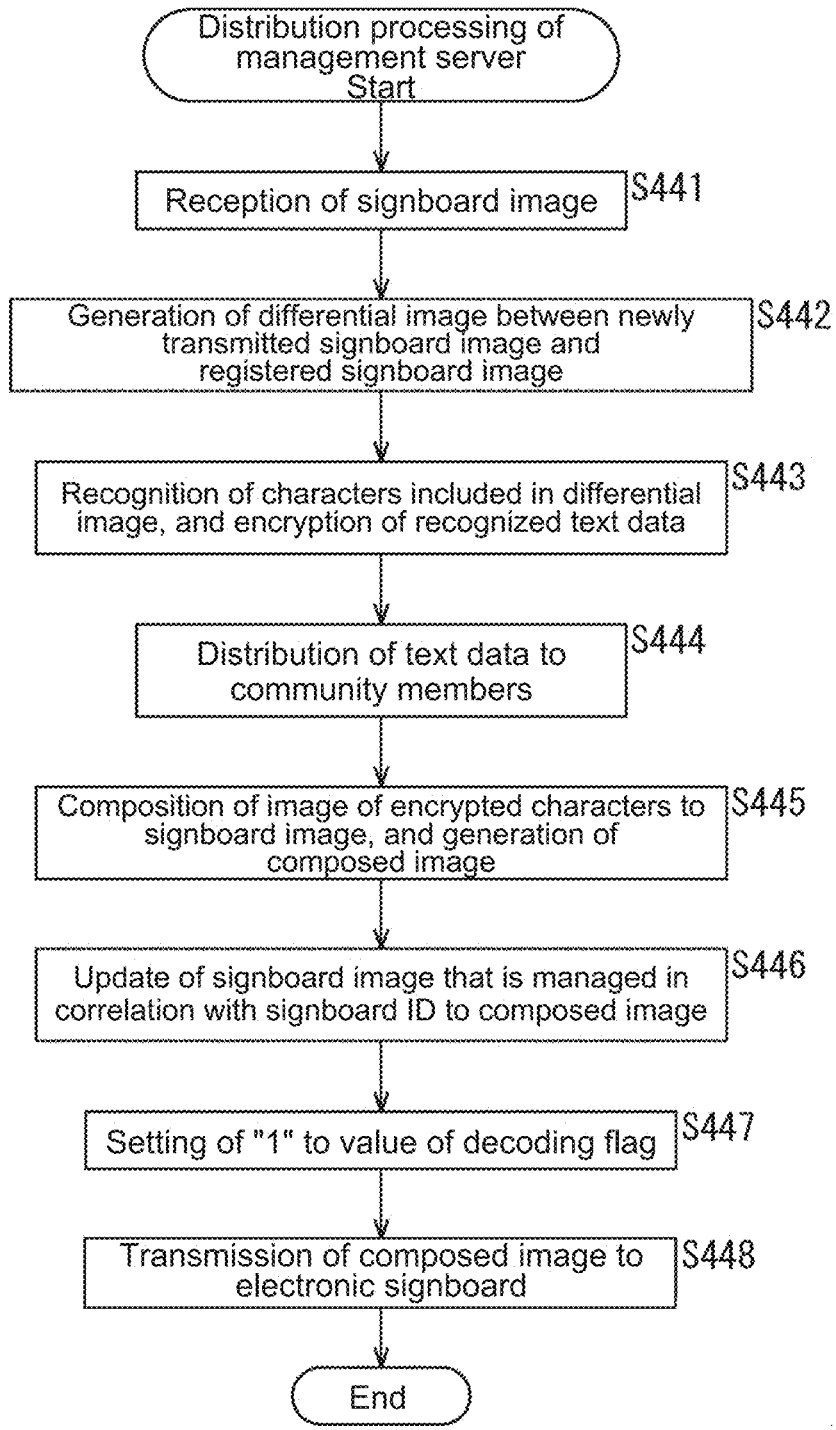
FIG. 47 is a flowchart illustrating distribution processing of the management server.

The processing in FIG. 47 is performed when the processing described with reference to FIG. 28 is performed in the electronic signboard 1 and a signboard image is transmitted from the electronic signboard 1. In a case where writing by typical characters is performed, a signboard image including the writing by the typical characters is transmitted from the electronic signboard 1.

In step S441, the communication control unit 122 receives the signboard image transmitted from the electronic signboard 1. The signboard image transmitted from the electronic signboard 1 is an image that represents the entire display content of the electronic signboard 1. A signboard ID is applied to the signboard image. The signboard image received by the communication control unit 122 is output to the signboard image management unit 123.

In step S442, the signboard image management unit 123 acquires a signboard image, which is registered in correlation with the signboard ID, from the signboard image storage unit 114, and generates a differential image between the signboard image that is newly transmitted, and the registered signboard image that is acquired from the signboard image storage unit 114.

In step S443, the signboard image management unit 123 recognizes characters included in the differential image, and converts the handwriting characters into text data. In addition, the signboard image management unit 123 encrypts respective characters of the text data after conversion.

In step S444, the communication control unit 122 distributes the text data to members of a community that is associated with the installation location of the electronic signboard 1 that transmits the signboard image. According to this, the community members can confirm the content of the writing with the text data.

In step S445, the signboard image management unit 123 composes an image of the encrypted characters obtained through encryption of the text data to a signboard image, and generates a composed image. The composed image is an image that represents the entire display content of the electronic signboard 1. However, in the composed image, a portion of the writing by the typical characters is substituted with the image of the encrypted characters.

In step S446, the signboard image management unit 123 updates the signboard image that is managed in correlation with the signboard ID to the composed image that is generated in step S445.

In step S447, the signboard image management unit 123 sets "1" as the value of the decoding flag.

In step S448, the communication control unit 122 transmits the composed image to the electronic signboard 1 that transmits the signboard image, and terminates the processing.

Next, description will be given of display processing of the electronic signboard 1 with reference to a flowchart of FIG. 48.

Figure 48:
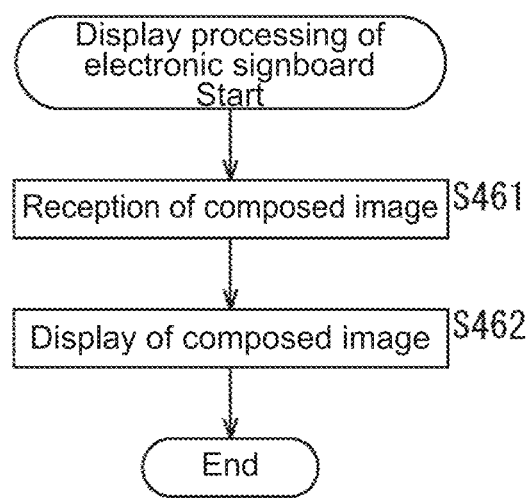
FIG. 48 is a flowchart illustrating display processing of the electronic signboard.

The processing in FIG. 48 is processing in correspondence with execution of the processing in FIG. 47 by the management server 101.

In step S461, the communication control unit 54 receives the composed image transmitted from the management server 101. The composed image is output to the display control unit 52.

In step S462, the display control unit 52 displays the composed image on the display 21, and terminates the processing. According to this, the image in which the portion of the writing by the typical characters is substituted with the image of the encrypted characters is displayed on the display 21. A person who is not a community member cannot confirm the content of the writing.

Figure 44:
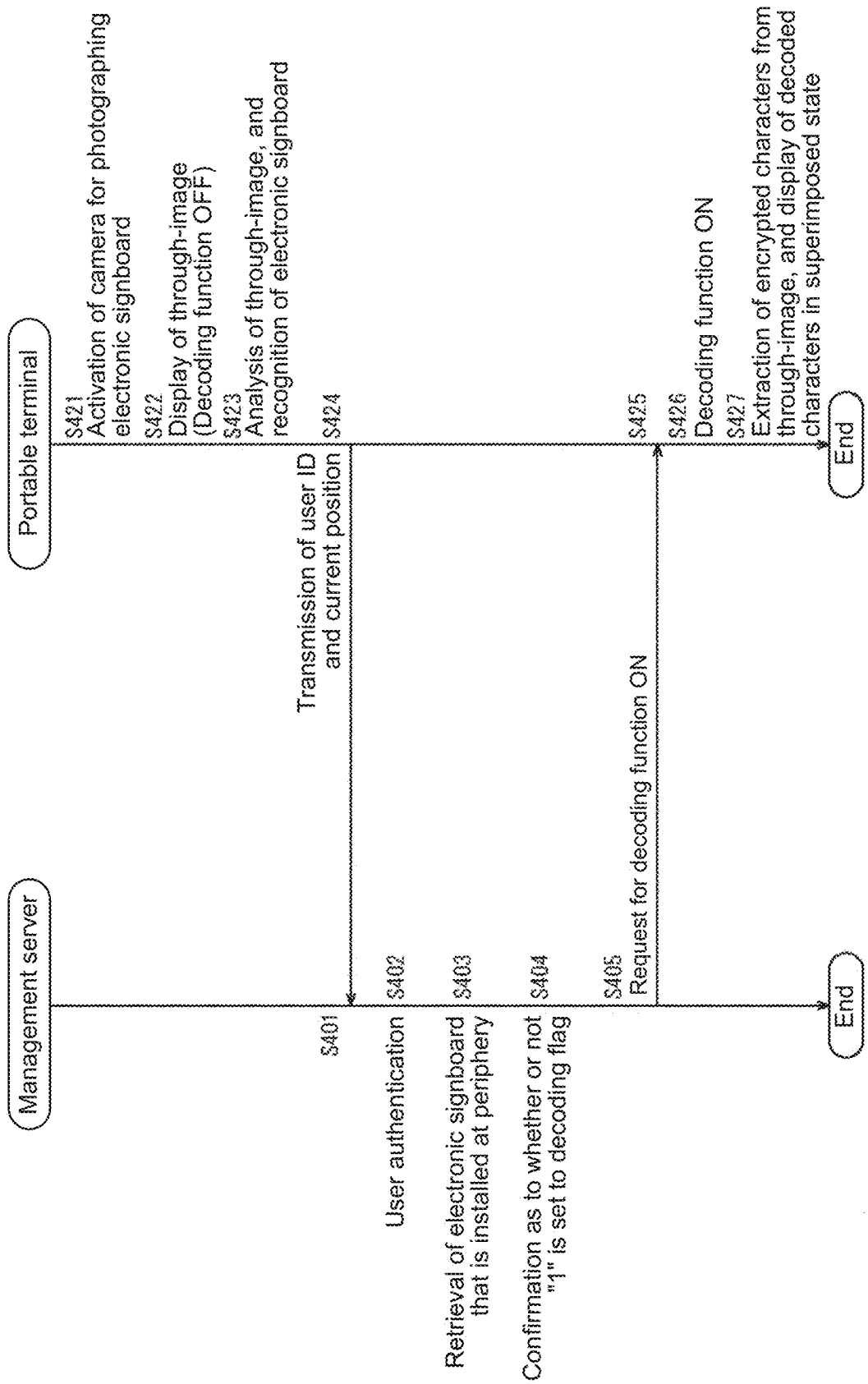
FIG. 44 is a sequence illustrating the writing browsing processing.

For example, in a case where a community member goes to the installation location of the electronic signboard 1, and makes the camera 75 of the portable terminal 61 face the electronic signboard 1, the processing described with reference to FIG. 44 is performed between the portable terminal 61 and the management server 101. The image of the decoded characters is displayed on the display 77 of the portable terminal 61 in a state of being superimposed on the through-image.

According to this, community members do not allow persons other than the community members to know the content of the writing, and thus it is possible to encourage communication.

As described above, various additive functions can be provided in the electronic signboard 1.

Hereinbefore, description has been made on the assumption that the electronic signboard 1 that is an actual device is prepared as an interface to which writing can be input. However, input of writing may be performed by using an interface that can be used on the portable terminal 61 at a specific location.

In this case, as described above, a community is formed by persons who perform marking at a specific location such as in front of a shop. When a member of the community associated with the specific location reaches the specific location, in the portable terminal 61, this situation is detected, and a predetermined screen is displayed on the display 77 as an interface that can be used in message input. A user of the portable terminal 61 who is a member of the community performs writing by using display of the display 77, and distributes the message to other community members.

The interface that can be used in message input can be used only at a specific location. Differently from the electronic signboard 1, the interface does not actually exist, and may be called a virtual interface. In this manner, message input may be performed by using the virtual interface.

Fourth Embodiment: Information Distribution Using Tunnel Map

Inter-community communication based on marking as described above may be performed through information that can be perceived by AR instead of being performed through writing with respect to the electronic signboard 1.

Figure 49:
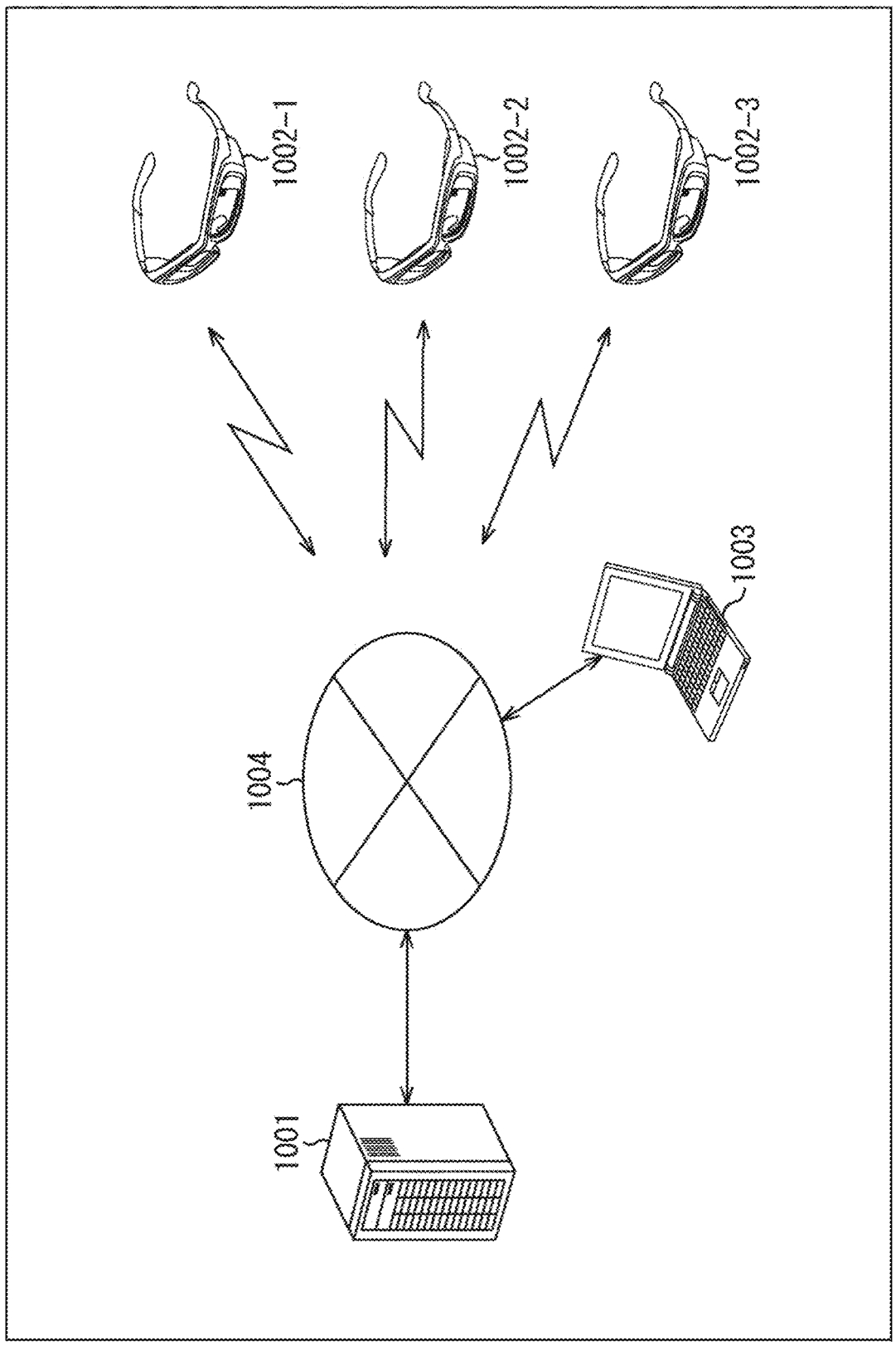
FIG. 49 is a view illustrating still another configuration example of the information processing system.

FIG. 49 is a view illustrating still another configuration example of the information processing system.

The information processing system in FIG. 49 has a configuration in which a management server 1001, a wearable devices 1002-1 to 1002-3, and an information processing device 1003 are connected to each other through a network 1004 such as the Internet.

Hereinafter, in a case where it is not necessary to discriminate the wearable devices 1002-1 to 1002-3, the wearable devices 1002-1 to 1002-3 are appropriately referred to as "wearable device 1002". A number of the wearable devices 1002 are connected to the network 1004. The wearable devices 1002 may be connected to the network 1004 through portable terminals carried by users who wear the wearable devices 1002 without being directly connected to the network 1004.

The management server 1001 manages a tunnel map that is a virtual space in which users perform communication.

Although details will be described later, the tunnel map is constructed by sticking various pieces of information on an inner wall of a tunnel-shaped space. A user who wears the wearable device 1002 can view the information stuck to the tunnel map in a state of being superimposed on an actual landscape.

In addition, the management server 1001 forms a community on the basis of a history of marking that is performed by the user who wears the wearable device 1002. In a case where writing is performed by a community member, the management server 1001 updates a DB so that other community members can confirm the writing on the tunnel map, and distributes the content of the writing to the community members.

The wearable device 1002 is an eyeglass-type HMD. For example, the wearable device 1002 has an optical transmission type information display function. A user who wears the wearable device 1002 can view information displayed by the wearable device 1002 in a state of being superimposed on a forward landscape.

Figure 50:
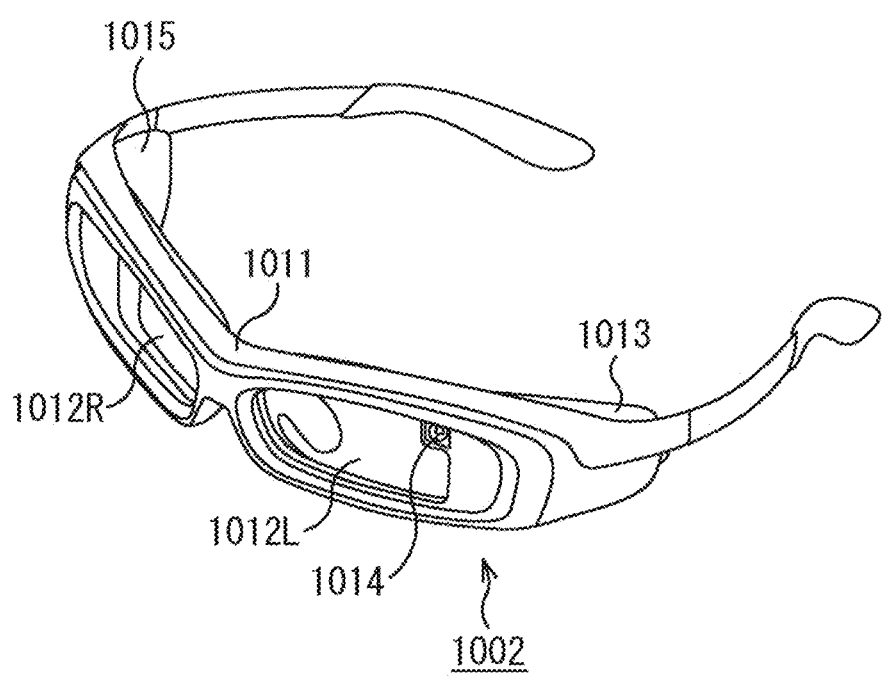
FIG. 50 is a view illustrating an external appearance of a wearable device.

FIG. 50 is a view illustrating an external appearance of the wearable device 1002.

As illustrated in FIG. 50, a lens 1012L is formed at a position in front of the frame 1011 and in front of a left eye of a user who wears the wearable device 1002, and a lens 1012R is formed at a position in front of a right eye of the user.

In addition, a unit 1013 is provided to swell inward at a position on an inner side of the lens 1012L in the vicinity of the base of a left temple of a frame 1011. A camera 1014 is provided on a front side of the unit 1013. The camera 1014 photographs a front landscape of the user through the lens 1012L. A photographing direction of the camera 1014 matches a direction of the user who wears the wearable device 1002. For example, a signal processing module that processes an image transmitted from the camera 1014, and a battery are embedded in the unit 1013.

On the other hand, a unit 1015 is provided to swell inward at a position on an inner side of the lens 1012R in the vicinity of the base of a right temple of the frame 1011. For example, a display device that displays various pieces of information by using the lens 1012R as a display, and a communication module are embedded in the unit 1015.

Figure 51:
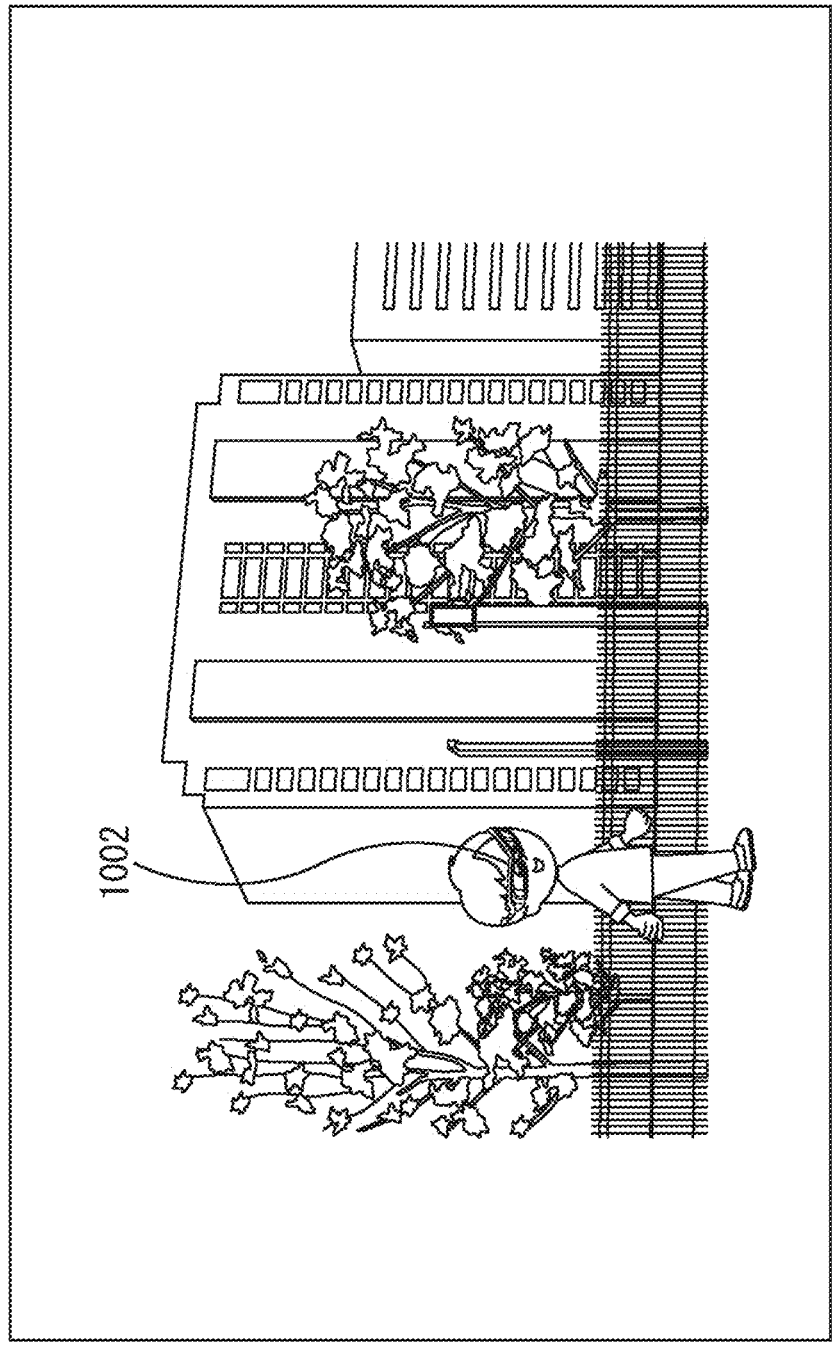
FIG. 51 is a view illustrating a use state of the wearable device.

The user wears the wearable device 1002 having the above-described external appearance on the head, and moves on a street on foot or on a bicycle, for example, as illustrated in FIG. 51. During movement, an image of a landscape in front of the user, which is photographed by the camera 1014, is transmitted to the management server 1001 appropriately in combination with position information and the like.

Various pieces of information such as an image of the tunnel map are transmitted from the management server 1001 to the wearable device 1002. The user can view information displayed by the wearable device 1002 in a state of being superimposed on the landscape.

Note that, a shape of the wearable device 1002 is not limited to the eyeglass type, and may be a shape of an externally attached module that is mounted to an eyeglass. In addition, a display type of the wearable device 1002 is not limited to the optical transmission type, and may be set to various types such as a video transmission type in which a video photographed by a camera is displayed in combination with various pieces of information, a non-transmission type, and an image projection type.

Returning to description of FIG. 49, the information processing device 1003 is a PC that is operated by community members. The community members can views information on the tunnel map by using, for example, a browser function of the information processing device 1003. In the case of using the information processing device 1003, users who are community members view information stuck onto the tunnel map simply as information displayed on a display instead of viewing the information as AR information in a state of being superimposed on a landscape.

<4-1. With Regard to Tunnel Map>

Here, description will be given of the tunnel map.

Figure 52A:
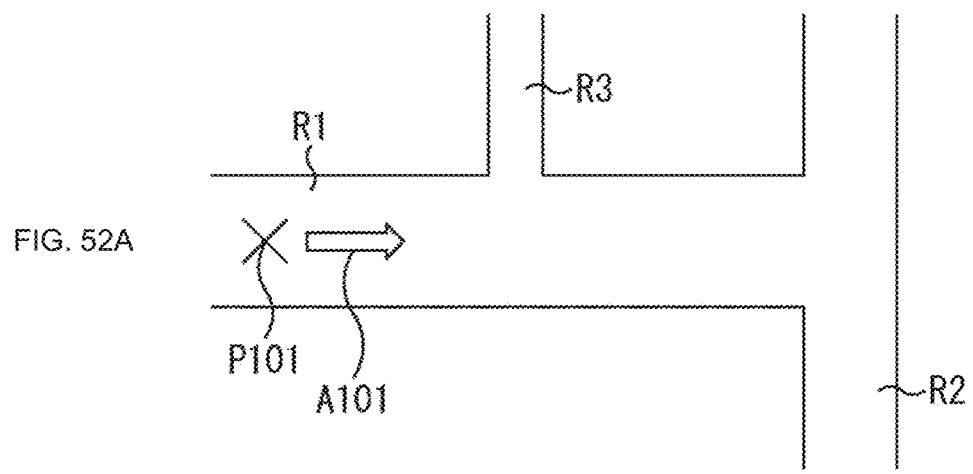
FIGS. 52A and 52B are views illustrating an example of a road.

As illustrated in FIG. 52A, it is assumed that there is an area in which a road R2 extending north and south exists at the end of a wide road R1 extending east and west. A road R3 extending from the road R1 to the north exists on the west of the road R2. Data of the roads R1, R2, and R3 is included in map data managed by the management server 1001.

In the management server 1001, map data of each area is managed. Information of roads and building which actually exist is included in the map data.

Figure 52B:
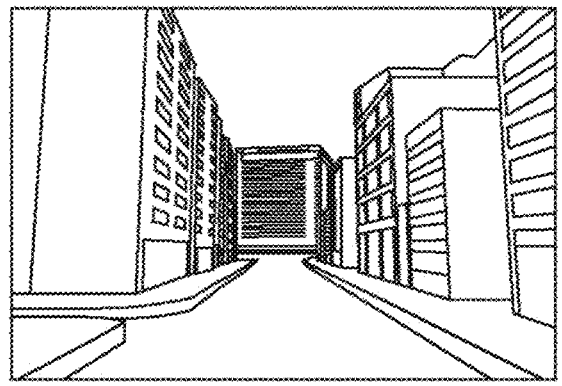

In addition, it is assumed that a landscape when viewing an eastward direction as illustrated by a white empty arrow A101 in a state of standing at a position P101 on the road R1 is a landscape as illustrated in FIG. 52B. Buildings are arranged on the right and on the left of the road R1.

Figure 53:
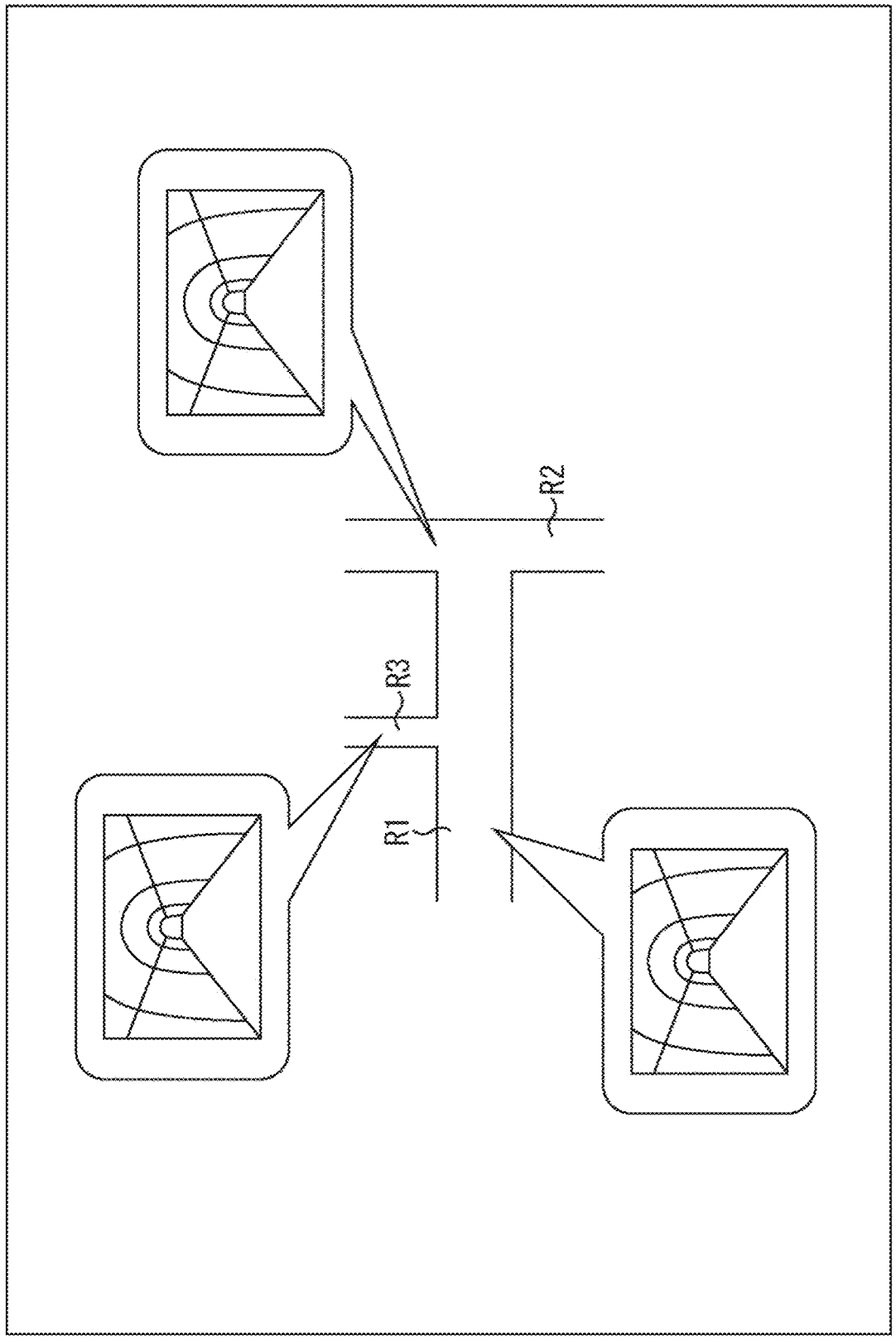
FIG. 53 is a view illustrating an example of a base space.

FIG. 53 is a view illustrating an example of a base space.

As illustrated in FIG. 53, the management server 1001 manages a base space that is a tunnel-shaped virtual space in correlation with roads which actually exist.

In the example of FIG. 53, a linear base space as indicated by a balloon is managed in correlation with the road R1 that is a linear road. Similarly, the management server 1001 manages base spaces in correlation with the roads R2 and R3.

Note that, in the example of FIG. 53, for convenience of explanation, straight lines expressing depth feel, and curved lines expressing an inner wall of a curved surface are illustrated in the base space, but the lines are not displayed when displaying an image of a tunnel map. In addition, predetermined transparency is set to the inner wall. This is also true of the following drawings.

The tunnel map is a map that is constructed by disposing the base space along an actual road. Various pieces of information such as an image that represents writing by handwriting, and a photographed image photographed by the wearable device 1002 can be stuck to (arranged on) the inner wall of the base space.

<4-1-1. Marking in Base Space>

A user of the wearable device 1002 can perform marking on the base space by performing a predetermined operation. When the marking is performed, the management server 1001 specifies a position at which the marking is performed on the basis of information transmitted from the wearable device 1002, and updates a marking history.

In addition, the management server 1001 updates information of the tunnel map by sticking an image indicating that marking is performed to the base space. A marking image that is an image indicating that marking is performed is displayed on an image of the tunnel map that is viewed by a user.

Figure 54A:
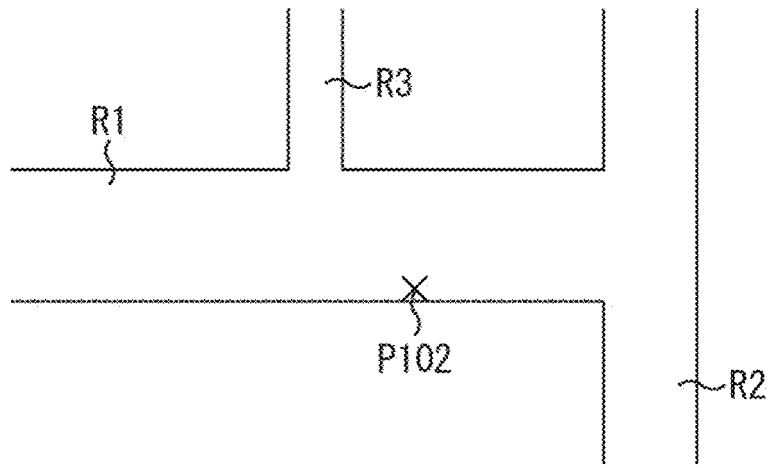
FIGS. 54A and 54B are views illustrating an arrangement example of a marking image.
Figure 54B:
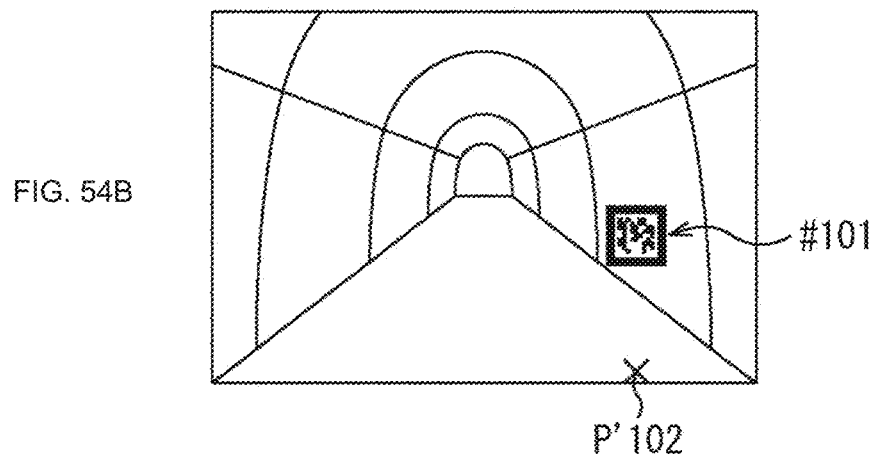

FIGS. 54A and 54B are views illustrating an example of disposition of the marking image.

For example, as illustrated in FIG. 54A, in a case where marking is performed at a position P102 on the road R1, position information indicating the position P102 and a current time are transmitted from the wearable device 1002 to the management server 1001 in combination with a user ID.

In the management server 1001, the marking history is updated, and a marking image is disposed at a position on the base space which corresponds to the position P102.

FIG. 54B is a view illustrating an example of the image of the tunnel map.

A position P'102 in the base space on a front right side in FIG. 54B is a position corresponding the position P102 in an actual space. In this example, a marking image #101 is disposed immediately above the position P'102. The marking image #101 is set as an image of a QR code (registered trademark).

The image of the tunnel map in FIG. 54B is an image that is displayed, for example, when viewing an eastward side in a state of standing in the vicinity of the center of the road R1 near the position P102. When browsing the tunnel map, a user who wears the wearable device 1002 can view the marking image that is displayed as AR information in a state of being superimposed on an eastward landscape.

In the management server 1001, a community is formed as described above on the basis of a marking history of each user.

<4-1-2. Writing in Base Space>

A user who wears the wearable device 1002 can perform writing on the base space by performing a predetermined operation. As in the writing with respect to the electronic signboard 1, writing of handwriting characters or symbols, an image, voice, a text, and the like becomes possible.

Hereinafter, the content of the writing on the base space is appropriately referred to as "AR content" in the meaning of content displayed as AR information.

Figure 55A:
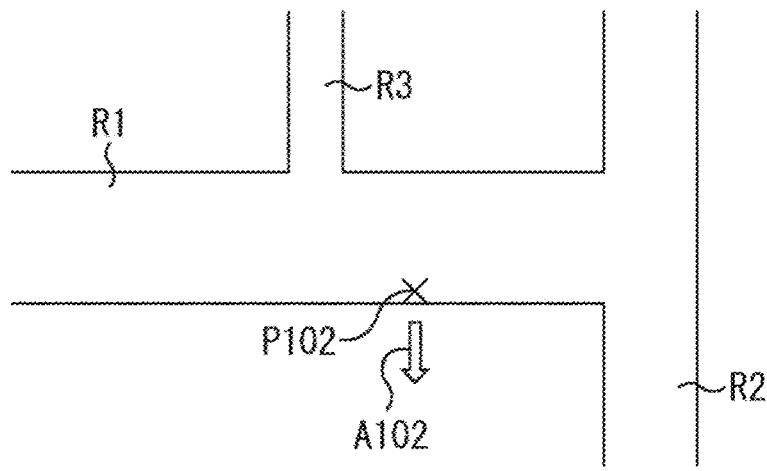
FIGS. 55A and 55B are views illustrating a writing example in the base space.
Figure 55B:
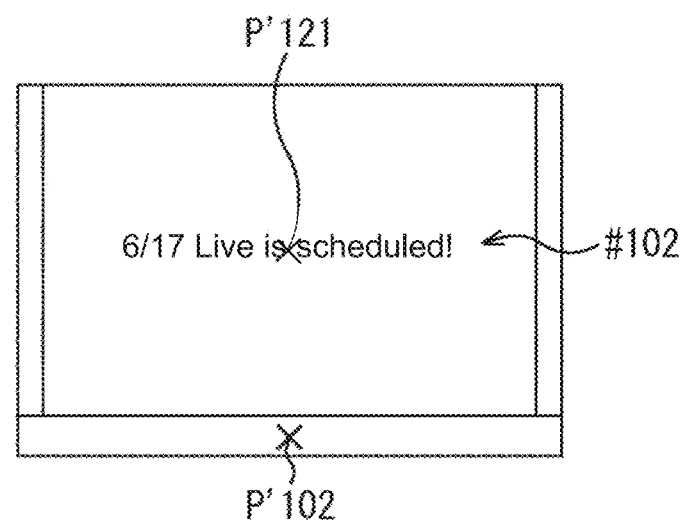

FIGS. 55A and 55B are views illustrating an example of the writing on the base space.

For example, as illustrated in FIG. 55A, in the case of performing writing of AR content at the position P102 on the road R1 toward the south as indicated by a white empty arrow A102, data of the AR content, position information indicating the position P102, and a current time are transmitted from the wearable device 1002 to the management server 1001 in combination with a user ID. Information indicating a height (a height of the wearable device 1002) of the camera 1014 and a direction of the wearable device 1002 is also transmitted to the management server 1001 in addition to a plurality of pieces of the information.

In the management server 1001, a DB of the AR content is updated, and the AR content can be stuck to an inner wall in the same direction as that of the wearable device 1002 from a height corresponding to the height of the camera 1014 at a position on the base space which corresponds to the position P102.

FIG. 55B is a view illustrating an example of an image of the tunnel map.

A position P'102 of the base space on a front side in FIG. 55B is a position corresponding to the position P102 of the actual space. In the example, AR content #102 is stuck at a position P'121 of the inner wall on the south that is a direction of a white empty arrow A102 from the position P'102. The AR content #102 is composed of handwriting characters.

When browsing the tunnel map, a user who wears the wearable device 1002 can view the AR content in a state of being superimposed on an actually viewed landscape.

As described above, a position of the base space which is a sticking destination of the AR content is also determined on the basis of the height and the direction of the wearable device 1002. The AR content that can be stuck at an arbitrary position is displayed in a confronting manner on the front side of the sticking position, but the AR content is displayed in a modified manner at a position other than the front side.

Figure 56A:
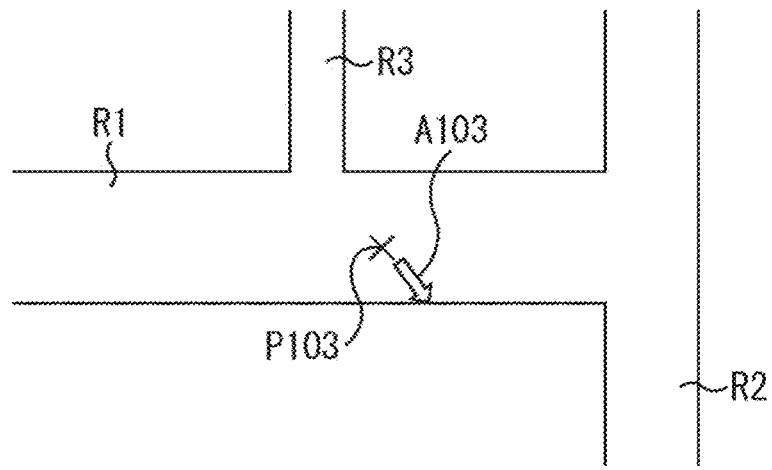
FIGS. 56A and 56B are views illustrating a display example of AR content.
Figure 56B:
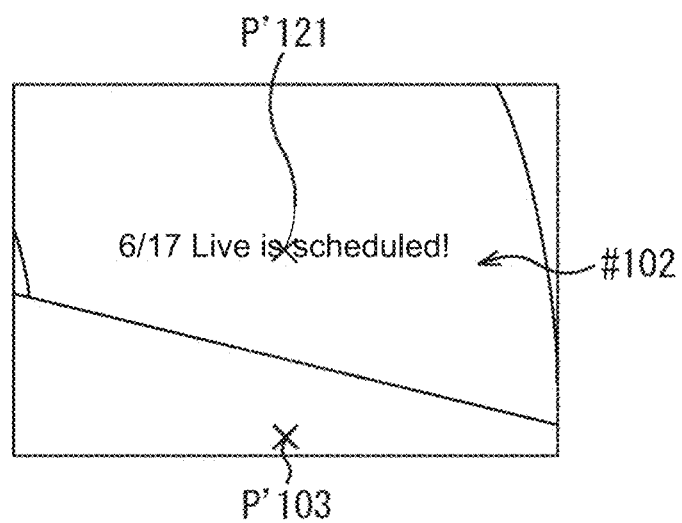

For example, in a case where the AR content #102 stuck at the position P'121 on the base space is viewed from the position P103 in FIG. 56A, a direction of the wearable device 1002 (a user's direction) becomes a direction indicated by a white empty arrow A103. In this case, as illustrated in FIG. 56B, the AR content #102 is displayed in an obliquely modified manner, that is, characters drawn on an inner wall that exists along the road R1 are viewed from an oblique side.

Figure 57A:
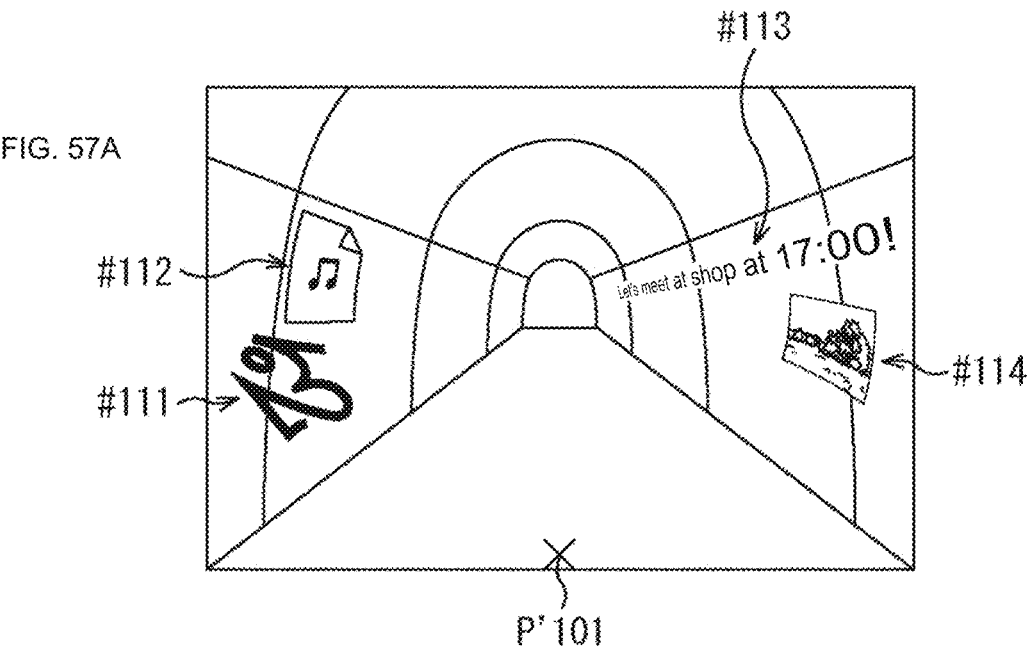
FIGS. 57A and 57B are views illustrating a display example of the AR content.
Figure 57B:
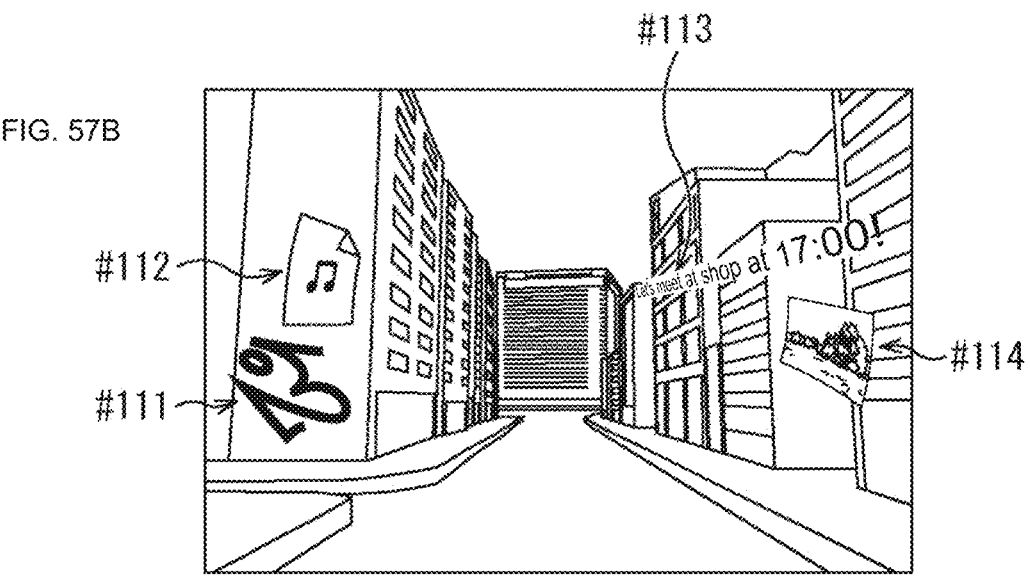

FIGS. 57A and 57B are views illustrating a display example of the AR content.

Each of AR content #111 to AR content #114 in FIGS. 57A and 57B are AR content that is displayed when facing an eastward side on the road R1 described with reference to FIGS. 52A and 52B as illustrated by a white empty arrow A101 at the position P101.

In the example of FIGS. 57A and 57B, the AR content #111 and the AR content #112 are stuck to an inner wall on the left, and the AR content #113 and the AR content #114 are stuck to an inner wall on the right.

The AR content #111 is writing of a handwriting symbol, and the AR content #112 is writing of voice. For example, in the case of selecting the AR content #112, reproduction of the voice is initiated. The AR content #113 is writing of handwriting characters, and the AR content #114 is writing of a still image.

As illustrated in FIG. 57B, a user views the AR content #111 to the AR content #114 in a state of being superimposed on an actual landscape in front of eyes. The landscape in FIG. 57B, on which the AR content #111 to the AR content #114 are superimposed, is a landscape that is viewed when facing an eastward side from the position P101 (FIG. 52B).

For example, display of an image of optical transmission type AR content is performed to display a range corresponding to a user's position, a height of the wearable device 1002, and a direction of the wearable device 1002 in real time. For example, in a case where a user faces a predetermined direction at a predetermined position on the road R2, AR content included in a range when viewing the direction from the position is displayed. According to this, the user views the AR content in a state of being superimposed on an actual landscape in front of eyes. The user can move while viewing the AR content in a state of being superimposed on the actual landscape in front of eyes.

As described above, for example, in a case where the user finds a shop in which the user is interested during movement, the user can perform marking at the location, or can perform writing while facing a direction of the shop.

A marking image or AR content which is set by an arbitrary user can be viewed only by members of the same community as that of the user.

According to this, it is possible to realize an information processing system in which only a person who actually visits an arbitrary location such as a location of a shop can transmit information only to persons who frequently visit the location. It can be said that a community is associated with the location.

Since the content of writing is displayed on an image of the tunnel map as AR information, it is necessary to actually visit a location at which writing is performed so as to confirm the content of the writing. According to this, a person who performs the writing can transmit information only to persons who are considered to be worthy of the transmission.

<4-1-3. Sticking of Photographed Image>

As described above, community members can also use the tunnel map by using the information processing device 1003.

An image of the tunnel map, which is displayed on a display of the information processing device 1003, is constructed by sticking a photographed image photographed by the wearable device 1002 to the inner wall of the base space. The AR content that is stuck by a community member is displayed in a state of being superimposed on the photographed image.

Here, description will be given of the tunnel map to which the photographed image is stuck.

Figure 58A:
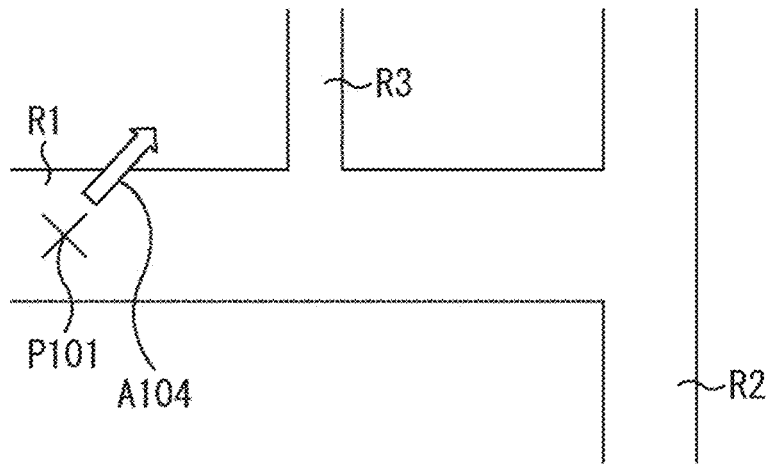
FIGS. 58A and 58B are views illustrating a creation example of a tunnel map.
Figure 58B:
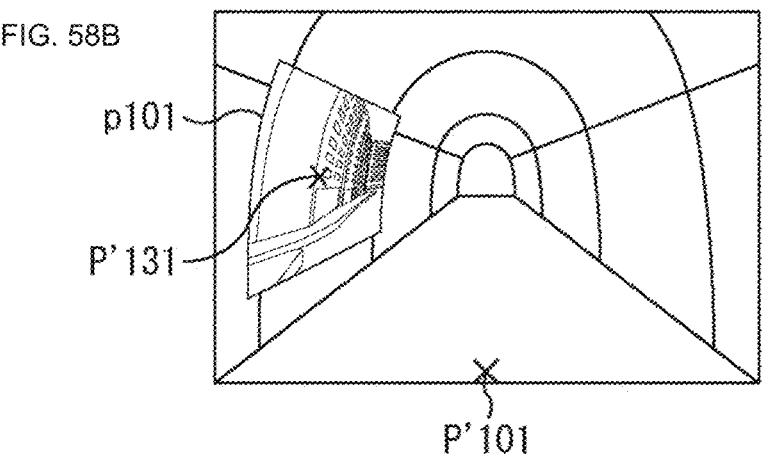

FIGS. 58A and 58B are views illustrating a creation example of the tunnel map.

In a case where a user exists at the position P101, and faces a north-east direction indicated by a white empty arrow A104, the wearable device 1002 photographs an image in the direction, and transmits the image to the management server 1001. The wearable device 1002 transmits the photographed image in combination with position information indicating the position P101 that is a photographing position, and information of a height of the wearable device 1002, a direction (photographing direction) of the wearable device 1002, and the like.

The management server 1001 specifies a position of the base space which corresponds to the position P101 on the basis of the information transmitted from the wearable device 1002.

In addition, the management server 1001 performs transformation processing such as affine transformation with respect to an image that is photographed by the wearable device 1002. The transformation processing is performed in correspondence with at least any one among the position, the height, and the direction of the wearable device 1002 during photographing. The photographed image is deformed into an image having a shape that is stuck to an inner wall immediately above a position of the base space which corresponds to a photographing position in the same direction as a photographing direction from a reference position with a position of a height corresponding to the height of the wearable device 1002 set as the reference.

The management server 1001 sticks (disposes) the photographed image of which a shape is deformed to the inner wall immediately above the position of the base space which corresponds to the position P101 in the same direction as the photographing direction from a position of a height corresponding to the height of the wearable device 1002 as illustrated in FIG. 58B.

In FIG. 58B, a position P'101 in the base space, which is viewed on a front side, is a position corresponding to the position P101 in an actual space. In addition, a position P'131 to which a photographed image p101 is stuck is a position of the inner wall immediately above the position P'101 in the same direction as the photographing direction from a height corresponding to the height of the wearable device 1002. For example, the management server 1001 manages information of the sticking position of the photographed image p101 in combination with the photographed image p101.

Figure 59:
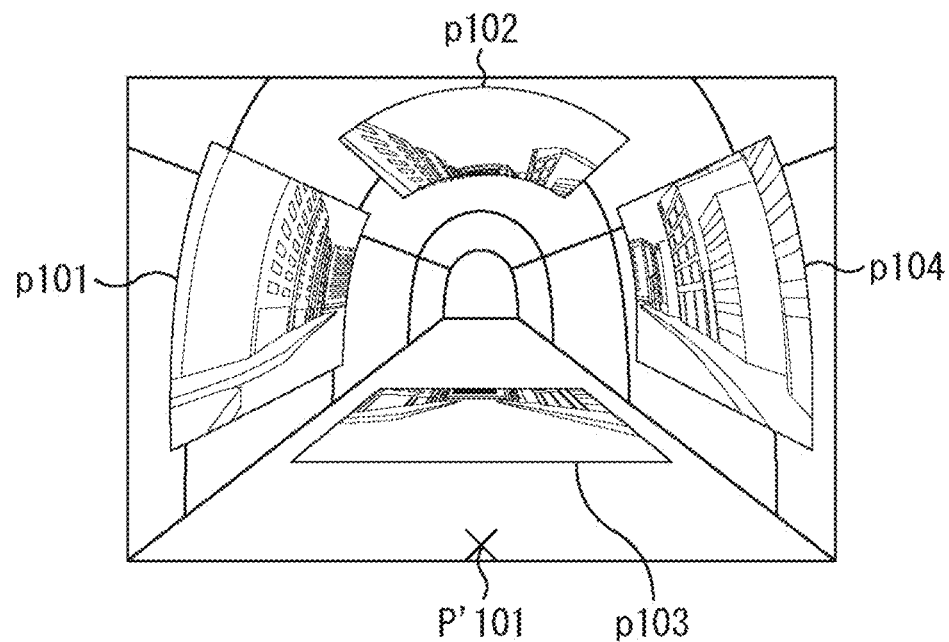
FIG. 59 is a view illustrating a display example of an image of the tunnel map.

As illustrated in FIG. 59, the image of the tunnel map is generated by sticking a plurality of images photographed by the wearable device 1002 to the inner wall of the base space. In the example of FIG. 59, four images p101 to p104 photographed at the position P101 are stuck to the inner wall of the base space which corresponds to the photographing direction. Shapes of the photographed images p101 to p104 are shapes subjected to the affine transformation in correspondence with the photographing direction, and the like.

In the example of FIG. 59, the number of images is small, and thus a gap is present between photographed images. However, when photographing is performed at respective positions toward respective directions by a plurality of users, a tunnel map, in which images are stuck to the entire inner wall of the base space with respect to each of the roads R1, R2, and R3, is created.

Figure 60:
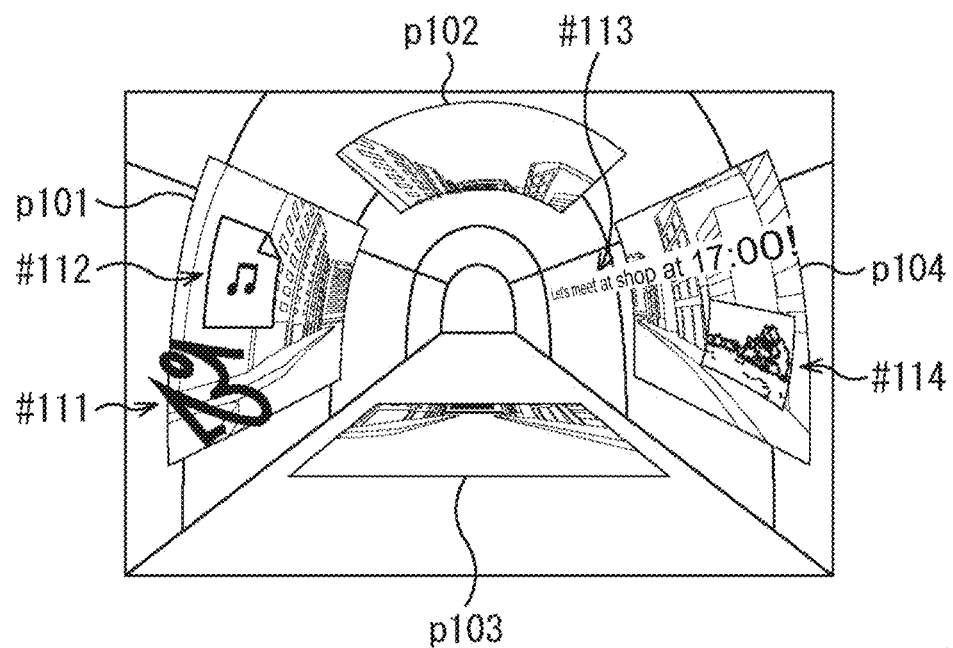
FIG. 60 is a view illustrating a display example of an image of the tunnel map.

An image of the tunnel map created as described above is transmitted from the management server 1001 to the information processing device 1003, and is displayed on a display of the information processing device 1003. In a case where the AR content is stuck as illustrated in FIGS. 57A and 57B, and a user selects a position corresponding to the position P101 as a visual point position, as illustrated in FIG. 60, an image of a tunnel map, in which respective pieces of AR content are superimposed on photographed images, is displayed on the display of the information processing device 1003.

A user of the information processing device 1003 can switch display of the image of the tunnel map by switching a visual point position by operating the information processing device 1003.

<4-2. Configuration of Respective Devices>
<4-2-1. Configuration of Management Server 1001>

Figure 61:
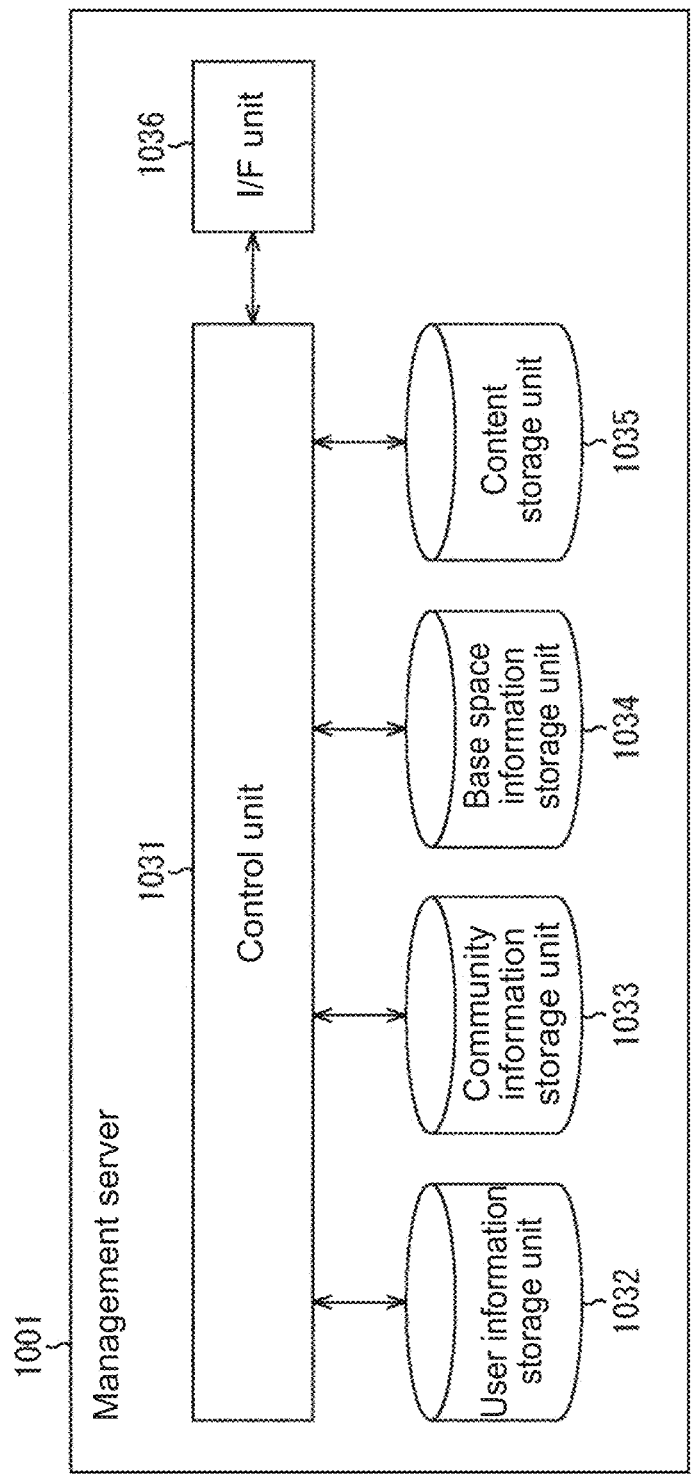
FIG. 61 is a block diagram illustrating a configuration example of the management server.

FIG. 61 is a block diagram illustrating a configuration example of the management server 1001.

The management server 1001 has a configuration in which a user information storage unit 1032, a community information storage unit 1033, a base space information storage unit 1034, a content storage unit 1035, and an I/F unit 1036 are connected to a control unit 1031.

The control unit 1031 includes a CPU, a ROM, a RAM, and the like. The control unit 1031 allows the CPU to execute a predetermined program, and controls an entire operation of the management server 1001.

The user information storage unit 1032, the community information storage unit 1033, the base space information storage unit 1034, and the content storage unit 1035 are respectively constituted by an HDD or an SSD.

The user information storage unit 1032 has the same function as that of the user information storage unit 112 in FIG. 20. The user information storage unit 1032 stores user information including a marking history transmitted from the wearable device 1002.

The community information storage unit 1033 has the same function as that of the community information storage unit 113 in FIG. 20. The community information storage unit 1033 stores community information that is information related to members of a community that is associated with a location. The community information includes user IDs and accounts of SNS of respective members.

The base space information storage unit 1034 stores two-dimensional map data and information of the base space that is correlated with respective roads.

The content storage unit 1035 stores a content DB that is a DB related to content that is stuck to the base space. The content DB includes information of a photographed image, information of a marking image, and information of the AR content.

As described above, in the management server 1001, the information of the base space, and the information of the content that is stuck to the base space are managed in a divided manner.

The I/F unit 1036 is an interface that performs radio communication or wired communication. The I/F unit 1036 performs communication between respective devices including the wearable device 1002 through the network 1004.

Figure 62:
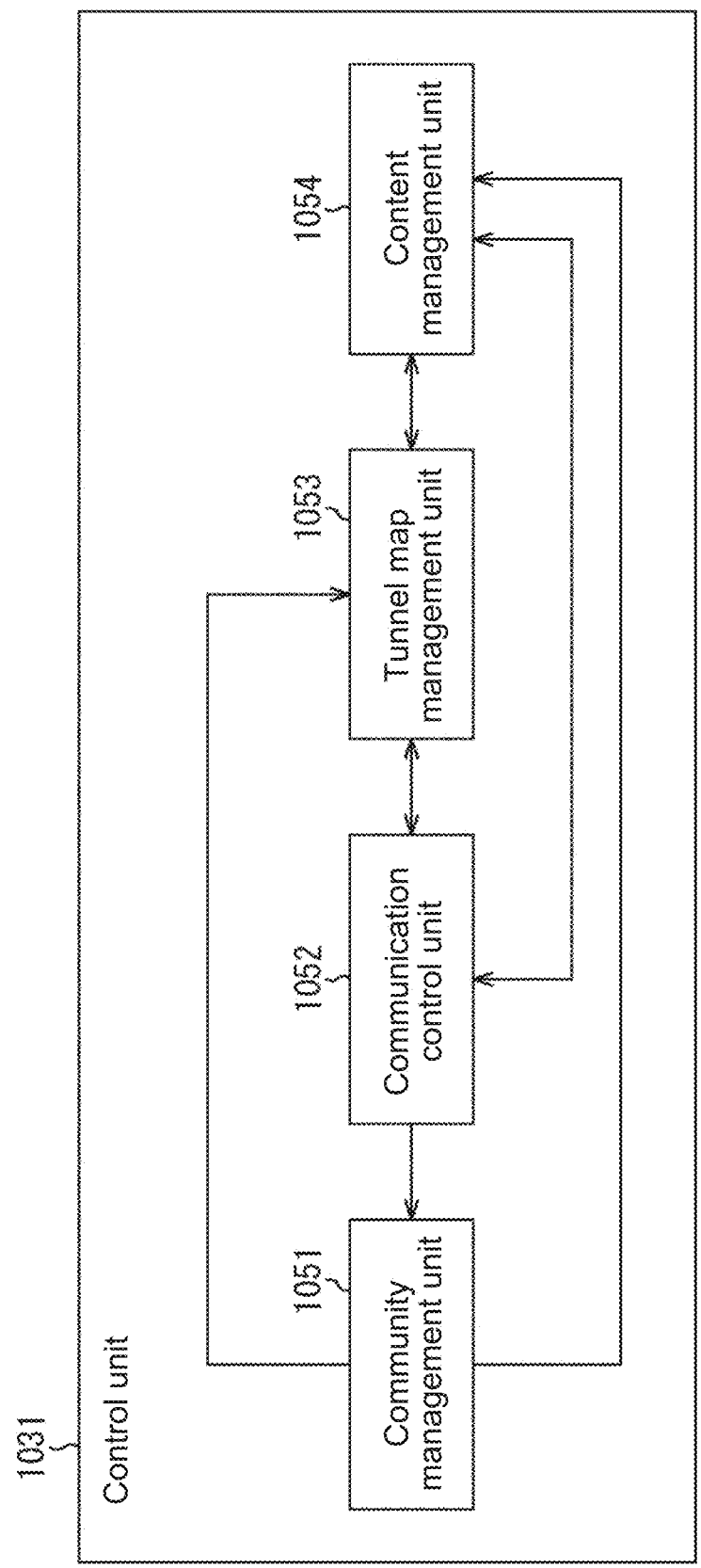
FIG. 62 is a block diagram illustrating a functional configuration example of a control unit in FIG. 61.

FIG. 62 is a block diagram illustrating a functional configuration example of the control unit 1031. At least a part among functional units illustrated in FIG. 62 is realized when a predetermined program is executed by the CPU of the control unit 1031.

The control unit 1031 includes a community management unit 1051, a communication control unit 1052, a tunnel map management unit 1053, and a content management unit 1054.

The community management unit 1051 has the same function as that of the community management unit 121 in FIG. 21. That is, the community management unit 1051 manages the marking history transmitted from the wearable device 1002 by storing the marking history in the user information storage unit 1032.

In addition, the community management unit 1051 forms a community on the basis of the marking history. The community management unit 1051 stores the community information in the community information storage unit 1033, and manages members of a community that is associated with each location. The community information that is managed by the community management unit 1051 is appropriately supplied to the tunnel map management unit 1053 and can be used in generation of an image of a tunnel map that is viewed to respective users.

The communication control unit 1052 controls the I/F unit 1036 to perform communication with respective devices connected to the network 1004. Information exchange between the respective units of the control unit 1031 and external device is performed through the communication control unit 1052.

The tunnel map management unit 1053 specifies a community to which respective users pertain on the basis of the community information that is managed by the community management unit 1051. The tunnel map management unit 1053 selects AR content written by each user who pertains to the same community as AR content, which is viewed to the respective users, among a plurality of pieces of the AR content managed by the content management unit 1054. The tunnel map management unit 1053 superimposes the selected AR content on the base space corresponding to a current position of each user, and generates display data (performs reconfiguration of the tunnel map).

In a case where a device of a transmission destination of the image of the tunnel map is the wearable device 1002, generation of the display data is performed to generate image data of the tunnel map to which a marking image or AR content is stuck. On the other hand, in a case where a device that is a transmission destination of the image of the tunnel map is the information processing device 1003, the generation of the display data is performed to generate image data of the tunnel map to which a photographed image is stuck and the marking image or the AR content is stuck in a state of being superimposed on the photographed image.

As described above, the tunnel map management unit 1053 selectively switches the content of the display data in correspondence with a type of a device to which the image of the tunnel map is transmitted. The display data generated by the tunnel map management unit 1053 is output to the communication control unit 1052, and is transmitted.

The content management unit 1054 manages the content DB that is stored in the content storage unit 1035. For example, the content management unit 1054 registers information of AR content that is stuck by each user, and information of the marking image in the content DB. The content management unit 1054 appropriately outputs information of the AR content and the like to the tunnel map management unit 1053.

In addition, the content management unit 1054 registers information of a photographed image photographed by each wearable device 1002 in the content DB.

FIG. 63 is a view illustrating an example of the information of the photographed image which is registered in the content DB.

In the content DB, a photographing time of the photographed image, a user's position during photographing, a height of the wearable device 1002 during photographing, and a direction (photographing direction) of the wearable device 1002 during photographing are managed in correlation with a user ID. Respective pieces of information are transmitted from the wearable device 1002 every time photographing is performed.

In addition, in the content DB, a photographed image, and coordinates indicating a sticking position of the photographed image in the base space are managed in correlation with the user ID. For example, the photographed image is a post-transformation image obtained through transformation processing such as the affine transformation. Note that, in the example of FIG. 63, the height of the wearable device 1002 is illustrated in a unit of mm, and the photographing direction is illustrated as an angle with a predetermined direction set as a reference. In addition, the coordinates indicating the sticking position are illustrated as values on an xyz plane with a predetermined position set as a reference. This is also true of FIG. 64.

FIG. 64 is a view illustrating an example of the information of the AR content that is registered in the content DB.

In the content DB, a writing time of the AR content, a user's position during writing, a height of the wearable device 1002 during writing, and a direction of the wearable device 1002 during writing are managed in correlation with the user ID. Respective pieces of information are transmitted from the wearable device 1002 every time writing of the AR content is performed.

In addition, in the content DB, the AR content and coordinates indicating a writing position of the AR content in the base space are managed in correlation with the user ID. As in the information of the AR content, information related to marking image is also managed in the content DB. In FIG. 64, AR content to which a name of "cc33.text" is set is text content, and AR content to which a name of "dd44.mp3" is set is voice content.

As described above, in the content DB, the photographed image, the AR content, and the marking image which are information stuck to the base space at the time of generating the tunnel map, and information such as the position, the height, and the direction which are information related to a sticking method are registered in association with the user ID.

<4-2-2. Configuration of Wearable Device 1002>

Figure 65:
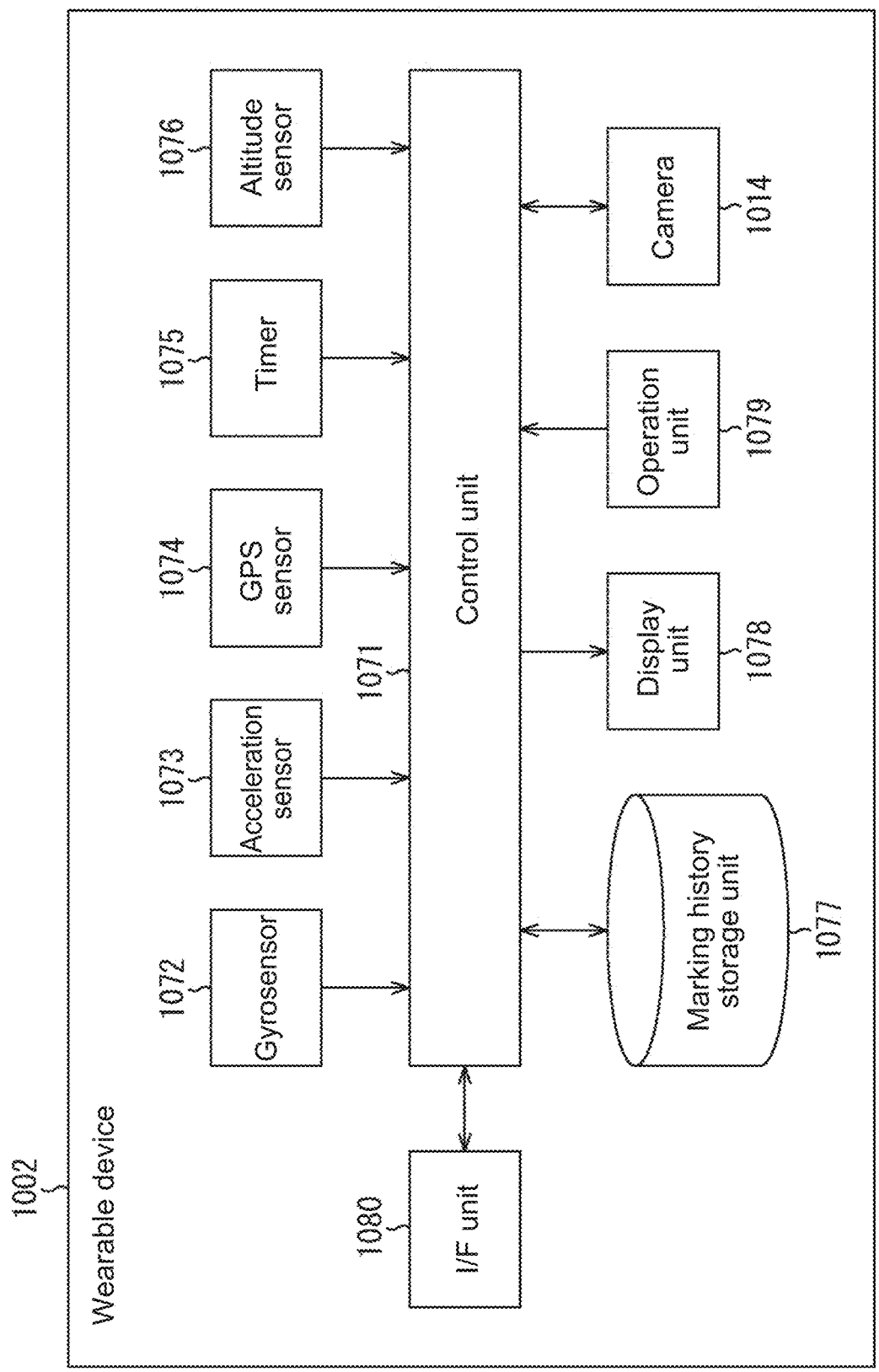
FIG. 65 is a block diagram illustrating a configuration example of a wearable device.

FIG. 65 is a block diagram illustrating a configuration example of the wearable device 1002.

The wearable device 1002 has a configuration in which a gyrosensor 1072, an acceleration sensor 1073, a GPS sensor 1074, a timer 1075, and an altitude sensor 1076 are connected to a control unit 1071. A marking history storage unit 1077, a display unit 1078, an operation unit 1079, an I/F unit 1080, and a camera 1014 are also connected to the control unit 1071.

The control unit 1071 includes a CPU, a ROM, a RAM, and the like. The control unit 1071 allows the CPU to execute a predetermined program, and controls an entire operation of the wearable device 1002.

The gyrosensor 1072 repetitively detects an angular velocity and outputs information indicating the angular velocity that is detected to the control unit 1071. For example, a direction of the wearable device 1002 is specified on the basis of an output of the gyrosensor 1072.

The acceleration sensor 1073 repetitively detects acceleration, and outputs information indicating the acceleration that is detected to the control unit 1071.

The GPS sensor 1074 repetitively measures a current position, and outputs position information to the control unit 1071.

The timer 1075 outputs information of a current time to the control unit 1071.

The altitude sensor 1076 repetitively detects an altitude, and output information indicating the altitude that is detected to the control unit 1071. For example, the height of the wearable device 1002 is specified on the basis of an output of the altitude sensor 1076.

The marking history storage unit 1077 is constituted by a flash memory or the like, and stores the marking history. The marking history that is stored in the marking history storage unit 1077 is appropriately updated by the control unit 1071.

The display unit 1078 displays various pieces of information such as an image of the tunnel map.

The operation unit 1079 is an interface such as a button and a touch sensor which are provided in a casing of a device. The operation unit 1079 detects various kinds of operations by a user such as instruction of marking, writing of AR content, and outputs information indicating the content of the operations of the user to the control unit 1071. The operations of the wearable device 1002 may be performed by using an external device such as the portable terminal 61 that is connected to the wearable device 1002 through radio communication or wired communication.

The I/F unit 1080 is an interface of a short-range radio communication such as Bluetooth (registered trademark) and wireless LAN, and an interface of radio communication using mobile communication system (WAN) such as 3G and 4G. The I/F unit 1080 performs communication with external devices such as the management server 1001.

Figure 66:
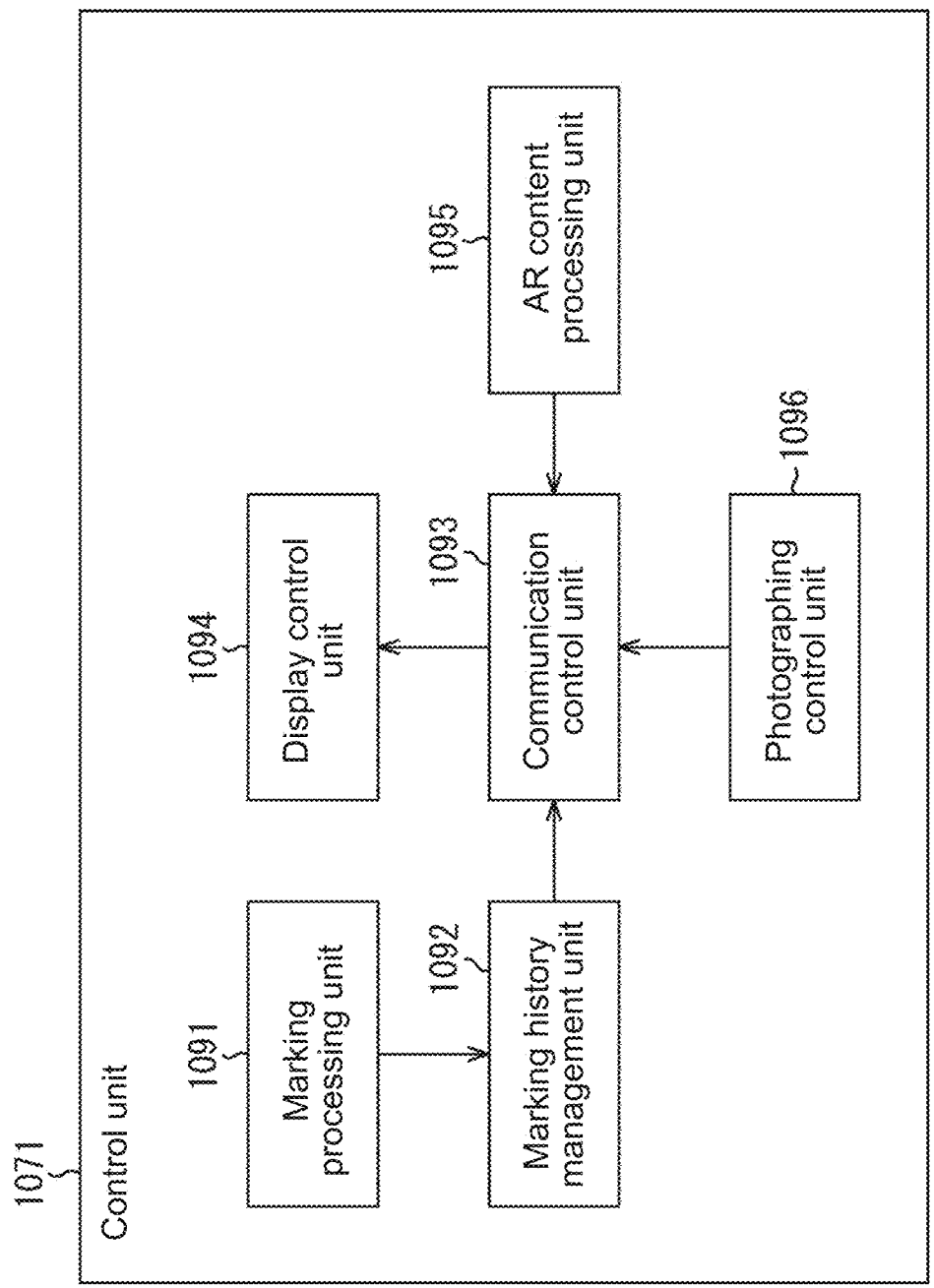
FIG. 66 is a block diagram illustrating a functional configuration example of a control unit in FIG. 65.

FIG. 66 is a block diagram illustrating a functional configuration example of the control unit 1071. At least a part of functional units illustrated in FIG. 66 is realized when a predetermined program is executed by the CPU of the control unit 1071.

The control unit 1071 includes a marking processing unit 1091, a marking history management unit 1092, a communication control unit 1093, and a display control unit 1094, and an AR content processing unit 1095.

When performing marking, the marking processing unit 1091 acquires a current position that is measured by the GPS sensor 1074, and information of a current time which is output from the timer 1075. In marking in the wearable device 1002, the direction of the wearable device 1002 which is detected on the basis of an output by the gyrosensor 1072, the height of the wearable device 1002 which is detected by the altitude sensor 1076, and the like may be acquired. The marking processing unit 1091 outputs respective pieces of acquired information to the marking history management unit 1092.

The marking history management unit 1092 manages the marking history that is stored in the marking history storage unit 1077. For example, the marking history management unit 1092 registers respective pieces of information supplied from the marking processing unit 1091 in correlation with each other to update the marking history. In addition, in a case where the management server 1001 makes a request for the marking history, the marking history management unit 1092 reads out the marking history from the marking history storage unit 1077, and outputs the marking history to the communication control unit 1093 to be transmitted.

The communication control unit 1093 controls the I/F unit 1080 to perform communication with the management server 1001 through the network 1004. For example, the communication control unit 1093 receives the image of the tunnel map which is transmitted from the management server 1001, and outputs the image to the display control unit 1094. Information exchange between the respective units of the control unit 1071 and an external device is performed through the communication control unit 1093.

The display control unit 1094 controls display of various pieces of information by the display unit 1078.

In the case of writing AR content, the AR content processing unit 1095 acquires information of a current position that is measured by the GPS sensor 1074 and a current time that is output from the timer 1075. In addition, the AR content processing unit 1095 acquires information of a direction of the wearable device 1002 which is detected on the basis of an output by the gyrosensor 1072 and a height of the wearable device 1002 which is detected by the altitude sensor 1076, and the like. The AR content processing unit 1095 outputs respective pieces of acquired information to the communication control unit 1093 to be transmitted to the management server 1001.

<4-2-3. Configuration of Information Processing Device>

The information processing device 1003 has the same hardware configuration as the configuration illustrated in FIG. 31. In the following description, the configuration illustrated in FIG. 31 is appropriately cited as a configuration of the information processing device 1003.

Figure 67:
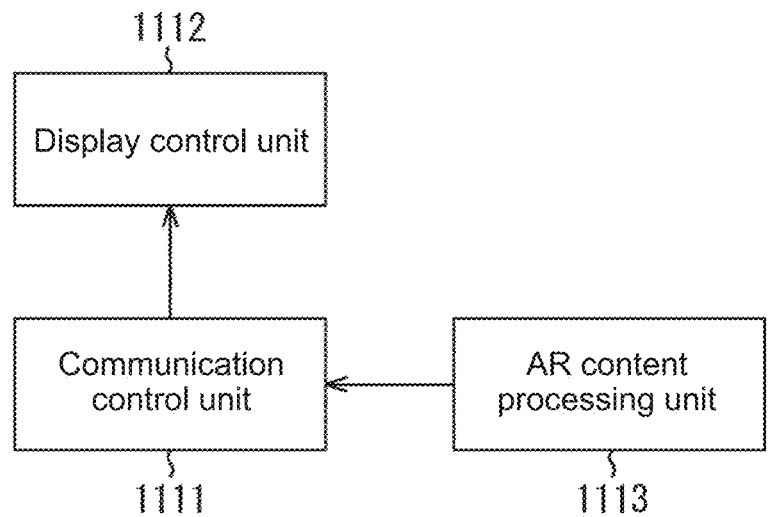
FIG. 67 is a block diagram illustrating a functional configuration example of an information processing device.

In the information processing device 1003, the configuration illustrated in FIG. 67 is realized when a predetermined program is executed by the CPU 141.

FIG. 67 is a block diagram illustrating a functional configuration example of the information processing device 1003.

In the information processing device 1003, a communication control unit 1111, a display control unit 1112, and an AR content processing unit 1113 are realized.

The communication control unit 1111 controls the communication unit 149 to perform communication with the management server 1001. For example, the communication control unit 1111 acquires an image of the tunnel map which is transmitted from the management server 1001, and output the image to the display control unit 1112.

The display control unit 1112 controls the display of the output unit 147 to display various pieces of information including the image of the tunnel map.

The AR content processing unit 1113 performs edition of AR content included in the image of the tunnel map in correspondence with a user's operation. As will be described later, the user can perform edition of the AR content by using the information processing device 1003.

The edition includes sticking and deletion (removal) of the AR content, change of the content, change of a sticking position, the like. The AR content processing unit 1113 outputs information related to the AR content after change to the communication control unit 1111 to transmit the information to the management server 1001.

<4-3. Processing in Creative Mode Setting>

Examples of an operation mode of the wearable device 1002 include a creative mode and a play mode.

The creative mode is a mode of performing photographing of an image that is stuck to the base space, marking, and writing of the AR content.

On the other hand, the play mode is a mode of displaying the image of the tunnel map on the basis of information transmitted from the management server 1001. When a user sets the play mode, and goes to a location at which writing of the AR content is performed, the user can browse the AR content that is stuck by another user who pertains to the same community as that of the user. Marking or writing of the AR content may be performed during the play mode.

<4-3-1. Formation of Tunnel Map>

Description will be given of photographing processing of the wearable device 1002 with reference to a flowchart of FIG. 68.

An image photographed by photographing processing is stuck to the base space to form the tunnel map. The processing in FIG. 68 is performed when the creative mode is set as the operation mode of the wearable device 1002. When the creative mode is set, the camera 1014 is activated, and photographing is initiated. After setting the creative mode, a user moves on foot, and the like.

In step S1001, a photographing control unit 1096 determines whether or not a certain time has elapsed after transmitting a photographed image, and waits until it is determined that the certain time has elapsed. Transmission of the photographed image is periodically performed, for example, for every 10 seconds.

In a case where it is determined in step S1001 that the certain time has elapsed, in step S1002, the photographing control unit 1096 controls the camera 1014 to perform photographing.

In step S1003, the communication control unit 1093 transmits the photographed image to the management server 1001 in combination with information of a user ID, a current time, a current position, a height of the wearable device 1002, and a photographing direction. Then, the processing subsequent to step S1001 is repeated.

Next, description will be given of photographed image sticking processing by the management server 1001 with reference to a flowchart of FIG. 69.

Figure 68:
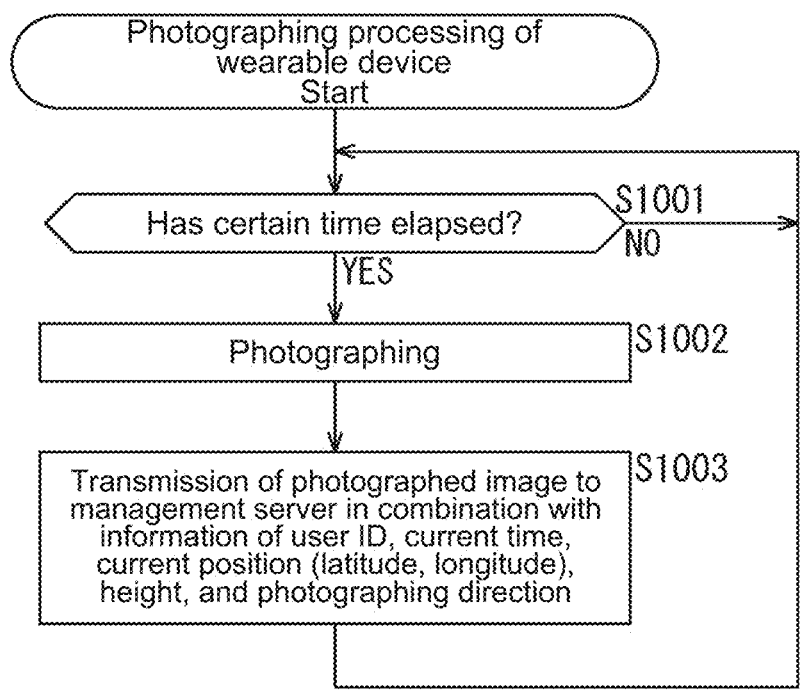
FIG. 68 is a flowchart illustrating photographing processing of the wearable device.
Figure 69:
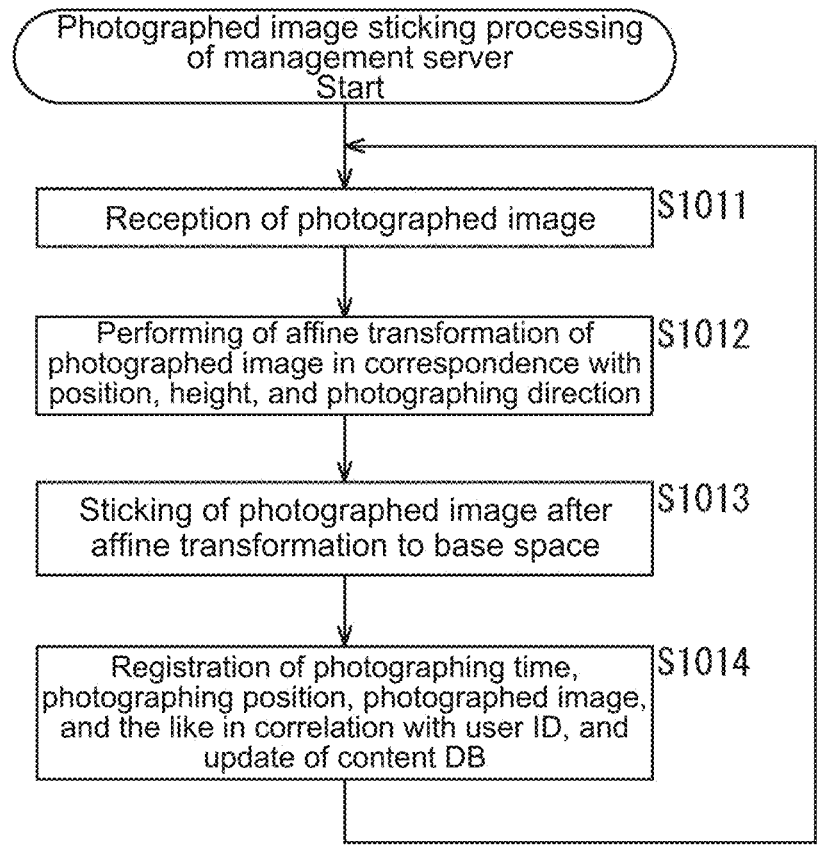
FIG. 69 is a flowchart illustrating photographed image attachment processing of the management server.

The processing in FIG. 69 is performed in correspondence with execution of the processing in FIG. 68 by the wearable device 1002.

In step S1011, the communication control unit 1052 receives the photographed image that is transmitted from the wearable device 1002. The photographed image that is transmitted from the wearable device 1002 is correlated with the information of the user ID, the current time, the current position, the height of the wearable device 1002, and the photographing direction. The information received by the communication control unit 1052 is output to the tunnel map management unit 1053.

In step S1012, the tunnel map management unit 1053 reads out and acquires information of the base space corresponding to the current position of the user from the base space information storage unit 1034. In addition, the tunnel map management unit 1053 performs transformation processing such as the affine transformation with respect to the photographed image in correspondence with the position and the height of the wearable device 1002, and the photographing direction.

In step S1013, the tunnel map management unit 1053 sticks the photographed image of which a shape is deformed by the affine transformation to the inner wall of the base space.

In step S1014, as described with reference to FIG. 63, the content management unit 1054 registers information of the photographing time, the photographing position, the height, the photographing direction, the sticking position, the photographing image, and the like in correlation with the user ID to update the content DB.

Then, returning to step S1011, the above-described processing is repeated every time the photographed image is transmitted from the wearable device 1002 of each user. Through repetition of the processing in FIG. 69, in the management server 1001, the photographed image that is stuck to the base space of each area is managed.

<4-3-2. Marking>

Next, description will be given of the marking processing of the wearable device 1002 with reference to a flowchart of FIG. 70.

In step S1021, the marking processing unit 1091 determines whether or not an instruction for marking is given, and waits until it is determined that the instruction for marking is given. The instruction for marking may be given by an operation with respect to the operation unit 1079, or may be performed in correspondence with a predetermined behavior such as shaking of the neck. The shaking of the neck is detected on the basis of outputs of the gyrosensor 1072 and the acceleration sensor 1073.

In a case where it is determined in step S1021 that the instruction for marking is given, in step S1022, the communication control unit 1093 transmits information of a current time and information of a current position to the management server 1001 in combination with the user ID. Then, the processing subsequent to step S1021 is repeated.

In this example, the marking history is not managed in the wearable device 1002, but information of a marking time and information of a marking position may be recorded in the marking history that is managed by the marking history management unit 1092. In addition, marking may be automatically performed through automatic marking without depending on the user's operation.

Next, description will be given of marking history update processing of the management server 101 with reference to a flowchart of FIG. 71.

Figure 70:
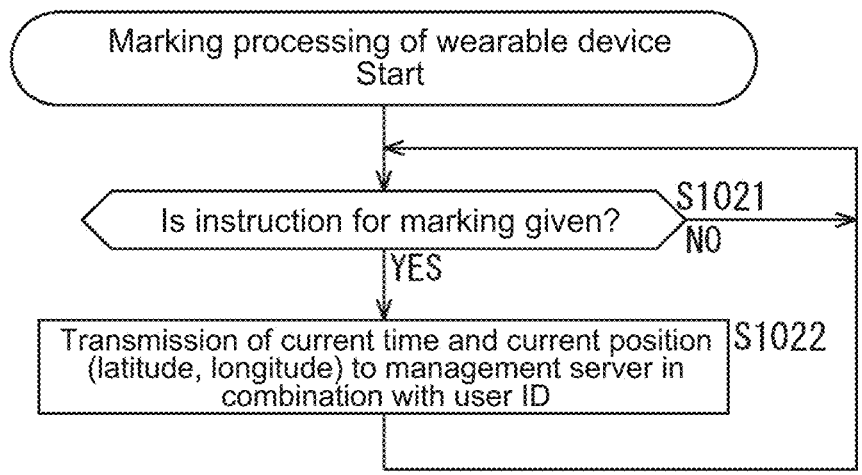
FIG. 70 is a flowchart illustrating marking processing of the wearable device.
Figure 71:
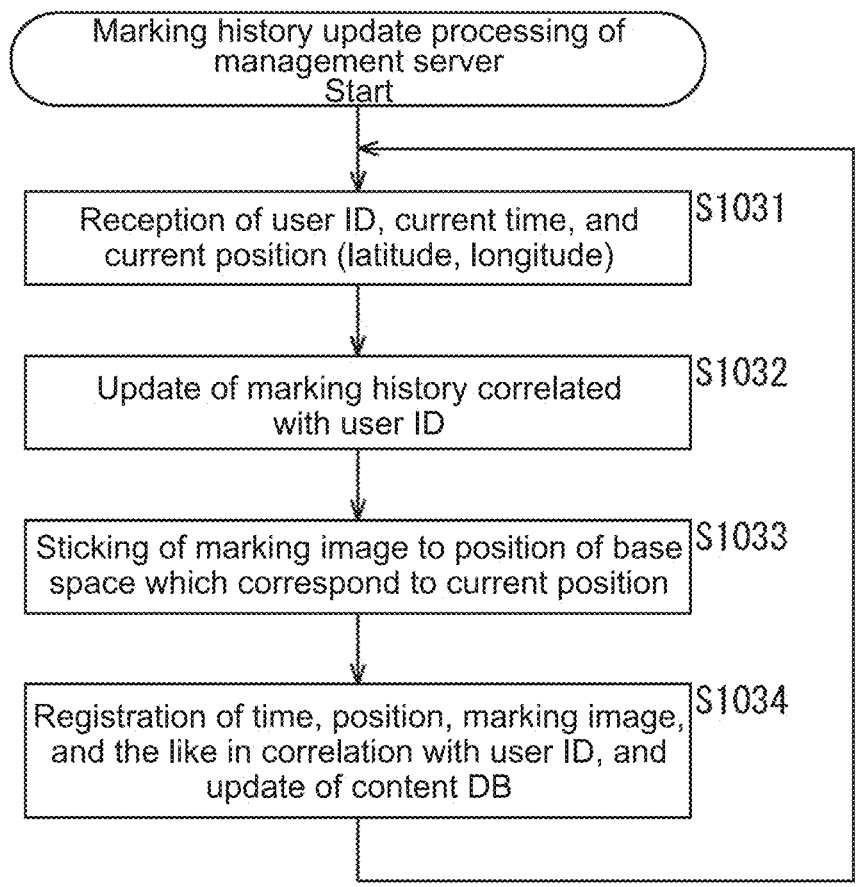
FIG. 71 is a flowchart illustrating marking history update processing of the management server.

The processing in FIG. 71 is performed in correspondence with transmission of position information and the like after the processing in FIG. 70 is performed by the wearable device 1002.

In step S1031, the communication control unit 1052 receives the user ID, the current time, and the position information which are transmitted from the wearable device 1002.

In step S1032, the community management unit 1051 updates the marking history by adding marking information to the marking history that is managed in correlation with the user ID that is transmitted. The community management unit 1051 performs formation of a community on the basis of the marking history that is updated here.

For example, in a case where a plurality of users perform marking a predetermined number of times or greater at a specific location, a community is formed by the plurality of users. In addition, a heat map is generated on the basis of the marking history of each user, and a community is formed by a plurality of users whose heat maps are similar. The community management unit 1051 manages by storing information of the community that is formed as described above in the information storage unit 1033.

In step S1033, the tunnel map management unit 1053 specifies a position on the base space which corresponds to a current position of a user, and sticks a marking image to the position that is specified.

In step S1034, the content management unit 1054 registers a sticking time, a sticking position, and a marking image in correlation with the user ID to update the content DB. Then, the processing subsequent to step S1031 is repeated.

<4-3-3. Sticking of AR Content>

Next, description will be given of sticking processing of the AR content of the wearable device 1002 with reference to a flowchart of FIG. 72.

In step S1041, the AR content processing unit 1095 determines whether or not an instruction for sticking of the AR content is given, and waits until it is determined that the instruction for sticking of the AR content is given. Similar to the marking, the instruction for sticking of the AR content may be given by an operation with respect to the operation unit 1079, or may be performed in correspondence with a predetermined behavior such as shaking of the neck.

In a case where it is determined in step S1041 that the instruction for sticking of the AR content is given, in step S1042, the communication control unit 1093 transmits data of the AR content for which the instruction for sticking is given to the management server 1001 in combination with information of the user ID, the current time, the current position, the height of the wearable device 1002, and the direction of the wearable device 1002. Then, the processing subsequent to step S1041 is repeated.

Next, description will be given of content DB update processing of the management server 1001 with reference to a flowchart of FIG. 73.

Figure 72:
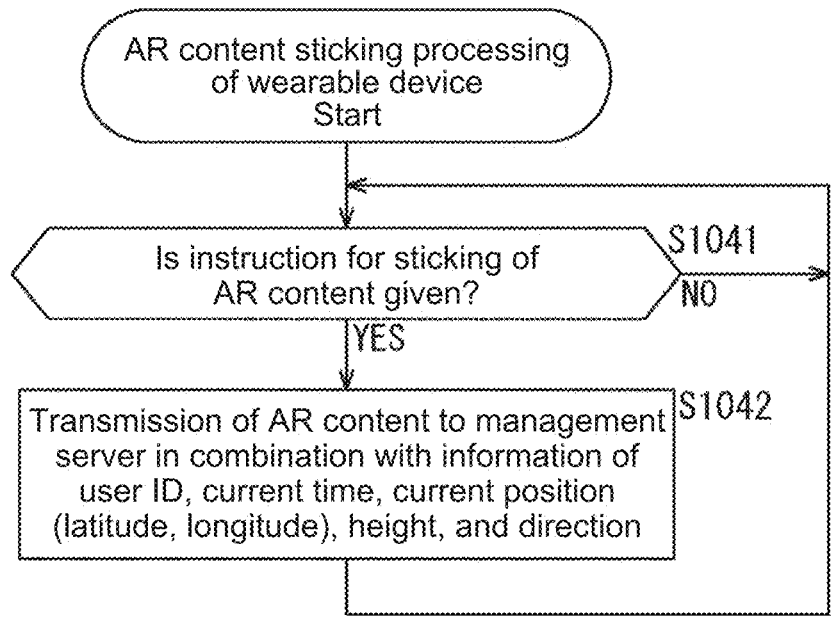
FIG. 72 is a flowchart illustrating AR content attachment processing of the wearable device.
Figure 73:
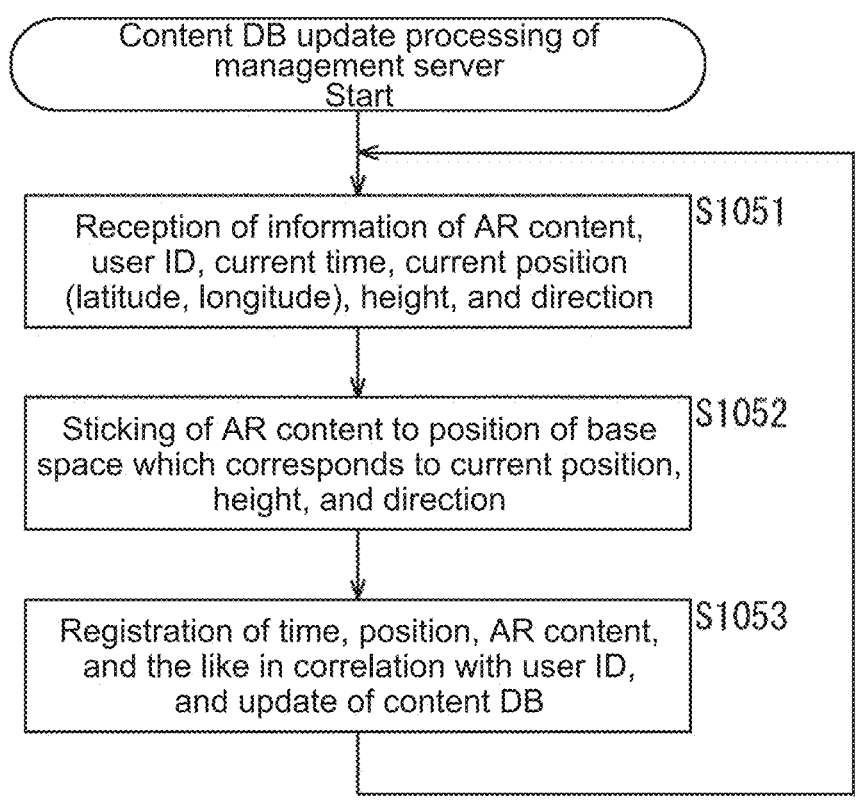
FIG. 73 is a flowchart illustrating content DB update processing of the management server.

The processing in FIG. 73 is performed in correspondence with transmission of data of the AR content and the like after the processing in FIG. 72 is performed by the wearable device 1002.

In step S1051, the communication control unit 1052 receives data of the AR content which is transmitted from the wearable device 1002 in combination with information of the user ID, the current time, the current position, the height of the wearable device 1002, and the direction of the wearable device 1002.

In step S1052, the tunnel map management unit 1053 specifies a position on the base space which corresponds to a current position of the user, and sticks the AR content at a position on the base space which corresponds to the height of the wearable device 1002 and the direction of the wearable device 1002.

In step S1053, the content management unit 1054 registers data of a sticking time, a sticking position, the height of the wearable device 1002, the direction of the wearable device 1002, the sticking position on the base space, and the AR content in correlation with the user ID to update the content DB. Then, the processing subsequent to step S1051 is repeated.

The AR content that is stuck to the base space as described above can be viewed only by members of the same community as that of the user who sticks the AR content. The user of the wearable device 1002 can distribute information that can be viewed only by the members toward the members of the community by sticking the AR content.

<4-4. Processing in Play Mode Setting>
<4-4-1. Example Using Wearable Device>

Next, description will be given of processing in play mode setting that is performed between the management server 1001 and the wearable device 1002 with reference to a sequence of FIG. 74.

Figure 74:
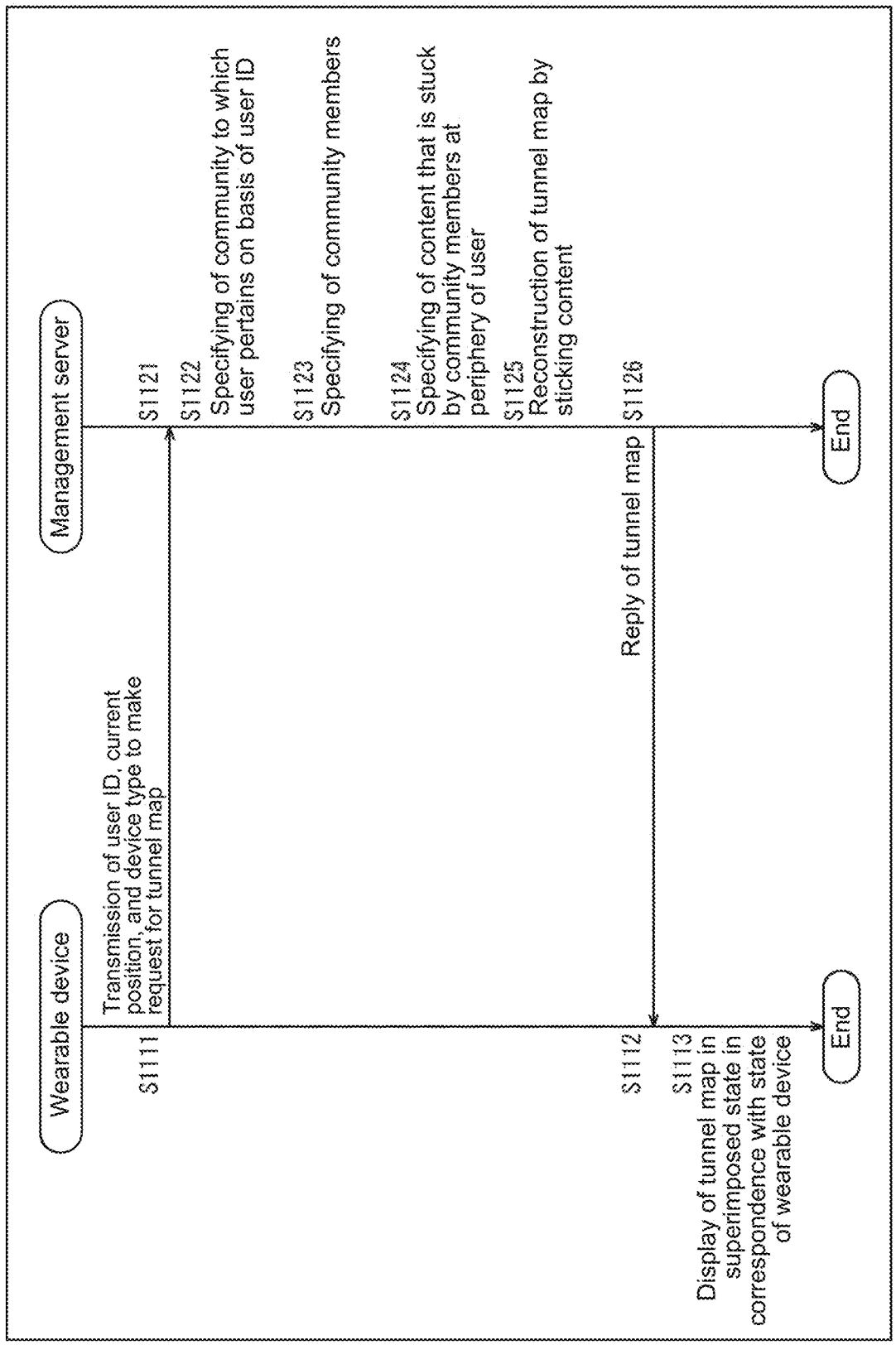
FIG. 74 is a sequence illustrating processing in play mode setting.

The processing in FIG. 74 is performed, for example, when a user sets the play mode as the operation mode of the wearable device 1002, and is moving on a street and the like.

In step S1111, the communication control unit 1093 of the wearable device 1002 transmits information of a user ID, a current position, and a device type to the management server 1001 to make a request for the management server 1001 to transmit an image of the tunnel map. Due to the information of the device type, the management server 1001 specifies that a device which makes a request for transmission of the image of the tunnel map is the wearable device 1002.

In step S1121, the communication control unit 1052 of the management server 1001 receives the information transmitted from the wearable device 1002.

In step S1122, the community management unit 1051 specifies a community to which a user of the wearable device 1002 pertains on the basis of the user ID with reference to the community information that is stored in the community information storage unit 1033.

In step S1123, the community management unit 1051 specifies members of the community to which the user of the wearable device 1002 pertains with reference to the community information. Information of the community members who are specified is supplied to the content management unit 1054.

In step S1124, the content management unit 1054 specifies AR content that is stuck by the members of the community, to which the user of the wearable device 1002 pertains, at the periphery of the current position of the user with reference to the content DB. Not only the AR content but also a marking image that is stuck by marking of the community members may be specified.

The AR content and the marking image which are specified are output to the tunnel map management unit 1053 in combination with the information of the sticking position.

In step S1125, the tunnel map management unit 1053 reconstructs the tunnel map by sticking the AR content and the marking image which are specified by the content management unit 1054 to the base space corresponding to the current position of the user.

In step S1126, the communication control unit 1052 transmits display data composed of the image of the tunnel map constructed by the tunnel map management unit 1053 to the wearable device 1002.

In step S1112, the communication control unit 1093 of the wearable device 1002 receives the display data transmitted from the management server 1001.

In step S1113, the display control unit 1094 switches a display range in correspondence with a state of the wearable device 1002, that is, a position, a height, and a direction of the wearable device 1002, and displays the image of the tunnel map. As described with reference to FIG. 57B, the AR content and the marking image which are stuck by a member of the same community are displayed in a state of being superimposed on a landscape which the user views.

Through the above-described processing, the user of the wearable device 1002 can confirm writing, which is displayed as AR content, by members of the same community as that of the user. Even when wearing the wearable device 1002, persons other than the community members cannot view the content of writing, and thus the community members can share information only in the same group.

The user of the wearable device 1002 can confirm whether or not another community member performs marking at a certain position from the marking image.

<4-4-2. Example in which Information Processing Device is Used>

Next, description will be given of processing during play mode setting that is performed between the management server 1001 and the information processing device 1003 with reference to a sequence of FIG. 75.

Figure 75:
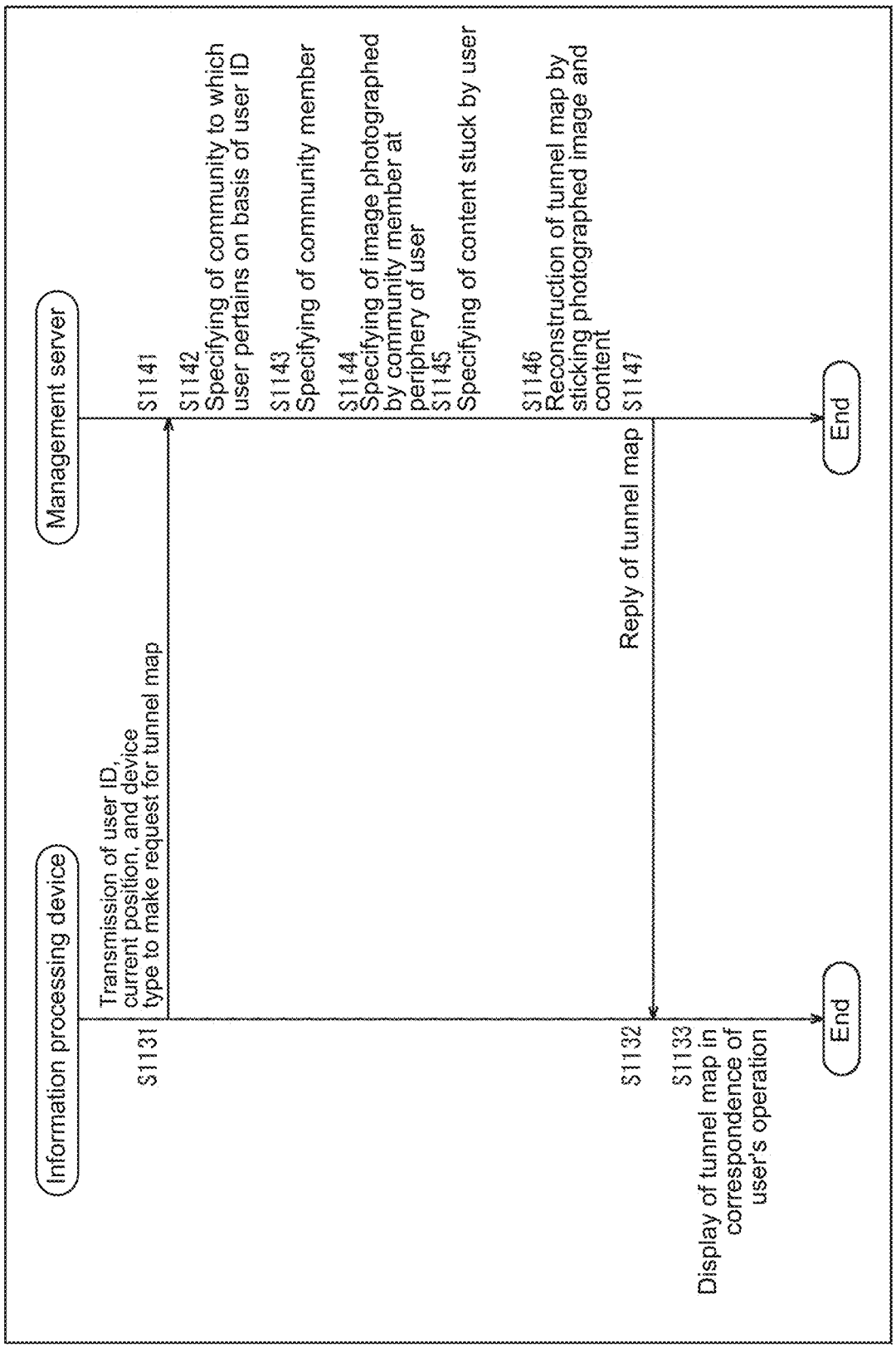
FIG. 75 is a sequence illustrating another processing in the play mode setting.

The processing in FIG. 75 is performed, for example, when a user sets the play mode as the operation mode of the information processing device 1003. It is assumed that before browsing the tunnel map by setting the play mode, a user moves on a street while wearing the wearable device 1002, and performs the above-described processing such as marking, and sticking of the AR content.

In step S1131, the communication control unit 1111 of the information processing device 1003 transmits information of a user ID, a current position, and a device type to the management server 1001 to make a request for the management server 1001 to transmit an image of the tunnel map. For example, the current position of the information processing device 1003 is measured by a GPS sensor (not illustrated). When browsing the tunnel map by using the information processing device 1003, basically, movement by the user is not performed. Due to the information of the device type, the management server 1001 specifies that a device which makes a request for transmission of the image of the tunnel map is the information processing device 1003.

In step S1141, the communication control unit 1052 of the management server 1001 receives the information transmitted from the information processing device 1003.

In step S1142, the community management unit 1051 specifies a community to which the user of the information processing device 1003 pertains on the basis of the user ID with reference to the community information that is stored in the community information storage unit 1033.

In step S1143, the community management unit 1051 specifies members of the community to which the user of the information processing device 1003 pertains with reference to the community information. Information of the community members who are specified is supplied to the content management unit 1054.

In step S1144, the content management unit 1054 specifies a photographed image photographed by the community members who are specified by the community management unit 1051 at the periphery of the current position of the user with reference to the content DB. The photographed image that is specified is output to the tunnel map management unit 1053 in combination with information of a sticking position, and the like.

In step S1145, the content management unit 1054 specifies AR content that is stuck by the user of the information processing device 1003 at the periphery of the current position of the user with reference to the content DB. Not only the AR content but also a marking image that is stuck by marking of the user of the information processing device 1003 may be specified.

In step S1146, the tunnel map management unit 1053 sticks the photographed image specified by the content management unit 1054 to the base space corresponding to the current position of the user. In addition, the tunnel map management unit 1053 reconstructs the tunnel map by sticking the AR content and the marking image which are specified by the content management unit 1054 in a state of being superimposed on the photographed image.

In step S1147, the communication control unit 1052 transmits display data composed of the image of the tunnel map constructed by the tunnel map management unit 1053 to the information processing device 1003.

In step S1132, the communication control unit 1111 of the information processing device 1003 receives the display data transmitted from the management server 1001.

In step S1133, the display control unit 1112 switches a display range in correspondence with a user's operation, and displays the image of the tunnel map. As described with reference to FIG. 60, the AR content and the marking image which are stuck by the user of the information processing device 1003 are displayed in a state of being superimposed on the photographed image that is stuck to the base space.

Figure 76:
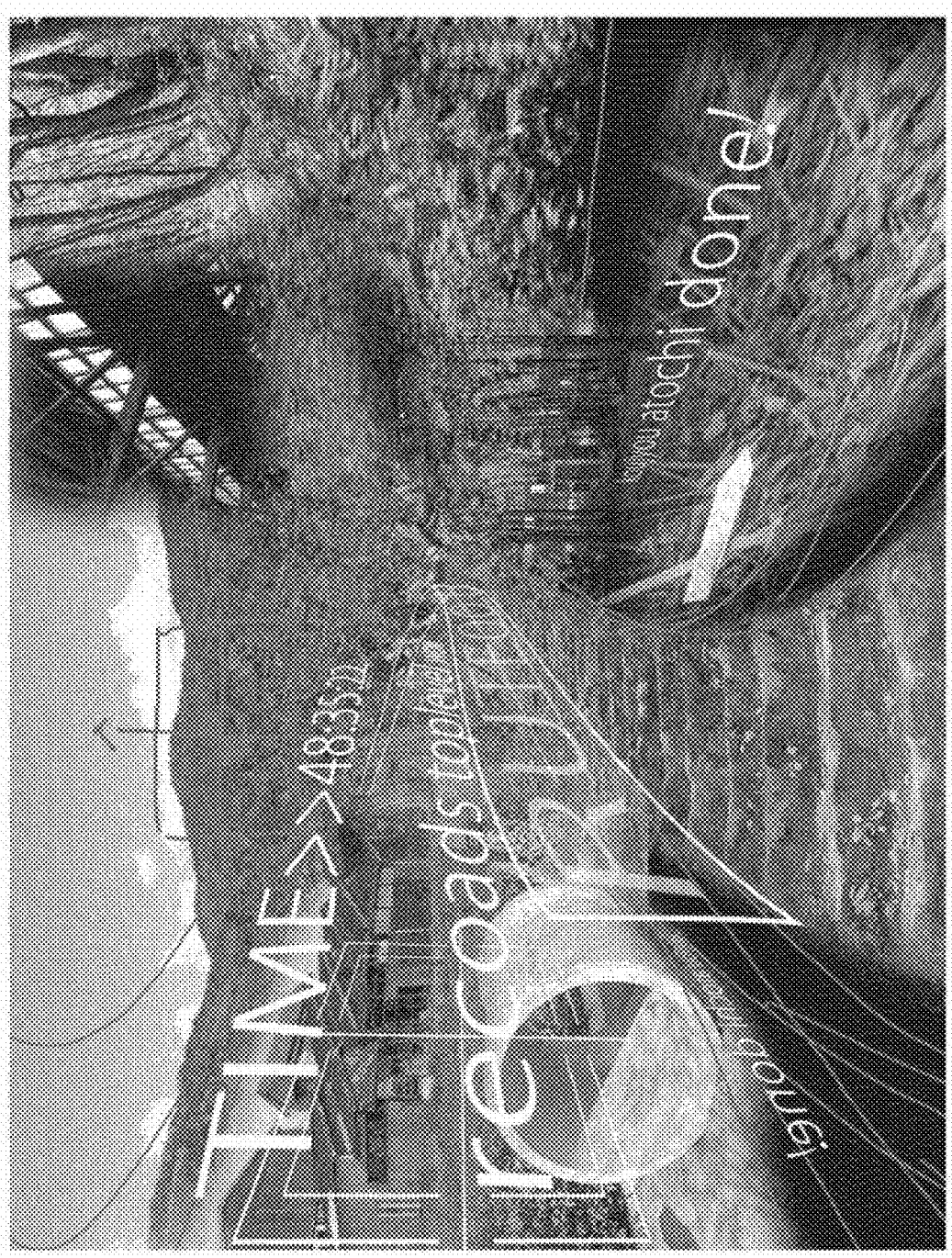
FIG. 76 is a view illustrating an example of an image of the tunnel map.
Figure 77:
FIG. 77 is a view illustrating an example of an image of the tunnel map.

FIG. 76 and FIG. 77 are views illustrating an example of images of the tunnel map which are displayed on the information processing device 1003.

In the images of the tunnel map in FIG. 76 and FIG. 77, each landscape photograph is obtained by sticking a photographed image photographed by the wearable device 1002 to the base space. Shape deformation of the landscape photograph represents that shape transformation is performed in correspondence with a photographing direction and the like. Text data and a linear or curved image which is displayed and superimposed on the landscape photograph is writing that is stuck as the AR content.

The user of the information processing device 1003 can view the image on which photographed images photographed by members of the same community, the AR content stuck by the user, and the like are superimposed. In addition, the user can view AR content that is stuck to each location by switching visual point positions in a space of the tunnel map.

The user may be allowed to view not only the AR content that is stuck by the user but also the AR content that is stuck by members of a community to which the user pertains as in the case of using the wearable device 1002.

Description has been given of an example in which the tunnel map is constructed by sticking the photographed image to the base space, but data of a three-dimensional model that expresses a building and the like in a three-dimensional manner may be stuck to the base space. For example, in a case where the wearable device 1002 has a function of generating data of the three-dimensional model on the basis of the photographed image, the data generated by the wearable device 1002 can be stuck to the base space.

<4-4-3. Edition of Tunnel Map>

Figure 78:
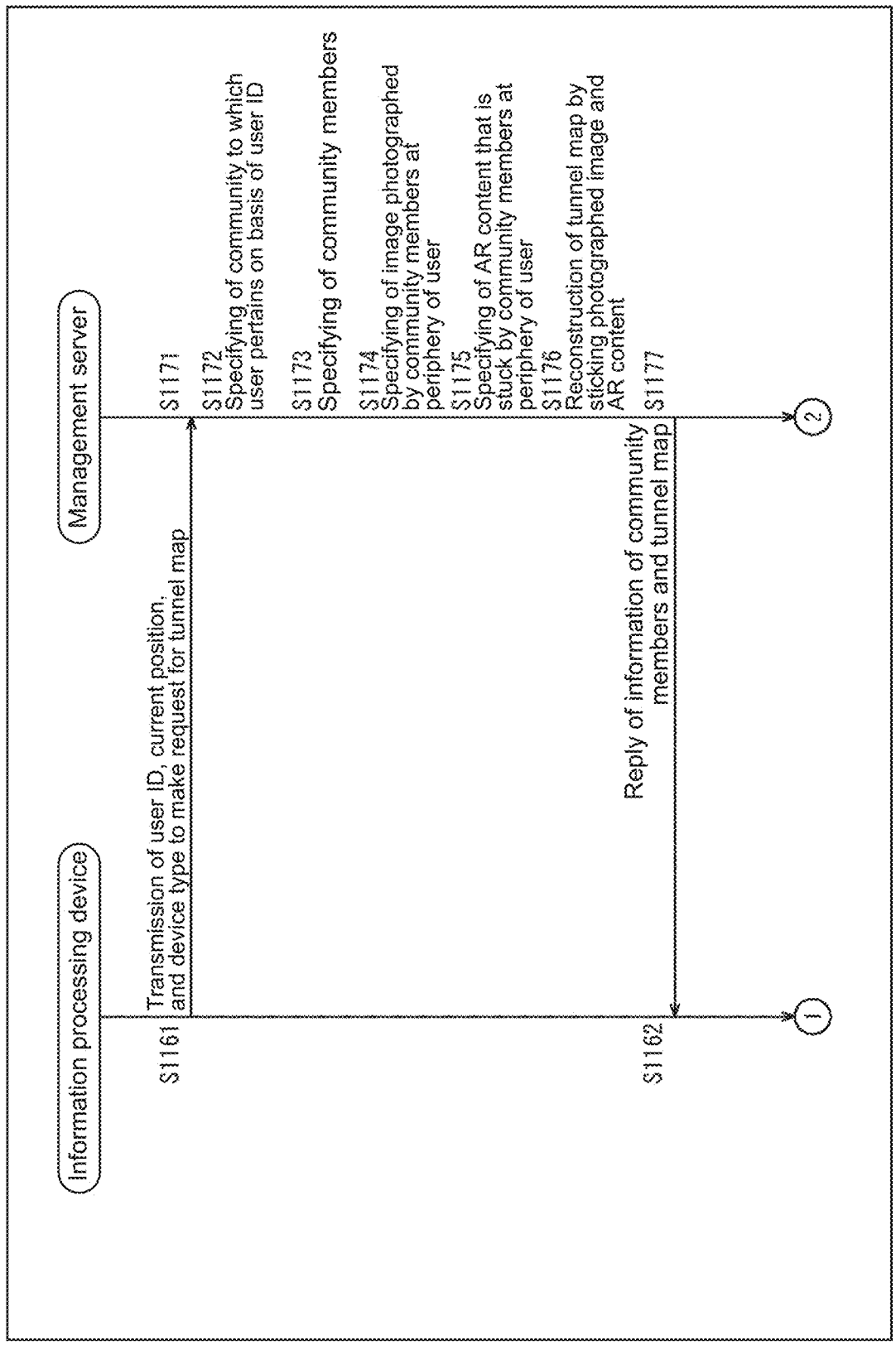
FIG. 78 is a sequence illustrating edition processing of the tunnel map.
Figure 79:
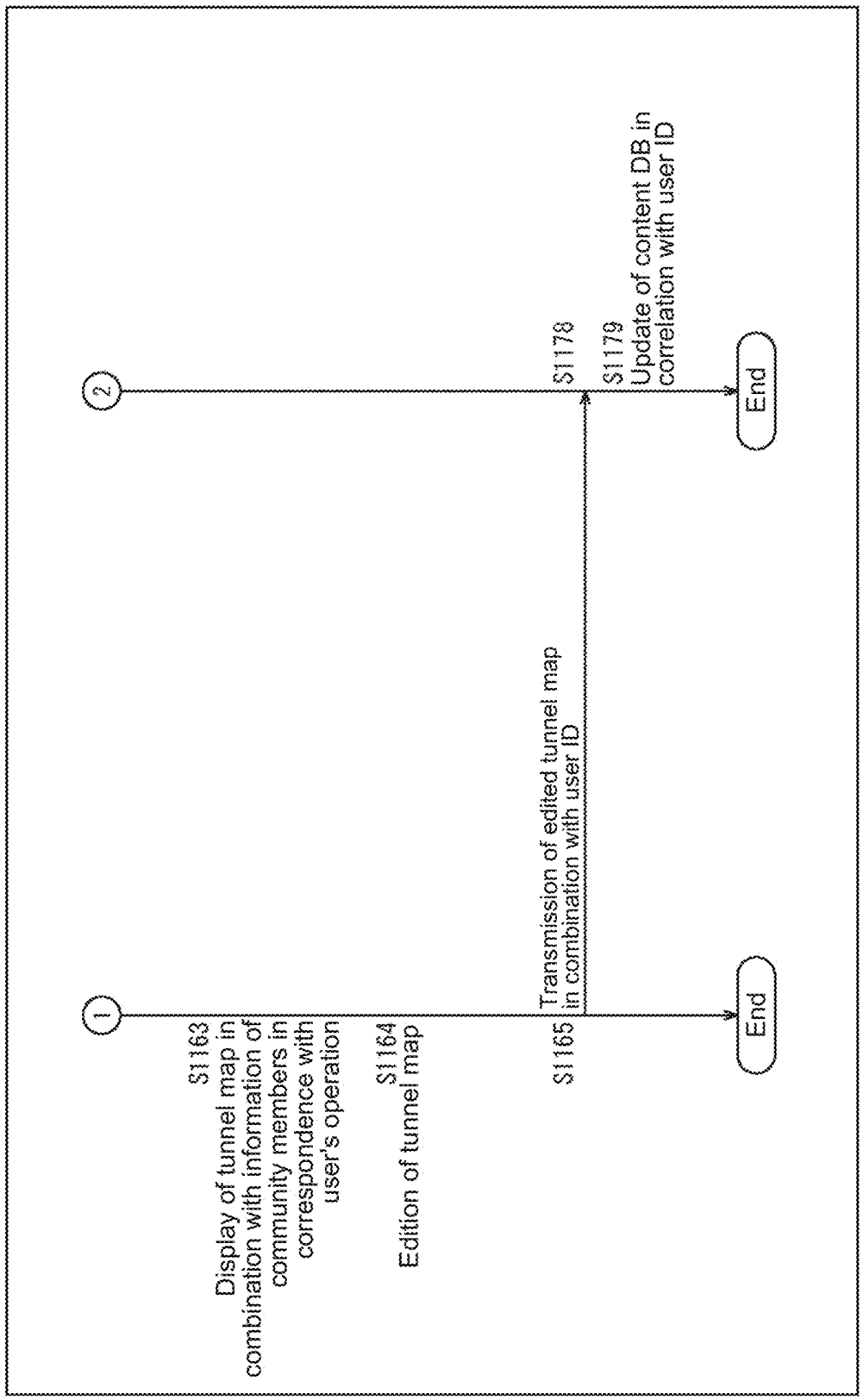
FIG. 79 is a sequence that is continued from FIG. 78.

Next, description will be given of tunnel map edition processing that is performed between the management server 1001 and the information processing device 1003 with reference to a sequence of FIG. 78 and FIG. 79. For example, edition of the tunnel map is performed in the play mode setting.

In step S1161, the communication control unit 1111 of the information processing device 1003 transmits information of a user ID, a current position, and a device type to the management server 1001 to make a request for the management server 1001 to transmit an image of the tunnel map.

In step S1171, the communication control unit 1052 of the management server 1001 receives the information transmitted from the information processing device 1003.

In step S1172, the community management unit 1051 specifies a community to which the user of the information processing device 1003 pertains on the basis of the user ID with reference to the community information that is stored in the community information storage unit 1033.

In step S1173, the community management unit 1051 specifies members of the community to which the user of the information processing device 1003 pertains with reference to the community information.

In step S1174, the content management unit 1054 specifies a photographed image photographed by the community members who are specified by the community management unit 1051 at the periphery of the current position of the user with reference to the content DB.

In step S1175, the content management unit 1054 specifies AR content that is stuck by community members including the user at the periphery of the current position of the user of the information processing device 1003 with reference to the content DB. In this example, on a tunnel map edition screen, AR content that is stuck by community member other than the user of the information processing device 1003 is also displayed.

In step S1176, the tunnel map management unit 1053 sticks the photographed image specified by the content management unit 1054 to the base space corresponding to the current position of the user. In addition, the tunnel map management unit 1053 reconstructs the tunnel map by sticking the AR content specified by the content management unit 1054 in a state of being superimposed on the photographed image.

In step S1177, the communication control unit 1052 transmits display data composed of the image of the tunnel map constructed by the tunnel map management unit 1053 to the information processing device 1003. At this time, the communication control unit 1052 transmits information of a community member who stuck each piece of AR content to the information processing device 1003.

In step S1162, the communication control unit 1111 of the information processing device 1003 receives the display data and the information of the community member which are transmitted from the management server 1001.

In step S1163, the display control unit 1112 displays the image of the tunnel map in combination with the information of the community member. Display of the image of the tunnel map is performed in a state in which a display range is switched in correspondence with a user's operation. The user of the information processing device 1003 views the image of the tunnel map on which the AR content stuck by members who pertain to the same community as that of the user is superimposed.

For example, in a case where the user of the information processing device 1003 operates the input unit 146 and selects the AR content, a menu of edition such as deletion (removal), change of the content, and change of the sticking position is displayed. The user can perform edition of the AR content that is stuck by community members by selecting a predetermined item from the menu. In the case of selecting the AR content, for example, information related a community member who stuck the AR content is displayed.

In step S1164, the AR content processing unit 1113 edits the tunnel map in correspondence with a user's operation.

In step S1165, the communication control unit 1111 transmits information of the tunnel map after edition in combination with the user ID.

In step S1178, the communication control unit 1052 of the management server 1001 receives the information that is transmitted from the information processing device 1003.

In step S1179, the content management unit 1054 updates the content DB by registering the information related to the AR content after edition in correlation with the user ID of the user of the information processing device 1003. Then, the processing is terminated.

In a case where the user of the information processing device 1003 browses the tunnel map again, the tunnel map including the AR content after edition is displayed. The content of edition of the content may be shared by community members, or may be confirmed only by the user who performs edition.

When the content of edition of the AR content is shared by the community members, it is possible to create a tunnel map that is ideal for the community members. Note that, edition of the AR content may be performed from the wearable device 1002.

<4-4-4. Fixed Point Observation of Tunnel Map>

Figure 80:
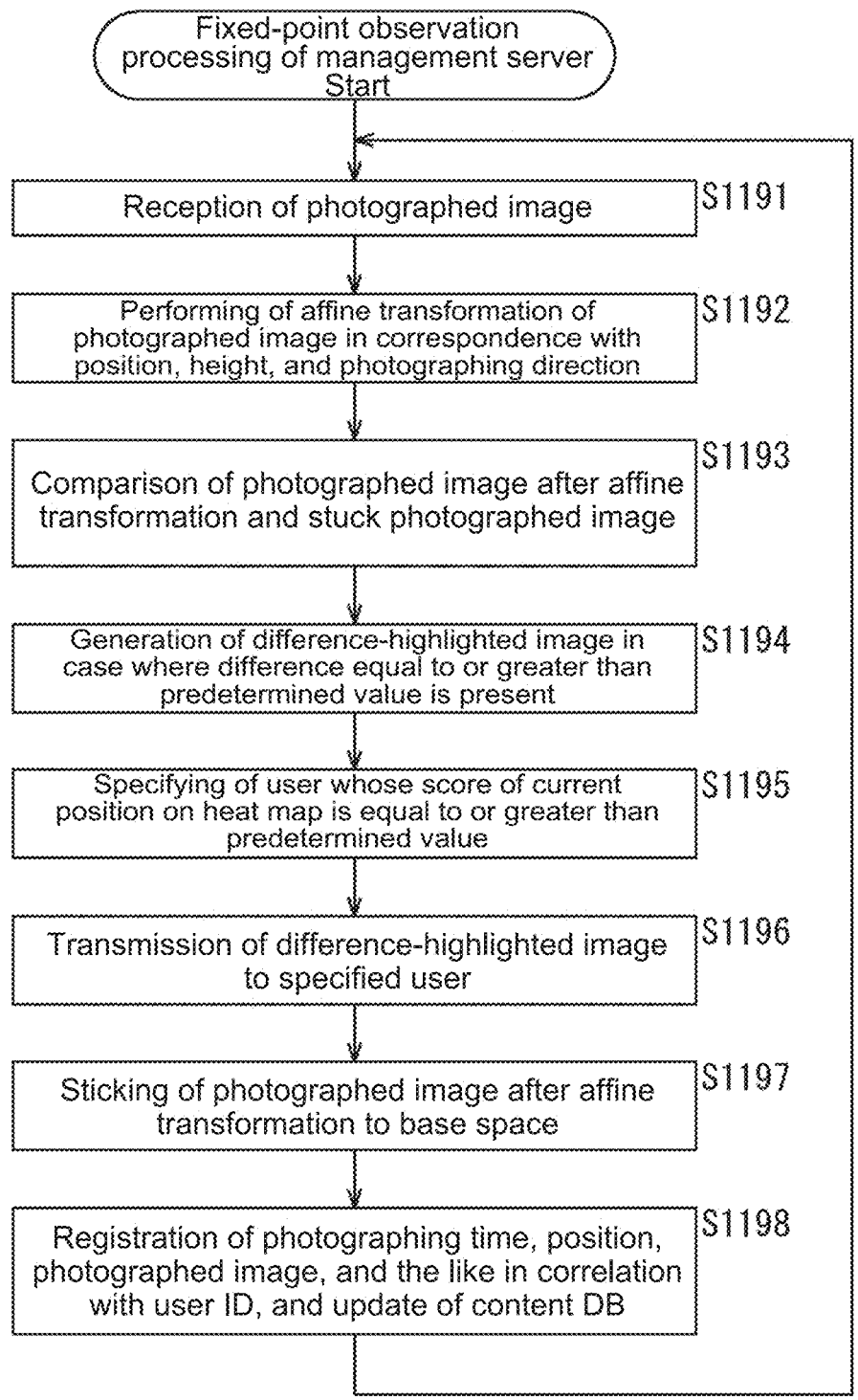
FIG. 80 is a flowchart illustrating fixed-point observation processing of the management server.

Next, description will be given of a fixed-point observation processing of the management server 1001 with reference to a flowchart of FIG. 80.

Fixed-point observation by the management server 1001 is processing of detecting a variation of respective locations such things as there are a lot of people more than usual, a shop was open, and a building was newly constructed on the basis of a photographed image photographed by the wearable device 1002. The fixed-point observation is performed when a photographed image photographed by the wearable device 1002 is transmitted as described with reference to FIG. 68.

In step S1191, the communication control unit 1052 receives a photographed image transmitted from the wearable device 1002. Information of a user ID, a current time, a current position, a height of the wearable device 1002, and a photographing direction is correlated with the photographed image transmitted from the wearable device 1002.

In step S1192, the tunnel map management unit 1053 acquires information of the base space corresponding to the current position of the user by reading out the information from the base space information storage unit 1034. In addition, the tunnel map management unit 1053 performs transformation processing such as affine transformation with respect to the photographed image in correspondence with the position and the height of the wearable device 1002, and the photographing direction.

As described above, the tunnel map management unit 1053 specifies a sticking position of the photographed image after the affine transformation on the basis of the current position of the user, the height of the wearable device 1002, and the photographing direction. The photographed image that is stuck already to the specified sticking position is read out from the content DB by the content management unit 1054, and is supplied to the tunnel map management unit 1053.

In step S1193, the tunnel map management unit 1053 compares the photographed image after the affine transformation, and the stuck photographed image supplied from the content management unit 1054 with each other. That is, images which are photographed at the same position in the same direction with a time shift are compared with each other. For example, comparison of the photographed images is performed by obtaining a difference in a pixel value at a corresponding position.

In step S1194, in a case where a difference equal to or greater than a predetermined value is present, the tunnel map management unit 1053 generates a difference-highlighted image. For example, the difference-highlighted image is an image, which is displayed by highlighting a region in which the difference in the pixel value equal to or greater than a threshold value is present, among photographed images photographed from a rear side.

In step S1195, the community management unit 1051 specifies a user whose score on the heat map of a current position of the wearable device 1002 that transmits the photographed image is equal to or greater than a predetermined value with reference to the heat map of each user.

In step S1196, the communication control unit 1052 transmits the difference-highlighted image to the specified user. In the wearable device 1002 that receives the difference-highlighted image, the difference-highlighted image is displayed.

In step S1197, the tunnel map management unit 1053 sticks the photographed image of which a shape is deformed by the affine transformation to the inner wall of the base space.

In step S1198, the content management unit 1054 updates the content DB by registering information of a photographing time, a photographing position, a height, a photographing direction, a sticking position, a photographed image, and the like in correlation with the user ID. Then, the processing returns to step S1191, and the above-described processing is repeated.

A situation in which a difference is detected in photographed images photographed at the same location with time shift represents that a variation exists in a landscape of a photographing location. In addition, the user who is specified as a transmission target of the difference-highlighted image on the basis of the heat map represents a user who frequently visits the location at which the variation of the landscape exists. A user who frequently visits an arbitrary location is notified of existence of a variation at the location.

Since community members are notified of the difference-highlighted image, only a person who is considered to be interested in existence of the variation can be notified of existence of the variation.

The above-described fixed-point observation can also be used in distribution of an advertisement. For example, the management server 1001 can distribute an advertisement related to a location at which a variation is detected toward community members at a variation detection timing. In addition, in a case where a pattern such as a lot of people at a specific day in a month exists in a variation with respect to an arbitrary location, the management server 1001 can distribute an advertisement in conformity to the pattern.

In addition, as described above, the photographed image or the AR content which is stuck to the base space is managed in the content DB in correlation with a time. In the play mode setting, when a user of the wearable device 1002 or the information processing device 1003 designates a date in the past, and the like, an image of a tunnel map, to which a photographed image or AR content which is correlated with the designated date is stuck, may be displayed. According to this, the user can confirm a state of the tunnel map in the past.

Modification Example

A route that connects locations at which marking is performed may be formed on the basis of the marking history, and the route that is formed may be used in a moving device as a route of automatic driving. Examples of a moving device that performs the automatic driving include a wheelchair, a personal mobility, an automobile, and the like.

In addition to distribution of a message or an advertisement, providing of content such as a game, and providing of services such as selling of goods and a lecture may be performed toward specific community members.

In addition, description has been given on the assumption that one community is associated with one electronic signboard 1 or one location, but the one community may be associated with a plurality of the electronic signboards 1 or a plurality of locations. In contrast, a plurality of communities may be associated with one electronic signboard 1, or a plurality of communities may be associated with one location.

Description has been given on the assumption that an electronic signboard type device is prepared as a device in which input of writing is possible, but a device type is arbitrary as long as the device has a function of detecting an input by a user and a function of displaying the input content.

With regard to the device type, a type in which a user desires to perform writing is desirable. Examples of the device of the type in which the user desires to perform writing include the following devices. A part of the device may be illuminated.

Wall-shaped device
Columnar device such as an electric pole
Poster-shaped device
Bulletin board-shaped device
Storefront shutter-shaped device Examples of the wall-shaped device include a device in which a large-sized touch panel monitor is provided on an approximately entire surface, and a device in which an input position on a wall surface by a user can be detected by an infrared sensor and the like. With regard to the wall-shaped device, writing may be input already, and the content of writing may be displayed on a part of the display surface.

Examples of the columnar device include a device provided with a curved surface touch panel monitor. In addition, examples of the poster-shaped device and the bulletin board-shaped device include a device that includes a thin touch panel monitor and is formed on a wall surface and the like. The shutter-shaped device is a device that has the same function as that of the wall-shaped device and can be appropriately accommodated.

The above-described series of processing may be executed by hardware or software. In the case of executing the series of processing by software, a program that constitutes the software is installed in a computer provided in exclusive hardware, a general-purpose PC, and the like.

The program that is installed is provided in a state of being recorded in the removable media 151, as illustrated in FIG. 31, such as an optical disc (a compact disc-read only memory (CD-ROM), a digital versatile disc (DVD), and the like) and a semiconductor memory. In addition, the program may be provided through a wired or wireless transmission medium such as a local area network, the Internet, and digital satellite broadcasting. The program may be installed in the ROM 142 or the storage unit 148 in advance.

Note that, the program that is executed by the computer may be a program in which processing is performed in time-series according to the procedure described in the present specification, or may be a program in which processing is performed in parallel or at a necessary timing such as when a call is made.

Note that, in the present specification, the system represents an assembly of a plurality of constituent elements (devices, modules (parts), and the like), and whether or not the entirety of the constituent elements exist in the same casing does not matter. Accordingly, all of a plurality of devices which are accommodated in individual casings and are connected through a network, and one device in which a plurality of modules are accommodated in one casing represent the system.

Note that, the effects described in the present specification are illustrative only, and other effects may be provided.

An embodiment of the present technology is not limited to the above-described embodiment, and various modifications can be made in a range not departing from the gist of the present technology.

For example, the present technology can have a cloud computing configuration in which one function is shared by a plurality of devices and is processed in cooperation through a network.

In addition, the respective steps described above in the flowchart can be executed in a state of being shared by a plurality of devices in addition to execution by one device.

In addition, in a case where a plurality of kinds of processing are included in one step, the plurality of kinds of processing included in the one step can be executed in a state of being shared by a plurality of devices in addition to execution by one device.

<Composition Example of Configurations>

The present technology can employ the following configuration.

(1)

An information processing system, including:

a storage unit that stores position information indicating a position of a device of a user and date information at which position measurement is performed in correlation with each other; and a control unit that forms a community including users who leave a movement trajectory satisfying a predetermined condition at the periphery of a specific location on the basis of a user's movement history indicated by the stored information, and distributes a message input through a specific interface to users who pertain to the community.

(2)

The information processing system according to (1), in which the control unit forms the community by setting movement to the periphery of the specific location a predetermined number of times or greater as the predetermined condition.

(3)

The information processing system according to (1), in which the control unit forms the community by setting staying at the periphery of the specific location for a predetermined time or longer as the predetermined condition.

(4)

The information processing system according to any one of (1) to (3), in which the actual specific interface with which input of the message is possible, or the virtual specific interface with which input of the message is possible at the specific location is provided at the specific location.

(5)

The information processing system according to (4), in which a device including an input unit with which a user is capable of inputting the message is provided at the specific location as the actual specific interface.

(6)

The information processing system according to any one of (1) to (5), in which the control unit stores the position information and the date information in correlation with each other in the storage unit at a timing designated by the user of the device or in a periodic manner.

(7)

The information processing system according to any one of (1) to (6), in which the control unit, generates frequency information indicating a movement frequency of each position indicated by the position information stored in the storage unit for every user, and determines a user who is similar in the frequency information within a predetermined range from the specific location with users who pertain to the community as a candidate for a new user who pertains to the community.

(8)

The information processing system according to (7), in which the control unit generates a heat map, which expresses a movement frequency of each location with shading of a color, as the frequency information.

(9)

The information processing system according to any one of (1) to (8), in which the control unit distributes the message by using existing social media.

(10)

The information processing system according to any one of (1) to (9), in which in a case where a manager of the community approves advertisement distribution to users who pertain to the community, the control unit distributes an advertisement corresponding to an advertisement distribution request from a requester to the users who pertain to the community.

(11)

The information processing system according to (10), in which in a case where the requester is a user who does not pertain to the community, the control unit does not perform advertisement distribution.

(12)

The information processing system according to any one of (1) to (11), in which the control unit distributes only the message that is newly input.

(13)

The information processing system according to (12), in which the control unit recognizes characters which are input as the message, and distributes text data indicating the recognized characters.

(14)

The information processing system according to (5), in which the device is provided with, a photographing unit that is capable of photographing the message that is input by the input unit, and a display unit that is capable of displaying the message that is photographed by the photographing unit.

(15)

The information processing system according to (14), in which when the message that is input has a size equal to or less than a predetermined size, the control unit allows the display unit to display the message photographed by the photographing unit in an enlarged manner.

(16)

The information processing system according to (14), in which when encrypted characters are included in the message that is input, the control unit decodes the encrypted characters photographed by the photographing unit, and allows the display unit to display characters obtained through decoding.

(17)

The information processing system according to (14), in which the control unit recognizes characters which are input as the message, distributes text data indicating the recognized characters to a user who pertains to the community, encrypts the recognized characters, and allows the device to display the recognized characters as encrypted characters, and in a case where the encrypted characters are photographed by the photographing unit of the device of the user who pertains to the community, the control unit decodes the encrypted characters photographed by the photographing unit, and allows the display unit to display characters obtained through decoding.

(18)

The information processing system according to (1), further including:

a communication unit that receives a photographed image that is photographed by a photographing unit of the device and is transmitted from the device in combination with photographing position information indicating a photographing location, information indicating a height of the photographing unit during photographing, and information indicating a direction of the photographing unit during photographing;

a generation unit that generates a tunnel map by performing processing of transforming a shape of the photographed image in correspondence with the photographing location, the height of the photographing unit, and the direction of the photographing unit, and of sticking the photographed image after transformation to a wall of a virtual tunnel-shaped space that corresponds to an actual road; and a storage unit that stores a database in which the photographed image after transformation, and user identification information of the user of the device, a photographing date of the photographed image, and sticking position information indicating a sticking position in the tunnel map are correlated with each other.

(19)

The information processing system according to (18), in which the control unit superimposes a predetermined marking image at a position of the tunnel map which corresponds to a position of the device at a timing at which the position information of the device of a predetermined user and the date information are stored in correlation with each other, and updates the database such that the marking image, and user identification information of the predetermined user, the date information, and the position information are associated with each other.

(20)

The information processing system according to (18) or (19), in which
the control unit
sticks specific content at a position of a wall of the tunnel map which corresponds to the position information, the height of the photographing unit, and the direction of the photographing unit in a case where the device of a predetermined user gives an instruction for sticking of the specific content, and
updates the database such that the specific content, and user identification information of the predetermined user, the date information, and sticking position information indicating a sticking position of the specific content in the tunnel map are associated with each other.

(21)

The information processing system according to (20), in which
the control unit selects whether to provide the tunnel map in which the specific content is stuck to a wall of the tunnel map that is formed by sticking the photographed image or whether to provide the tunnel map in which the specific content is stuck to the wall of the tunnel map to which the photographed image is not stuck in correspondence with a type of the device that makes a request for providing of the tunnel map.

(22)

The information processing system according to any one of (18) to (21), in which
the control unit
specifies another user who pertains to the same community as the community to which the user of the device pertains in correspondence with a request for providing of the tunnel map from the device, which includes the user identification information and the position information, on the basis of the user identification information that is included in the request,
determines the photographed image that is associated with user identification information of the other user who is specified at the periphery of a position of the device on the basis of the database,
constructs the tunnel map by sticking the photographed image that is determined, and
transmits the tunnel map to the device which transmits the request.

(23)

The information processing system according to (18) to (22) in which
the control unit
generates a highlighted image in which a difference between the transformed photographed image a shape of which is transformed, and the photographed image stuck to a position that is a sticking destination of the photographed image in advance is highlighted, and
distributes the highlighted image to a user who moves to a position corresponding to the photographed image a predetermined number of times or greater.

(24)

A recording medium in which a program is recorded, the program allowing a computer to execute processing including:
a step of storing position information indicating a position of a device of a user and date information at which position measurement is performed in a storage unit in correlation with each other;
a step of forming a community including users who leave a movement trajectory satisfying a predetermined condition at the periphery of a specific location on the basis of a user's movement history indicated by the stored information; and
a step of distributing a message input through a specific interface to users who pertain to the community.

(25)

An information processing method, including:
a step of storing position information indicating a position of a device of a user and date information at which position measurement is performed in a storage unit in correlation with each other;
a step of forming a community including users who leave a movement trajectory satisfying a predetermined condition at the periphery of a specific location on the basis of a user's movement history indicated by the stored information; and
a step of distributing a message input through a specific interface to users who pertain to the community.

REFERENCE SIGNS LIST 1 electronic signboard
21 display
31 control unit
32 touch sensor
33 community information storage unit
51 writing detection unit
52 display control unit
53 community management unit
54 communication control unit
101 management server
111 control unit
112 user information storage unit
113 community information storage unit
114 signboard image storage unit
121 community management unit
122 communication control unit
123 signboard image management unit

The invention claimed is:

1. An information processing system, comprising:
a storage unit configured to store position information of a first device of each user of a plurality of users and date information associated with the position information, wherein
the position information is stored in correlation with the date information, and
the position information indicates a position of the first device;
a second device that includes an input unit and a display unit, wherein the second device is at a specific location as an interface; and
a control unit configured to:
count a number of instances of movement to a periphery of the specific location by each user of the plurality of users, based on a movement history indicated by the stored position information and the stored date information;
determine, from the plurality of users, a set of users having the counted number of instances of the movement to the periphery of the specific location equal to or greater than a specific number, based on the counted number of instances of the movement to the periphery of the specific location by each user of the plurality of users;

form a community that includes the set of users based on the set of users having the counted number of instances of the movement equal to or greater than the specific number;

detect user contact with respect to a surface of the display unit of the second device, wherein
the user contact is associated with an input of a message, and
at least one user of the set of users inputs the message to the input unit through the interface;

determine each of a contact position of the user contact on the surface of the display unit and content associated with the message;

display, based on the determined contact position and the content, the message on the display unit of the second device;

compare an elapse time after termination of the input of the message with a specific time;

continue, based on the comparison that the elapse time is lesser than the specific time, the detection of the user contact; and distribute, based on the comparison that the elapse time is greater than the specific time, the message on the display unit of the second device to each user of the set of users having the counted number of instances of the movement equal to or greater than the specific number.

2. The information processing system according to claim 1, wherein the control unit is further configured to form the community based on a time of stay of each user of the set of users at the periphery of the specific location for equal to or greater than a specific stay time.

3. The information processing system according to claim 1, wherein
the control unit is further configured to control the storage of the position information of the first device of each user of the plurality of users and the date information associated with the position information, and
the position information of the first device of each user of the plurality of users and the date information associated with the position information are stored at one of a time designated by a respective user of the plurality of users or a periodic interval.

4. The information processing system according to claim 1, wherein
the control unit is further configured to:
generate frequency information that indicates a plurality of movement frequencies of a plurality of positions indicated by the stored position information for each user of the plurality of users; and
determine a user from the plurality of users as a candidate for the community,
the determined user is within a first range of the specific location,
a movement frequency associated with the determined user is within a second range of a set of movement frequencies of the plurality of movement frequencies associated with the set of users, and
the plurality of movement frequencies includes the movement frequency associated with the determined user.

5. The information processing system according to claim 4, wherein the control unit is further configured to generate a heat map that expresses, as the frequency information, each movement frequency of the plurality of movement frequencies with shading of a color.

6. The information processing system according to claim 1, wherein the control unit is further configured to distribute the message based on social media.

7. The information processing system according to claim 1, wherein
the control unit is further configured to distribute an advertisement to the set of users based on an input from a manager of the community, and
the advertisement corresponds to an advertisement distribution request from a requester.

8. The information processing system according to claim 7, wherein the control unit is further configured to distribute the advertisement based on the requester that is a user of the set of users.

9. The information processing system according to claim 1, wherein the control unit is further configured to:
recognize a plurality of characters in the message; and
distribute text data that indicates the recognized plurality of characters.

10. The information processing system according to claim 1, wherein
the second device further includes a photographing unit that captures the message that is input at the input unit, and
the display unit displays the message that is captured by the photographing unit.

11. The information processing system according to claim 10, wherein
the control unit is further configured to control the display unit to display the message captured by the photographing unit in an enlarged manner, and
the message is displayed based on a size of the message is less than or equal to a specific size.

12. The information processing system according to claim 10, wherein the control unit is further configured to:
decode the message captured by the photographing unit based on inclusion of encrypted characters in the message; and
control the display unit to display the decoded message.

13. The information processing system according to claim 10, wherein the control unit is further configured to:
recognize a plurality of characters in the message;
distribute text data to the set of users, wherein the text data indicates the recognized plurality of characters;
encrypt the recognized plurality of characters; and
control the second device to display the recognized plurality of characters as the encrypted plurality of characters.

14. The information processing system according to claim 1, further comprising:
a communication unit configured to receive a photographed image in combination with each of photographing position information that indicates a photographing location, information that indicates a height of a photographing unit, and information that indicates a direction of the photographing unit, wherein the photographing unit photographs the photographed image; and
a generation unit configured to:
generate a tunnel map based on transformation of a shape of the photographed image in correspondence with each of the photographing location, the height of the photographing unit, and the direction of the photographing unit; and
stick the transformed photographed image to a wall of a virtual tunnel-shaped space that corresponds to a road, wherein the storage unit is further configured to store a database that includes, in correlation with each other, the transformed photographed image, user identification information associated with the first device, a photographing date of the photographed image, and stick position information that indicates a stick position in the tunnel map.

15. The information processing system according to claim 14, wherein the control unit is further configured to:
    superimpose a marking image at a position of the tunnel map, wherein the marking image corresponds to the position of the first device at a time at which the position information of the first device and the date information are stored; and
    update the database based on association of the marking image, the user identification information, the date information, and the position information.

16. The information processing system according to claim 14, wherein the control unit is further configured to:
    stick content at a position of a wall of the tunnel map, wherein
        the content corresponds to the position information, the height of the photographing unit, and the direction of the photographing unit, and
        the content is stuck based on an instruction from the first device; and
    update the database based on association of the content, the user identification information, the date information, and the stick position information that indicates the stick position of the content in the tunnel map.

17. The information processing system according to claim 16, wherein
    the control unit is further configured to select one of the tunnel map in which the content is stuck to the wall of the tunnel map that is formed based on a stick operation of the photographed image or the tunnel map in which the content is stuck to the wall of the tunnel map to which the photographed image is not stuck in correspondence with a type of the first device, and
    the first device transmits a request for the tunnel map.

18. The information processing system according to claim 14, wherein the control unit is further configured to:
    specify a specific user from the set of users based on a request for the tunnel map from the first device, wherein the request includes the user identification information and the position information;
    determine the photographed image that is associated with the user identification information of the specific user specified at a periphery of the position of the first device based on the database;
    construct the tunnel map based on a stick operation on the determined photographed image; and
    transmit the tunnel map to the first device.

19. The information processing system according to claim 14, wherein the control unit is further configured to:
    generate a highlighted image,
        wherein, in the highlighted image, a difference between the transformed photographed image and the photographed image stuck to a position that is a sticking destination of the photographed image is highlighted; and
    distribute the highlighted image to a user of the set of users who moves to a position corresponding to the photographed image one of equal to a specific number of times or greater than the specific number of times.

20. A non-transitory computer-readable medium having stored thereon computer-executable instructions, that when executed by a processor, cause the processor to execute operations, the operations comprising:
    storing position information of a first device of each user of a plurality of users and date information associated with the position information in a storage unit, wherein
        the position information is stored in correlation with the date information, and
        the position information indicates a position of the first device;
    counting a number of instances of movement to a periphery of a specific location by each user of the plurality of users, based on a movement history indicated by the stored position information and the stored date information;
    determining, from the plurality of users, a set of users having the counted number of instances of the movement to the periphery of the specific location equal to or greater than a specific number, based on the counted number of instances of the movement to the periphery of the specific location by each user of the plurality of users;
    forming a community that includes the set of users based on the set of users having the counted number of instances of the movement equal to or greater than the specific number;
    detecting user contact with respect to a surface of a display unit of a second device, wherein
        the second device is at the specific location as an interface,
        the user contact is associated with an input of a message, and
        at least one user of the set of users inputs the message to an input unit of the second device through the interface;
    determining each of a contact position of the user contact on the surface of the display unit and content associated with the message;
    displaying, based on the determined contact position and the content, the message on the display unit of the second device;
    comparing an elapse time after termination of the input of the message with a specific time;
    continuing, based on the comparison that the elapse time is lesser than the specific time, the detection of the user contact; and
    distributing, based on the comparison that the elapse time is greater than the specific time, the message on the display unit of the second device to each user of the set of users having the counted number of instances of the movement equal to or greater than the specific number.

21. An information processing method, comprising:
    storing position information of a first device of each user of a plurality of users and date information associated with the position information in a storage unit, wherein
        the position information is stored in correlation with the date information, and
        the position information indicates a position of the first device;
    counting a number of instances of movement to a periphery of a specific location by each user of the plurality of users, based on a movement history indicated by the stored position information and the stored date information;
    determining, from the plurality of users, a set of users having the counted number of instances of the movement to the periphery of the specific location equal to or greater than a specific number, based on the counted number of instances of the movement to the periphery of the specific location by each user of the plurality of users;

forming a community that includes the set of users based on the set of users having the counted number of instances of the movement equal to or greater than the specific number;

detecting user contact with respect to a surface of a display unit of a second device, wherein
- the second device is at the specific location as an interface,
- the user contact is associated with an input of a message, and
- at least one user of the set of users inputs the message to an input unit of the second device through the interface;

determining each of a contact position of the user contact on the surface of the display unit and content associated with the message;

displaying, based on the determined contact position and the content, the message on the display unit of the second device;

comparing an elapse time after termination of the input of the message with a specific time;

continuing, based on the comparison that the elapse time is lesser than the specific time, the detection of the user contact; and distributing, based on the comparison that the elapse time is greater than the specific time, the message on the display unit of the second device to each user of the set of users having the counted number of instances of the movement equal to or greater than the specific number.

* * * * *